(12) United States Patent
Ma et al.

(10) Patent No.: US 12,477,154 B2
(45) Date of Patent: Nov. 18, 2025

(54) ENCODER, DECODER AND CORRESPONDING METHODS AND APPARATUS

(71) Applicant: Huawei Technologies Co., Ltd., Guangdong (CN)

(72) Inventors: Xiang Ma, Moscow (RU); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 17/853,153

(22) Filed: Jun. 29, 2022

(65) Prior Publication Data

US 2022/0345748 A1     Oct. 27, 2022

Related U.S. Application Data

(63) Continuation of application No. PCT/CN2020/142501, filed on Dec. 31, 2020.

(30) Foreign Application Priority Data

Dec. 31, 2019  (WO) ................ PCT/CN2019/130804
Jan. 2, 2020    (WO) ................ PCT/CN2020/070153

(51) Int. Cl.
*H04N 19/00*     (2014.01)
*H04N 19/105*   (2014.01)
(Continued)

(52) U.S. Cl.
CPC .......... *H04N 19/70* (2014.11); *H04N 19/105* (2014.11); *H04N 19/172* (2014.11);
(Continued)

(58) Field of Classification Search
CPC ..................................................... H04N 19/00
See application file for complete search history.

(56) References Cited

U.S. PATENT DOCUMENTS

2013/0279576 A1   10/2013   Chen et al.
2014/0301484 A1*  10/2014   Wang ................ H04N 19/30
                                                                375/240.26
(Continued)

FOREIGN PATENT DOCUMENTS

CN      105122816 A     12/2015
CN      105191315 A     12/2015
(Continued)

OTHER PUBLICATIONS

Takeshi Chujoh et al., On improvement of collocated_ref_idx [online], JVET-Q0130-v1, Internet URL: https://jvet-experts.org/doc_end_user/documents/17_Brussels/wg11/JVET-Q0130-v1.zip>, Dec. 30, 2019.

(Continued)

*Primary Examiner* — Maryam A Nasri
(74) *Attorney, Agent, or Firm* — WOMBLE BOND DICKINSON (US) LLP

(57) ABSTRACT

A method for decoding a coded video bitstream is provided. The method includes: obtaining a reference layer syntax element by parsing the coded video bitstream, wherein a value of the reference layer syntax element specifying whether a layer with index k is a direct reference layer for a layer with index i; determining whether the layer with index j is a reference layer for the layer with index i based on the value of the reference layer syntax element; and when a condition is satisfied, predicting a picture of the layer with index i based on the layer with index j, wherein the value of a chroma format related syntax element applied to the layer with index i is the same as the value of a chroma format related syntax element applied to the layer with index j.

12 Claims, 19 Drawing Sheets

(51) Int. Cl.
- H04N 19/172 (2014.01)
- H04N 19/186 (2014.01)
- H04N 19/30 (2014.01)
- H04N 19/50 (2014.01)
- H04N 19/70 (2014.01)

(52) U.S. Cl.
CPC ........... *H04N 19/186* (2014.11); *H04N 19/30* (2014.11); *H04N 19/50* (2014.11)

(56) References Cited

U.S. PATENT DOCUMENTS

| | | |
|---|---|---|
| 2015/0103886 A1 | 4/2015 | He et al. |
| 2015/0195554 A1 | 7/2015 | Misra et al. |
| 2016/0241869 A1 | 8/2016 | Choi et al. |
| 2017/0019666 A1 | 1/2017 | Deshpande |
| 2017/0041641 A1 | 2/2017 | Deshpande et al. |
| 2018/0115787 A1 | 4/2018 | Koo et al. |
| 2019/0261011 A1 | 8/2019 | Hannuksela |

FOREIGN PATENT DOCUMENTS

| | | |
|---|---|---|
| CN | 105393542 A | 3/2016 |
| CN | 106416250 A | 2/2017 |
| JP | 2017500764 A | 1/2017 |
| RU | 2639958 C2 | 12/2017 |
| WO | 2015054634 A2 | 4/2015 |

OTHER PUBLICATIONS

Byeongdoo Choi et al., Video parameter set design [online], JCTVC-L0132, Internet URL: http://phenix.it-sudparis.eu/jct/doc_end_user/documents/12_Geneva/wg11/JCTVC-L0132-v2.zip>, Jan. 14, 2013.

Jill M. Boyce, et.al., Overview of SHVC: Scalable Extensions of the High Efficiency Video Coding Standard [online], Published in: IEEE Transactions on Circuits and Systems for Video Technology (vol. 26, Issue: 1, Jan. 2016), Jul. 29, 2015, pp. 20-34, Internet URL: https://ieeexplore.ieee.org/stamp/stamp.jsp?tp=andarnumber=7172510>, DOI: 10.1109/TCSVT.2015.2461951.

Document: JVET-Q0172-v1, Tzu-Der Chuang et al, AHG9: Chroma format and bitdepth constraints for multi-layer structures, Joint Video Experts Team (JVET) of ITU-T SG 16 WP 3 and ISO/IEC JTC 1/SC 29/WG 11, 17th Meeting: Brussels, BE, Jan. 7-17, 2020, 6 pages.

ITU-T H.264(Jun. 2019), Series H: Audiovisual and Multimedia Systems, Infrastructure of audiovisual services-Coding of moving video, Advanced video coding for generic audiovisual services, total 836 pages.

Document: JVET-P2001-vE, Benjamin Bross et al, Versatile Video Coding (Draft 7), Joint Video Experts Team (JVET) of ITU-T SG 16 WP 3 and ISO/IEC JTC 1/SC 29/WG 11, 16th Meeting: Geneva, CH, Oct. 1-11, 2019, 491 pages.

ITU-T H.265(Jun. 2019), Series H: Audiovisual and Multimedia Systems, Infrastructure of audiovisual services-Coding of moving video, High efficiency video coding, total 696 pages.

Biatek T et al: "MIP with fixed-length mode coding and memory reduction", 17. JVET Meeting; Jan. 7, 2020-Jan. 17, 2020; Brussels; (The Joint Video Exploration Team of ISO/IEC JTC1/SC29/WG11 and ITU-T SG.16 ), No. JVET-Q0274; m51869 Dec. 30, 2019 (Dec. 30, 2019), XP030223046, total 488 pages.

T-D Chuang et al: "AHG9: Chroma format and bitdepth constraint for multi-layer structure", 17. JVET Meeting; Jan. 7, 2020-Jan. 17, 2020; Brussels; (The Joint Video Exploration Team of ISO/IEC JTC1/SC29/WG11 and ITU-TSG.16 ), No. JVET-Q0172; m51761 Dec. 30, 2019 (Dec. 30, 2019), XP030222778, total 6 pages.

* cited by examiner

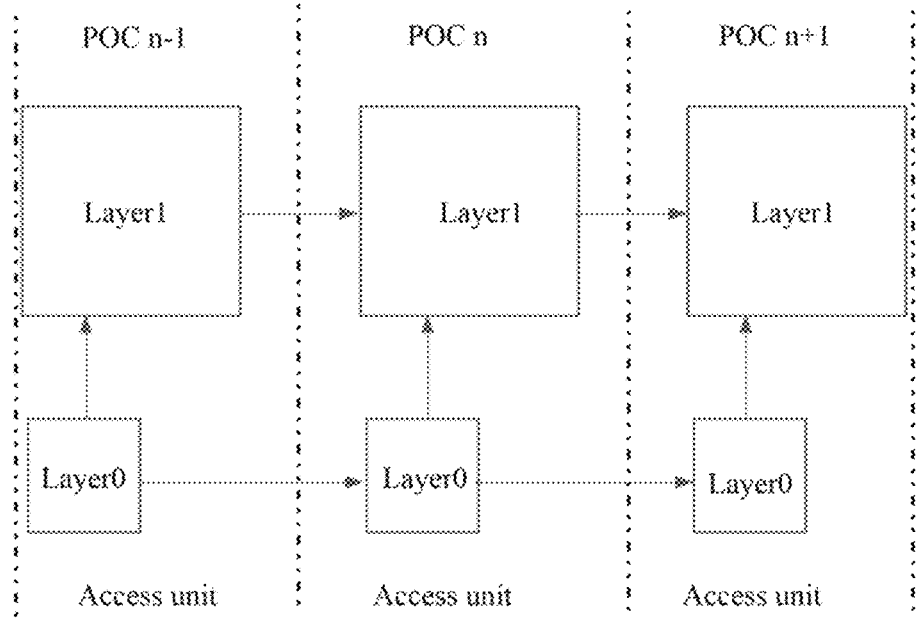

FIG. 6

| Obtaining a reference layer syntax element by parsing the coded video bitstream, where the value of the reference layer syntax element specifying whether a layer with index k is a direct reference layer for a layer with index i, where both i and k are integers and are larger than or equal to 0 | S701 |

| Determining whether the layer with index j is a reference layer for the layer with index i based on the value of the reference layer syntax element, where the layer with index j is a reference layer for the layer with index k, where j is an integer and is larger than or equal to 0 | S702 |

| In case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i | S703 |

FIG. 7

Obtaining a reference layer syntax element by parsing the coded video bitstream, where the value of the reference layer syntax element specifying whether a layer with index j is a direct reference layer for a layer with index i, where both i and j are integers and are larger than or equal to 0 — S801

In case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i — S802

FIG. 8

ENCODER, DECODER AND CORRESPONDING METHODS AND APPARATUS

CROSS-REFERENCE TO RELATED APPLICATIONS

This application is a continuation of International Application No. PCT/CN2020/142501, filed on Dec. 31, 2020, which claims priority to International Application No. PCT/CN2019/130804, filed on Dec. 31, 2019 and International Application No. PCT/CN2020/070153, filed on Jan. 2, 2020. All of the aforementioned patent applications are hereby incorporated by reference in their entirety.

TECHNICAL FIELD

Embodiments of the present application generally relate to the field of picture processing and more particularly to an encoder, a decoder and corresponding methods and apparatus.

BACKGROUND

Video coding (video encoding and decoding) is used in a wide range of digital video applications, for example broadcast digital television (TV), video transmission over internet and mobile networks, real-time conversational applications such as video chat, video conferencing, digital video disc (DVD) and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

According to a first aspect, a method for decoding a coded video bitstream is provided. The method may be performed by an apparatus for decoding a coded video bitstream. The method includes:

obtaining a reference layer syntax element by parsing the coded video bitstream, where the value of the reference layer syntax element specifying whether a layer with index k is a direct reference layer for a layer with index i, where both i and k are integers and are larger than or equal to 0;

determining whether the layer with index j is a reference layer for the layer with index i based on the value of the reference layer syntax element, where the layer with index j is a reference layer for the layer with index k, where j is an integer and is larger than or equal to 0; and in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

According to a second aspect, a method for decoding a coded video bitstream is provided. The method may be performed by an apparatus for decoding a coded video bitstream. The method includes:

obtaining a reference layer syntax element by parsing the coded video bitstream, where the value of the reference layer syntax element specifying whether a layer with index j is a direct reference layer for a layer with index i, where both i and j are integers and are larger than or equal to 0; and in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i.

In an embodiment, the reference layer syntax element is a video parameter set (VPS) level syntax element, where the VPS is applied to the layer with index j and the layer with index i.

In an embodiment, the chroma format related syntax element is a sequence parameter set (SPS) level syntax element, where the SPS is applied to the layer with index j or the layer with index i.

In an embodiment, the method further includes:

obtaining the chroma format related syntax element applied to the layer with index i and the chroma format related syntax element applied to the layer with index j by parsing the coded video bitstream; and where the condition further includes the value of the chroma format related syntax element applied to the layer with index i is the same as the value of the chroma format related syntax element applied to the layer with index j.

In an embodiment, the method further includes:

in case that the layer with index j is a reference layer for the layer with index i, and the value of the chroma format related syntax element applied to the layer with index i is not the same as the value of the chroma format related syntax element applied to the layer with index j, stopping decoding the coded video bitstream.

In an embodiment, the method further includes:

in case that the layer with index j is not a reference layer for the layer with index i, predicting the picture of the layer with index i without using the layer with index j.

In an embodiment, the method further includes:

in case that the condition is satisfied, determining, without obtaining the chroma format related syntax element applied to the layer with index i by parsing the coded video bitstream, that the value of the chroma format related syntax element applied to the layer with index i is the value of the chroma format related syntax element applied to the layer with index j.

According to a third aspect, a method for decoding a coded video bitstream is provided. the method may be performed by an apparatus for decoding a coded video bitstream. The method includes:

obtaining a reference layer syntax element by parsing the coded video bitstream, where the value of the reference layer syntax element specifying whether a layer with index k is a direct reference layer for a layer with index i, where both i and k are integers and are larger than or equal to 0;

determining whether the layer with index j is a reference layer for the layer with an index i based on the value of the reference layer syntax element, where the layer with index j is a reference layer for the layer with index k, where j is an integer and is larger than or equal to 0; and in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

According to a fourth aspect, a method for decoding a coded video bitstream is provided. The method may be performed by an apparatus for decoding a coded video bitstream. The method includes:

obtaining a reference layer syntax element by parsing the coded video bitstream, where the value of the reference layer syntax element specifying whether a layer with index j is a direct reference layer for a layer with index i, where both i and j are integers and are larger than or equal to 0; and in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the value of the reference layer syntax element specifies the layer with index j is a direct reference layer for the layer with index i.

In an embodiment, the reference layer syntax element is a video parameter set (VPS) level syntax element, where the VPS is applied to the layer with index j and the layer with index i.

In an embodiment, the bit depth related syntax element is a sequence parameter set (SPS) level syntax element, where the SPS is applied to the layer with index j or the layer with index i.

In an embodiment, the method further includes:

obtaining the bit depth related syntax element applied to the layer with index i and the bit depth related syntax element applied to the layer with index j by parsing the coded video bitstream; and where the condition further includes the value of the bit depth related syntax element applied to the layer with index i is the same as the value of the bit depth related syntax element applied to the layer with index j.

In an embodiment, the method further includes:

in case that the layer with index j is a reference layer for the layer with index i, and the value of the bit depth related syntax element applied to the layer with index i is not the same as the value of the bit depth related syntax element applied to the layer with index j, stopping decoding the coded video bitstream.

In an embodiment, the method further includes:

in case that the layer with index j is not a reference layer for the layer with index i, predicting the picture of the layer with index i without using the layer with index j.

In an embodiment, the method further includes:

in case that the condition is satisfied, determining, without obtaining the bit depth related syntax element applied to the layer with index i by parsing the coded video bitstream, that the value of the bit depth related syntax element applied to the layer with index i is the value of the bit depth related syntax element applied to the layer with index j.

In an embodiment, the bit depth related syntax element specifies a bit depth of luma and chroma samples of a picture in a layer to which the bit depth related syntax element is applied.

According to a fifth aspect, a method for encoding a video is provided. The method may be performed by an apparatus for encoding a video. The method includes:

determining whether a layer with index j is a direct reference layer for a layer with index i, both i and j are integers and are larger than or equal to 0; and in case that the layer with index j is a direct reference layer for the layer with index i, encoding a reference layer syntax element with a value specifying the layer with index j is a direct reference layer for the layer with index i into a video bitstream, and encoding a chroma format related syntax element applied to the layer with index i and a chroma format related syntax element applied to the layer with index j into the video bitstream, where the value of the chroma format related syntax element applied to the layer with index i is the same as the value of the chroma format related syntax element applied to the layer with index j.

In an embodiment, further including:

in case that the layer with index j is the direct reference layer for the layer with index i, predicting a picture of the layer with index i based on the layer with index j.

In a possible implementation form of the method according to the fifth aspect as such, further including:

in case that the layer with index j is not a reference layer for the layer with index i, predicting a picture of the layer with index i without using the layer with index j.

According to a sixth aspect, a method for encoding a video is provided. The method may be performed by an apparatus for encoding a video. The method includes:

determining whether a layer with index j is a direct reference layer for a layer with index i, both i and j are integers and are larger than or equal to 0; and in case that the layer with index j is a direct reference layer for the layer with index i, encoding a reference layer syntax element with a value specifying the layer with index j is a direct reference layer for the layer with index i into a video bitstream, and encoding a bit depth related syntax element applied to the layer with index i and a bit depth related syntax element applied to the layer with index j into the video bitstream, where the value of the bit depth related syntax element applied to the layer with index i is the same as the value of the bit depth related syntax element applied to the layer with index j.

In an embodiment, further including:

in case that the layer with index j is the direct reference layer for the layer with index i, predicting a picture of the layer with index i based on the layer with index j.

In an embodiment, further including:

in case that the layer with index j is not a reference layer for the layer with index i, predicting a picture of the layer with index i without using the layer with index j.

In an embodiment, the bit depth related syntax element specifies a bit depth of luma and chroma samples of a picture in a layer to which the bit depth related syntax element is applied.

According to a seventh aspect, an apparatus for decoding a coded video bitstream is provided. The apparatus includes:

an obtaining unit, configured to obtain a reference layer syntax element by parsing the coded video bitstream, where the value of the reference layer syntax element specifying whether a layer with index k is a direct reference layer for a layer with index i, where both i and k are integers and are larger than or equal to 0;

a determining unit, configured to determine whether the layer with index j is a reference layer for the layer with index i based on the value of the reference layer syntax element, where the layer with index j is a reference layer for the layer with index k, where j is an integer and is larger than or equal to 0; and a predicting unit, configured to predict a picture of the layer with index i based on the layer with index j in case that a condition is satisfied, where the value of a chroma format related syntax element applied to the layer with index i is the same as the value of a chroma format related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

According to an eighth aspect, an apparatus for decoding a coded video bitstream is provided. The apparatus includes:

an obtaining unit, configured to obtain a reference layer syntax element by parsing the coded video bitstream, where the value of the reference layer syntax element specifying whether a layer with index j is a direct reference layer for a layer with index i, where both i and j are integers and are larger than or equal to 0; and a predicting unit, configured to predict a picture of the layer with index i based on the layer with index j in case that a condition is satisfied, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i.

In an embodiment, the reference layer syntax element is a video parameter set (VPS) level syntax element, where the VPS is applied to the layer with index j and the layer with index i.

In an embodiment, the chroma format related syntax element is a sequence parameter set (SPS) level syntax element, where the SPS is applied to the layer with index j or the layer with index i.

In an embodiment, the obtaining unit is further configured to obtain the chroma format related syntax element applied to the layer with index i and the chroma format related syntax element applied to the layer with index j by parsing the coded video bitstream; and where the condition further includes the value of the chroma format related syntax element applied to the layer with index i is the same as the value of the chroma format related syntax element applied to the layer with index j.

In an embodiment, further including a stopping unit; the stopping unit is configured to stop decoding the coded video bitstream in case that the layer with index j is a reference layer for the layer with index i, and the value of the chroma format related syntax element applied to the layer with index i is not the same as the value of the chroma format related syntax element applied to the layer with index j.

In an embodiment, the obtaining unit is further configured to predict the picture of the layer with index i without using the layer with index j in case that the layer with index j is not a reference layer for the layer with index i.

In an embodiment, the determining unit is further configured to determine, without obtaining the chroma format related syntax element applied to the layer with index i by parsing the coded video bitstream, that the value of the chroma format related syntax element applied to the layer with index i is the value of the chroma format related syntax element applied to the layer with index j in case that the condition is satisfied.

According to a ninth aspect, an apparatus for decoding a coded video bitstream is provided. The apparatus includes:

an obtaining unit, configured to obtain a reference layer syntax element by parsing the coded video bitstream, where the value of the reference layer syntax element specifying whether a layer with index k is a direct reference layer for a layer with index i, where both i and k are integers and are larger than or equal to 0;

a determining unit, configured to determine whether the layer with index j is a reference layer for the layer with an index i based on the value of the reference layer syntax element, where the layer with index j is a reference layer for the layer with index k, where j is an integer and is larger than or equal to 0; and a predicting unit, configured to predict a picture of the layer with index i based on the layer with index j in case that a condition is satisfied, where the value of a bit depth related syntax element applied to the layer with index i is the same as the value of a bit depth related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

According to an tenth aspect, an apparatus for decoding a coded video bitstream is provided. The apparatus includes:

an obtaining unit, configured to obtain a reference layer syntax element by parsing the coded video bitstream, where the value of the reference layer syntax element specifying whether a layer with index j is a direct reference layer for a layer with index i, where both i and j are integers and are larger than or equal to 0; and a predicting unit, configured to predict a picture of the layer with index i based on the layer with index j in case that a condition is satisfied, where the value of a bit depth related syntax element applied to the layer with index i is the same as the value of a bit depth related syntax element applied to the layer with index j, and where the condition includes the value of the reference layer syntax element specifies the layer with index j is a direct reference layer for the layer with index i.

In an embodiment, the reference layer syntax element is a video parameter set (VPS) level syntax element, where the VPS is applied to the layer with index j and the layer with index i.

In an embodiment, the bit depth related syntax element is a sequence parameter set (SPS) level syntax element, where the SPS is applied to the layer with index j or the layer with index i.

In an embodiment, the obtaining unit is further configured to obtain the bit depth related syntax element applied to the layer with index i and the bit depth related syntax element applied to the layer with index j by parsing the coded video bitstream; and where the condition further includes the value of the bit depth related syntax element applied to the layer with index i is the same as the value of the bit depth related syntax element applied to the layer with index j.

In an embodiment, further including a stopping unit; the stopping unit is configured to stop decoding the coded video bitstream in case that the layer with index j is a reference layer for the layer with index i, and the value of the bit depth related syntax element applied to the layer with index i is not the same as the value of the bit depth related syntax element applied to the layer with index j.

In an embodiment, the predicting unit is further configured to predict the picture of the layer with index i without using the layer with index j in case that the layer with index j is not a reference layer for the layer with index i.

In an embodiment, the determining unit is further configured to determine, without obtaining the bit depth related syntax element applied to the layer with index i by parsing the coded video bitstream, that the value of the bit depth related syntax element applied to the layer with index i is the value of the bit depth related syntax element applied to the layer with index j.

In an embodiment, the bit depth related syntax element specifies a bit depth of luma and chroma samples of a picture in a layer to which the bit depth related syntax element is applied.

According to an eleventh aspect, an apparatus for encoding a video is provided. The apparatus includes:

a determining unit, configured to determine whether a layer with index j is a direct reference layer for a layer with index i, both i and j are integers and are larger than or equal to 0; and an encoding unit, configured to encode a reference layer syntax element with a value specifying the layer with index j is a direct reference layer for the layer with index i into a video bitstream, and encode a chroma format related syntax element applied to the layer with index i and a chroma format related syntax element applied to the layer with index j into the video bitstream in case that the layer with index j is a direct reference layer for the layer with index i, where the value of the chroma format related syntax element applied to the layer with index i is the same as the value of the chroma format related syntax element applied to the layer with index j.

In an embodiment, further including a first predicting unit;

the first predicting unit is configured to predict a picture of the layer with index i based on the layer with index j in case that the layer with index j is the direct reference layer for the layer with index i.

In an embodiment, further including a second predicting unit;

the first predicting unit is configured to predict a picture of the layer with index i without using the layer with index j in case that the layer with index j is not a reference layer for the layer with index i.

According to a twelfth aspect, an apparatus for encoding a video is provided. The apparatus includes:

a determining unit, configured to determine whether a layer with index j is a direct reference layer for a layer with index i, both i and j are integers and are larger than or equal to 0; and an encoding unit, configured to encode a reference layer syntax element with a value specifying the layer with index j is a direct reference layer for the layer with index i into a video bitstream, and encode a bit depth related syntax element applied to the layer with index i and a bit depth related syntax element applied to the layer with index j into the video bitstream in case that the layer with index j is a direct reference layer for the layer with index i, where the value of the bit depth related syntax element applied to the layer with index i is the same as the value of the bit depth related syntax element applied to the layer with index j.

In an embodiment, further including a first predicting unit;

the first predicting unit is configured to predict a picture of the layer with index i based on the layer with index j in case that the layer with index j is the direct reference layer for the layer with index i.

In an embodiment, further including a second predicting unit;

the second predicting unit is configured to predict a picture of the layer with index i without using the layer with index j in case that the layer with index j is not a reference layer for the layer with index i.

In an embodiment, the bit depth related syntax element specifies a bit depth of luma and chroma samples of a picture in a layer to which the bit depth related syntax element is applied.

According to a thirteenth aspect, an encoder including processing circuitry for carrying out the method according to the fifth aspect or the sixth aspect is provided.

According to a fourteenth aspect, a decoder including processing circuitry for carrying out the method according to the first aspect, the second aspect, the third aspect or the fourth aspect is provided.

According to a fourteenth aspect, a computer program product including program code for performing the method according to any one of the first to sixth aspect when executed on a computer or a processor is provided.

According to a fifteenth aspect, a decoder is provided. The decoder includes: one or more processors; and a non-transitory computer-readable storage medium coupled to the one or more processors and storing programming for execution by the processors, where the programming, when executed by the processors, configures the decoder to carry out the method according to the first aspect, the second aspect, the third aspect or the fourth aspect.

According to a sixteenth aspect, an encoder is provided. The encoder includes: one or more processors; and a non-transitory computer-readable storage medium coupled to the processors and storing programming for execution by the processors, where the programming, when executed by the processors, configures the encoder to carry out the method according to the fifth aspect or the sixth aspect.

According to a seventeenth aspect, a non-transitory computer-readable medium carrying a program code which, when executed by a computer device, causes the computer device to perform the method of any one of the first to sixth aspect is provided.

According to an eighteenth aspect, a non-transitory storage medium is provided. The non-transitory storage medium includes an encoded bitstream decoded by an image decoding device, the bitstream includes encoded data of at least one layer, where the bitstream further includes a chroma format related syntax element of a layer with index i and a chroma format related syntax element of a layer with index j, where the value of the chroma format related syntax element of the layer with index i is the same as the value of the chroma format related syntax element of the layer with index j when the layer with index j is a reference layer for the layer with index i, both i and j are integers and are larger than or equal to 0.

According to a nineteenth aspect, a non-transitory storage medium is provided. The non-transitory storage medium includes an encoded bitstream decoded by an image decoding device, the bitstream includes encoded data of at least one layer, where the bitstream further includes a bit depth related syntax element of a layer with index i and a bit depth related syntax element of a layer with index j, where the value of the bit depth related syntax element of the layer with index i is the same as the value of the bit depth related syntax element of the layer with index j when the layer with index j is a reference layer for the layer with index i, both i and j are integers and are larger than or equal to 0.

In an embodiment, the bit depth related syntax element specifies a bit depth of luma and chroma samples of a picture in a layer to which the bit depth related syntax element is applied.

In an embodiment, where the bitstream further includes a reference layer syntax element, where the layer with index j is a reference layer for the layer with index i includes: the value of the reference layer syntax element specifying the layer with index j is a direct reference layer for the layer with index i.

According to a twentieth aspect, a method for decoding a coded video bitstream is provided. The method may be performed by an apparatus for decoding a coded video bitstream, the method includes: parsing a first syntax element used to derive the maximum allowed number of layers; when a first condition is satisfied, predicting a picture of a current layer on condition that the value of a second syntax element specifying a third syntax element is not present in the coded video bitstream, where the first condition includes the value of the first syntax element specifies that the maximum allowed number of layers is 1.

In an embodiment, where the first syntax element is included in a VPS of the coded video bitstream and is used to derive the maximum allowed number of layers in each CVS referring to the VPS.

In an embodiment, where predicting a picture of a current layer with index on condition that the value of a second syntax element specifying the third syntax element is not present in the coded video bitstream includes: predicting a picture of a current layer with index on condition that the value of a second syntax element specifying the third syntax element is not present in PHs referring to a SPS of the coded video bitstream, and the second syntax element is included in the SPS.

In an embodiment, where the method further includes: when a first condition is satisfied, determining the value of value of the second syntax element specifying the third syntax element is not present in the coded video bitstream.

In an embodiment, the third syntax element specifies whether the syntax element of the POC MSB value of the current picture is present in a PH, and the third syntax element is included in the PH.

According to a twenty-first aspect, a method for decoding a coded video bitstream is provided. The method is performed by an apparatus for decoding a coded video bitstream, the method includes: parsing a first syntax element specifying whether the layer with index i use inter-layer prediction, i is integer and i is larger than 0; when a first condition comparing the value of the first syntax element specifies that the layer with index j is a direct reference layer for the layer with index i is satisfied, predicting a picture of the layer with index i on condition that the value of a chroma format related syntax element of the layer with index i is the same as the value of a chroma format related syntax element of the layer with index j, where the first condition j is integer and j is larger than 0.

In an embodiment, the method further includes: when the first condition comparing is satisfied, determining that the value of a chroma format related syntax element of the layer with index i is the same as the value of a chroma format related syntax element of the layer with index J.

In an embodiment, where the chroma format related syntax element includes chroma_format_idc or separate colour_plane_flag.

According to a twenty-second aspect, a method for decoding a coded video bitstream is provided. The method may be performed by an apparatus for decoding a coded video bitstream, the method includes: parsing a first syntax element specifying whether the layer with index i use inter-layer prediction, i is integer and i is larger than 0; when a first condition including the value of the first syntax element specifies that the layer with index j is a direct reference layer for the layer with index i is satisfied, predicting a picture of the layer with index i on condition that the value of a bit depth related syntax element of the layer with index i is the same as the value of a bit depth related syntax element of the layer with index j, where the first condition j is integer and j is larger than 0.

In an embodiment, the method further includes: when the first condition including is satisfied, determining that the value of a bit depth related syntax element of the layer with index i is the same as the value of a bit depth related syntax element of the layer with index j.

In an embodiment, where the bit depth related syntax element includes bit_depth_minus8.

According to a twenty-third aspect, a method for decoding a coded video bitstream is provided. The method may be performed by an apparatus for decoding a coded video bitstream, the method includes: deriving the maximum allowed number of layers; when a first condition is satisfied, predicting a picture of a current layer on condition that the value of a first syntax element specifying a second syntax element is not present in the coded video bitstream, where the first condition includes the value of the f maximum allowed number of layers is 1.

According to a twenty-fourth aspect, a method for decoding a coded video bitstream is provided. The method is performed by an apparatus for decoding a coded video bitstream, the method includes: obtaining the number of layers of the video bitstream; when a first condition including the number of the layers is more than 1 is satisfied, predicting pictures of the layers with the same values of a chroma format related syntax elements.

In an embodiment, where the method further including: when the first condition is satisfied, determining that the values of a chroma format related syntax elements of the layers are the same.

In an embodiment, where the chroma format related syntax element includes chroma_format_idc or separate colour_plane_flag.

In an embodiment, where the obtaining the number of layers of the video bitstream includes: parsing a syntax element used to derive the maximum allowed number of layers to obtain the number of layers (for example, vps_max_layers_minus1).

According to a twenty-fifth aspect, a method for decoding a coded video bitstream is provided. The method is performed by an apparatus for decoding a coded video bitstream, the method includes: obtaining the number of layers of the video bitstream; when a first condition including the number of the layers is more than 1 is satisfied, predicting pictures of the layers with the same values of a bit depth related syntax elements.

In an embodiment, the method further includes: when the first condition is satisfied, determining that the values of a bit depth related syntax elements of the layers are the same.

In an embodiment, where the bit depth related syntax element includes bit_depth_minus8.

In an embodiment, where the obtaining the number of layers of the video bitstream includes: parsing a syntax element used to derive the maximum allowed number of layers to obtain the number of layers (for example, vps_max_layers_minus1).

According to a twenty-sixth aspect, a decoder including processing circuitry for carrying out the method according to any one of twenty-first aspect to twenty-fifth aspect is provided.

According to a twenty-seventh aspect, a computer program product including program code for performing the method according to any one of twenty-first aspect to twenty-fifth aspect when executed on a computer or a processor is provided.

According to a twenty-eighth aspect, a decoder is provided. The decoder includes: one or more processors; and a non-transitory computer-readable storage medium coupled to the processors and storing programming for execution by the processors, where the programming, when executed by the processors, configures the decoder to carry out the method according to any one of twenty-first aspect to twenty-fifth aspect.

According to a twenty-ninth aspect, a non-transitory computer-readable medium carrying a program code which, when executed by a computer device, causes the computer device to perform the method of any one of twenty-first aspect to twenty-fifth aspect is provided.

Details of one or more embodiments are set forth in the accompanying drawings and the description below. Other features, objects, and advantages will be apparent from the description, drawings, and claims.

According to the embodiment of the present application, a reference layer syntax element is obtained by parsing the coded video bitstream, where the value of the reference layer syntax element specifying whether a layer with index k is a direct reference layer for a layer with index i, where both i and k are integers and are larger than or equal to 0; determining whether the layer with index j is a reference layer for the layer with index i based on the value of the reference layer syntax element, where the layer with index j is a reference layer for the layer with index k, where j is an integer and is larger than or equal to 0; and in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i, the constraint of the format of current layer and reference layer for inter-layer prediction is achieved, thereby making the design simple.

BRIEF DESCRIPTION OF DRAWINGS

In the following embodiments of the disclosure are described in more detail with reference to the attached figures and drawings, in which:

FIG. 6 is an illustrative diagram showing scalable coding with 2 layers;

FIG. 7 is a schematic flowchart showing a method for decoding a coded video bitstream according to an embodiment;

FIG. 8 is a schematic flowchart showing a method for decoding a coded video bitstream according to an embodiment;

Figure 1A:
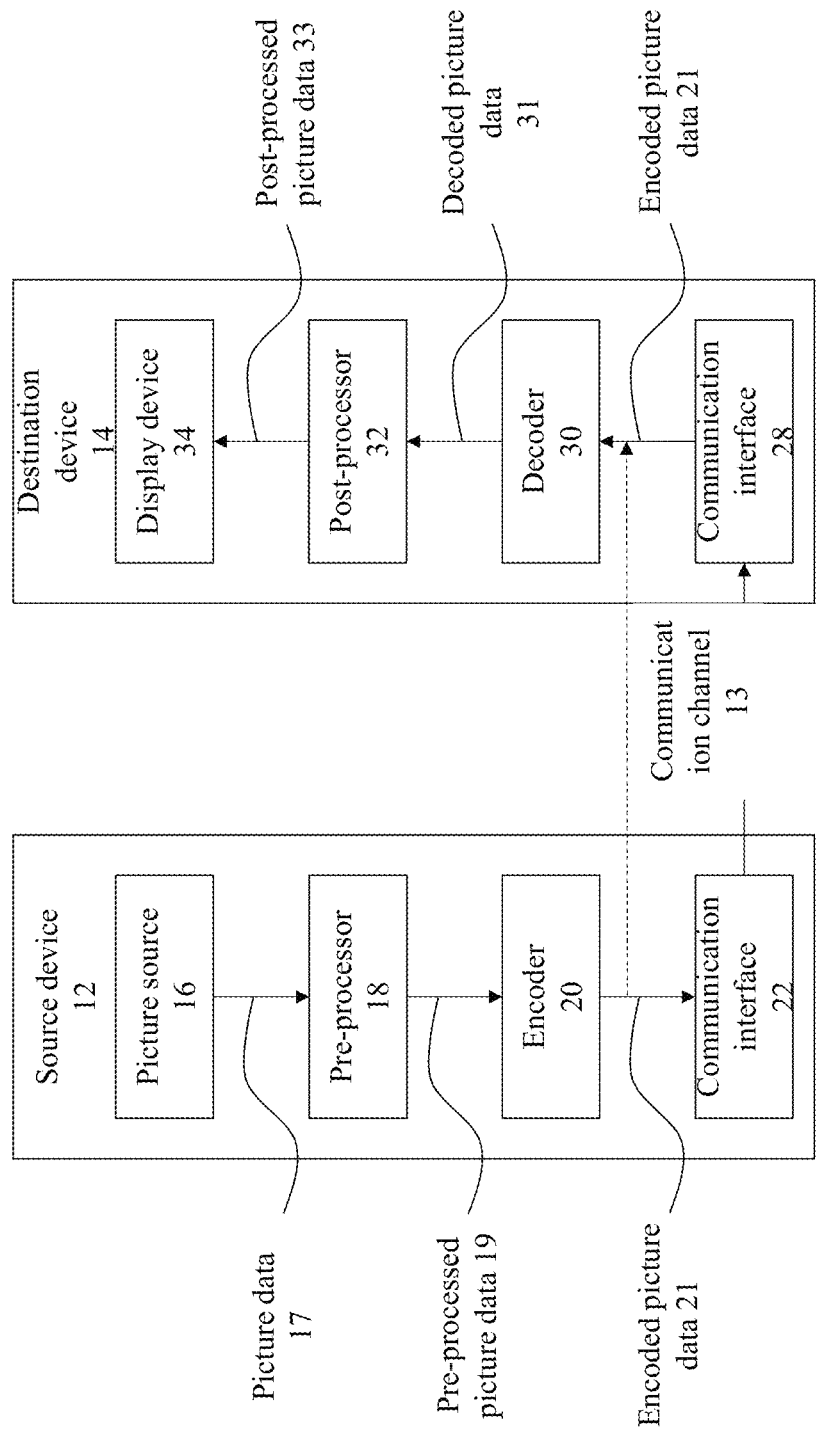
FIG. 1A is a block diagram showing an example of a video coding system according to an embodiment.

In the following identical reference signs refer to identical or at least functionally equivalent features if not explicitly specified otherwise.

DETAILED DESCRIPTION

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and include structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) includes two parts video encoding and video decoding. Video encoding is performed at the source side, typically including processing (e.g. by compression) the original video pictures to reduce the amount of data required for representing the video pictures (for more efficient storage and/or transmission). Video decoding is performed at the destination side and typically includes the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 includes a source device 12 configured to provide encoded picture data 21 e.g. to a destination device 14 for decoding the encoded picture data 13.

The source device 12 includes an encoder 20, and may additionally include a picture source 16, a pre-processor (or pre-processing unit) 18, e.g. a picture pre-processor 18, and a communication interface or communication unit 22.

The picture source 16 may include or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., include trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 includes a decoder 30 (e.g. a video decoder 30), and may additionally include a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may include, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or include any kind of display for representing the reconstructed picture, e.g. an integrated or external display or monitor. The displays may, e.g. include liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also include both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
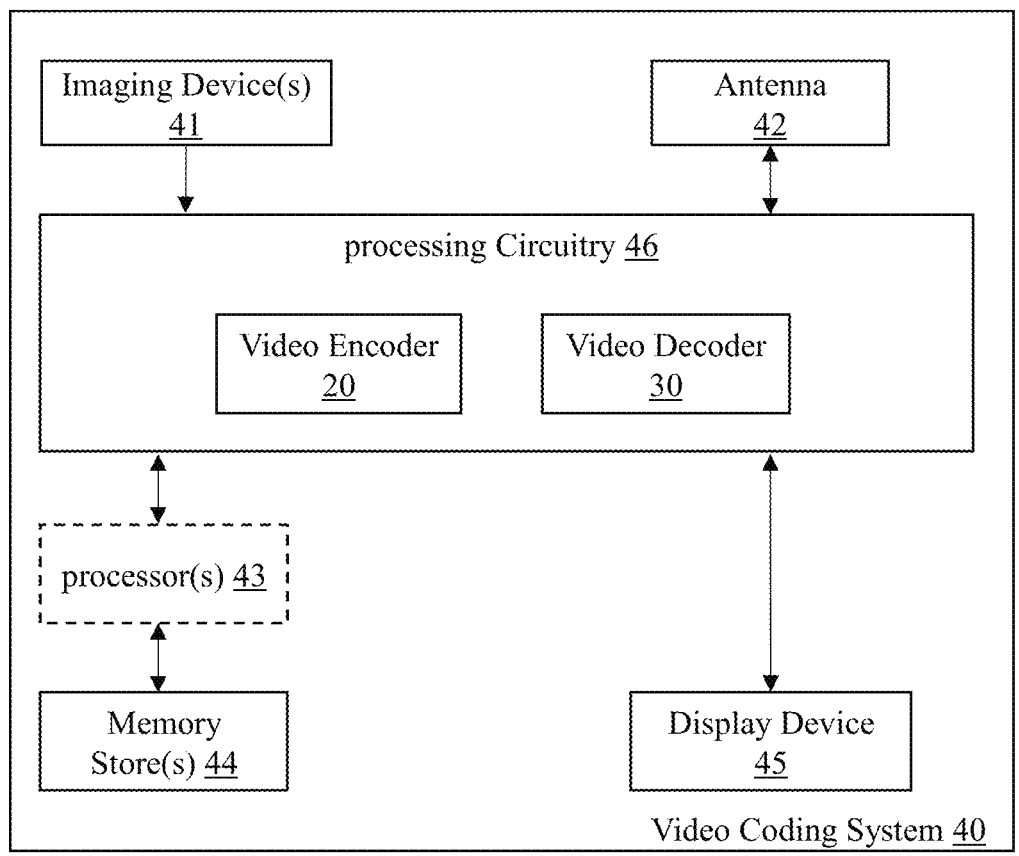
FIG. 1B is a block diagram showing another example of a video coding system according to an embodiment.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may include any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
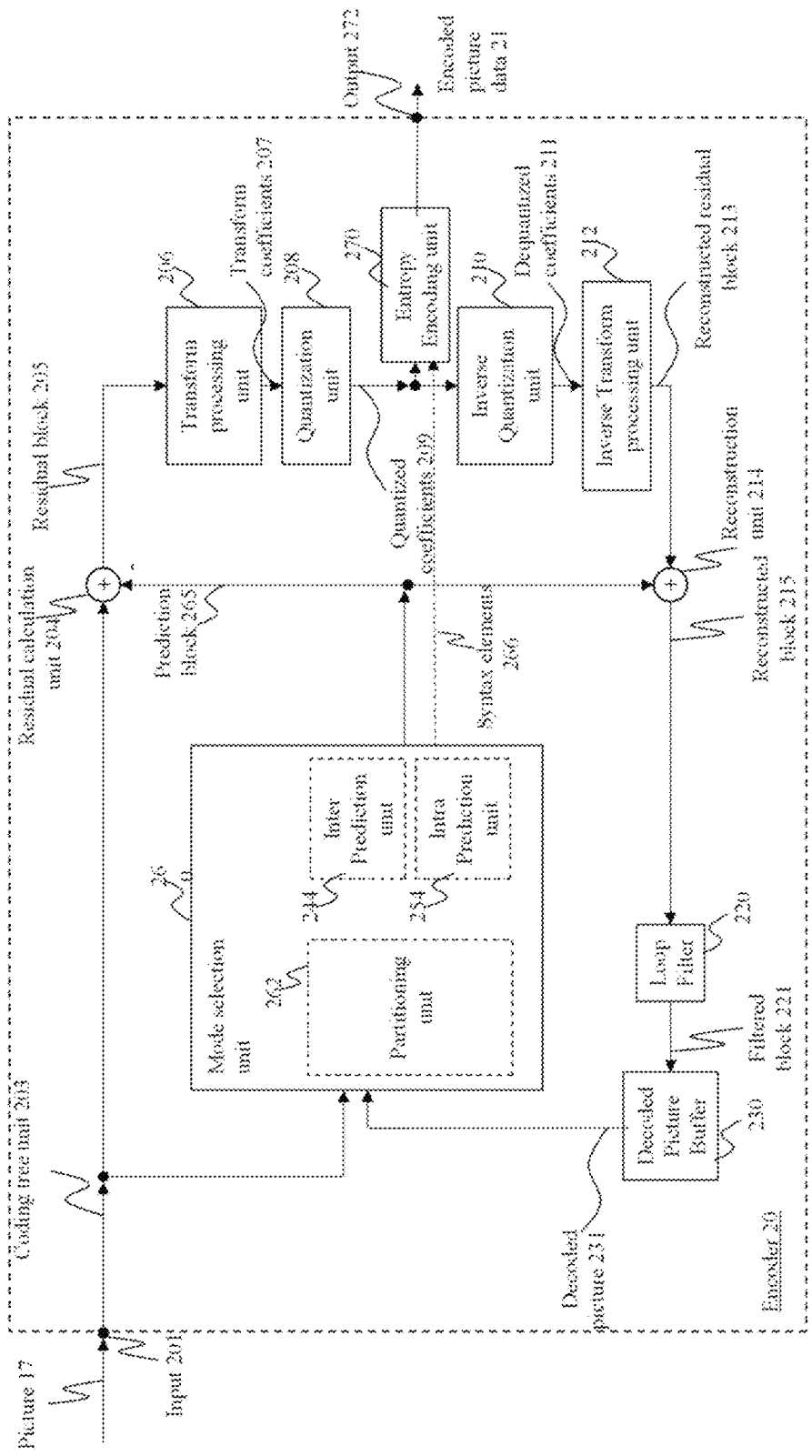
FIG. 2 is a block diagram showing an example of a video encoder according to an embodiment.

FIG. 2 shows a schematic block diagram of an example video encoder 20 that is configured to implement the techniques of the present application. In the example of FIG. 2, the video encoder 20 includes an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
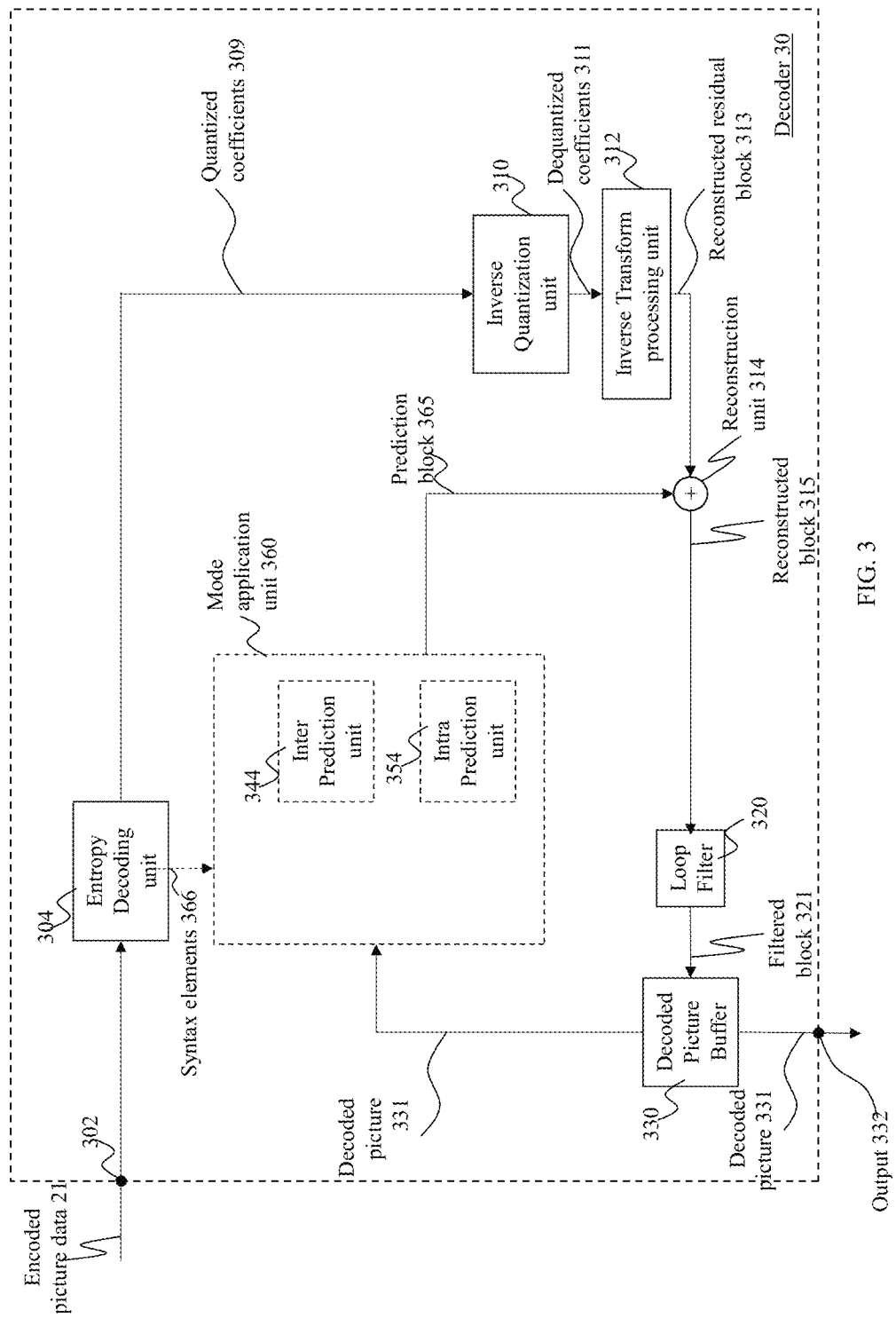
FIG. 3 is a block diagram showing an example structure of a video decoder according to an embodiment.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, where the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also includes the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture includes a corresponding red, green and blue sample array. However, in video coding each pixel is typically represented in a luminance and chrominance format or color space, e.g. YCbCr, which includes a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format includes a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may include only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may include a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may include, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), where a picture may be partitioned into or encoded using one or more slices (typically non-overlapping), and each slice may include one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), where a picture may be partitioned into or encoded using one or more slices/tile groups (typically non-overlapping), and each slice/tile group may include, e.g. one or more blocks (e.g. CTUs) or one or more tiles, where each tile, e.g. may be of rectangular shape and may include one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, where the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may include one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may include a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 includes partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, where the mode selection includes the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, where a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), where these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or include a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or include a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU. VVC develops a unique signaling mechanism of the partition splitting information in quadtree with nested multi-type tree coding tree structure. In the signalling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may include, e.g., intra-prediction modes and/or inter-prediction modes.

Intra-Prediction

The set of intra-prediction modes may include 35 different intra-prediction modes, e.g. non-directional modes like DC (or mean) mode and planar mode, or directional modes, e.g. as defined in HEVC, or may include 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and merge flag to specify whether MMVD mode is used for a CU. And a CU-level adaptive motion vector resolution (AMVR) scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may include the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream includes information for decoding the encoded picture data, e.g. data that represents picture blocks of an encoded video slice (and/or tile groups or tiles) and associated syntax elements.

In the example of FIG. 3, the decoder 30 includes an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may include one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may include a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 331, e.g. via output 332, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), where a picture may be partitioned into or decoded using one or more slices (typically non-overlapping), and each slice may include one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), where a picture may be partitioned into or decoded using one or more slices/tile groups (typically non-overlapping), and each slice/tile group may include, e.g. one or more blocks (e.g. CTUs) or one or more tiles, where each tile, e.g. may be of rectangular shape and may include one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{(bitDepth-1)}$ $2^{(bitDepth-1)}-1$, where "^" means exponentiation. For example, if bitDepth is set equal to 16, the range is −32768~32767; if bitDepth is set equal to 18, the range is −131072-131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
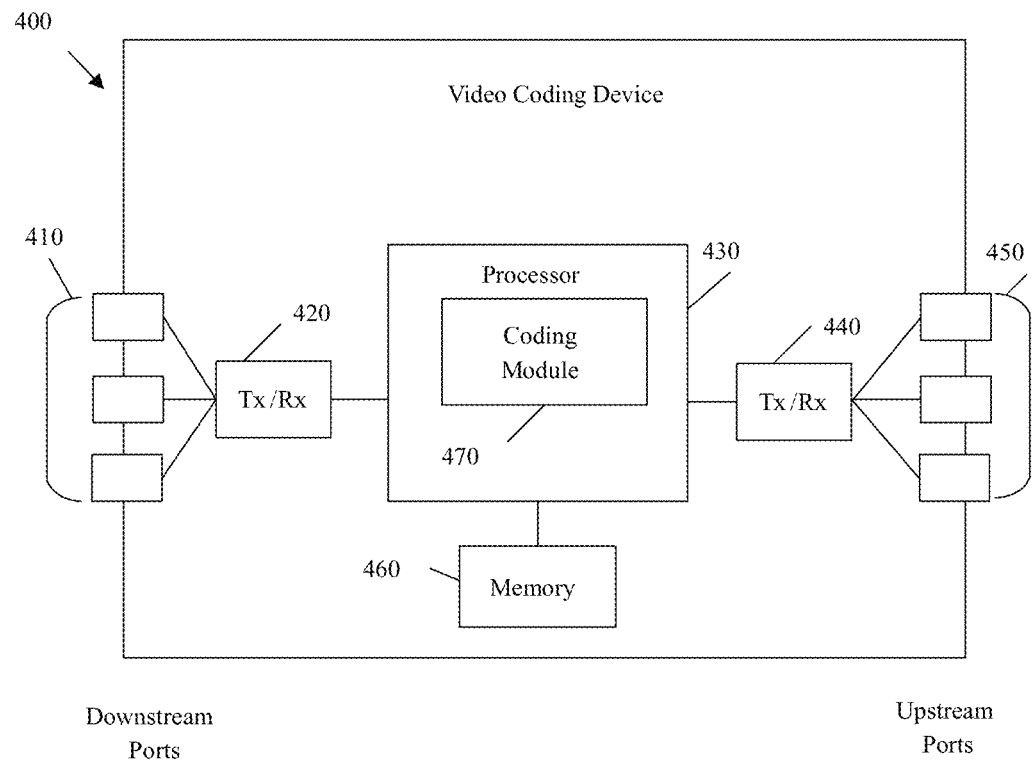
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 includes ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also include optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 includes a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may include one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
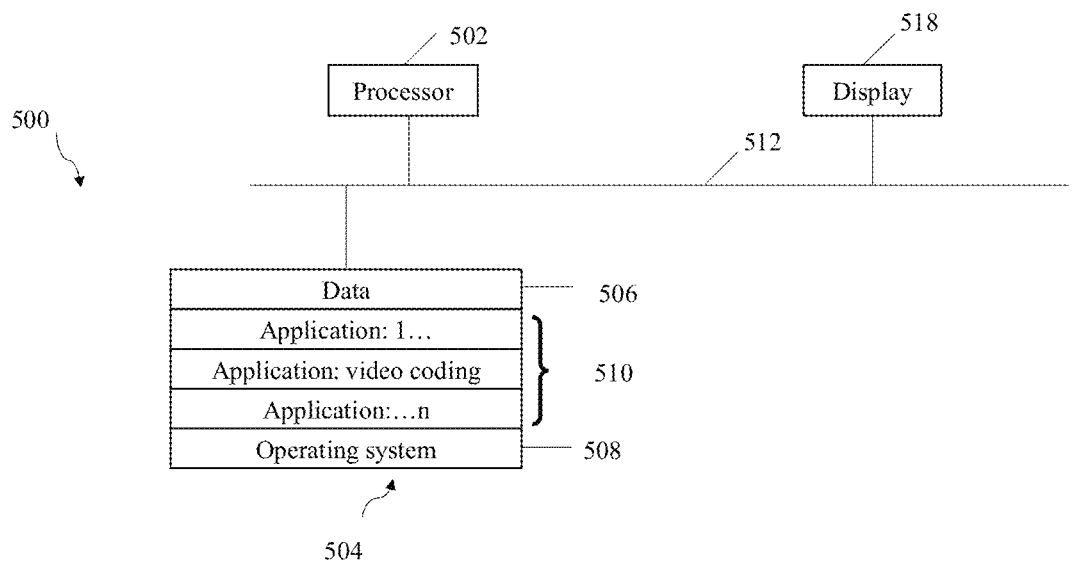
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can include a single integrated unit such as a memory card or multiple units such as multiple memory cards. The apparatus 500 can thus be implemented in a wide variety of configurations.

Scalable Coding

Scalable coding including quality scalable (PSNR scalable), spatial scalable, et. al. For example, as FIG. 6 shown, a sequence can be down-sampled to a low spatial resolution version. Both the low spatial resolution version and the original spatial resolution (high spatial resolution) version will be encoded. And generally, the low spatial resolution will be coded firstly, and it will be used for reference for the later coded high spatial resolution.

To describe the information of the layers (number, dependency, outputting), there is a VPS (Video Parameter Set) defined as following:

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0  &&  vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i  <=  vps_max_layers_minus1; i++ ) { | |
|     vps_layer_id[ i ] | u(6) |
|     if( i > 0  &&  !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_ref_layer_flag[ i ][ j ] | u(1) |
|     } | |
|   } | |
|   if( vps_max_layers_minus1 > 0 ) { | |
|     if( vps_all_independent_layers_flag) | |
|       each_layer_is_an_ols_flag | u(1) |

-continued

| | Descriptor |
|---|---|
| if( !each_layer_is_an_ols_flag ) { | |
|   if( !vps_all_independent_layers_flag ) | |
|     ols_mode_idc | u(2) |
|   if( ols_mode_idc  ==  2 ) { | |
|     num_output_layer_sets_minus1 | u(8) |
|     for( i = 1; i  <=   num_output_layer_sets_minus1; i ++) | |
|       for( j = 0; j  <=  vps_max_layers_minus1; j++ ) | |
|         ols_output_layer_flag[ i ][ j ] | u(1) |
|   } | |
| } | |
| } | |
| vps_num_ptls | u(8) |
| for( i = 0 ; i < vps_num_ptls; i++) { | |
|   if( i > 0) | |
|     pt_present_flag[ i ] | u(1) |
|   if( vps_max_sublayers_minus1 >  0 && !vps_all_layers_same_num_sublayers_flag ) | |
|     ptl_max_temporal_id[ i ] | u(3) |
| } | |
| while( !byte_aligned( ) ) | |
|   vps_ptl_byte_alignment_zero_bit /* equal to 0 */ | u(1) |
| for( i =0; i < vps_num_ptls; i++ ) | |
|   profile_tier_level( pt_present_flag[ i ], ptl_max_temporal_id[ i ] ) | |
| for( i = 0; i < TotalNumOlss; i++ ) | |
|   if( NumLayersInOls[ i ] > 1   && vps_num_ptls > 1 ) | |
|     ols_ptl_idx[ i ] | u(8) |
| if( !vps_all_independent_layers_flag) | |
|   vps_num_dpb_params | ue(v) |
| if( vps_num_dpb_params > 0) { | |
|   same_dpb_size_output_or_nonoutput_flag | u(1) |
|   if( vps_max_sublayers_minus1 > 0 ) | |
|     vps_sublayer_dpb_params_present_flag | u(1) |
| } | |
| for( i = 0; i < vps_num_dpb_params; i++ ) { | |
|   dpb_size_only_flag[ i ] | u(1) |
|   if( vps_max_sublayers_minus1 > 0  && !vps_all_layers_same_num_sublayers_flag ) | |
|     dpb_max_temporal_id[ i ] | u(3) |
|   dpb_parameters( dpb_size_only_flag[ i ], dpb_max_temporal_id[ i ], | |
|       vps_sublayer_dpb_params_present_flag ) | |
| } | |
| for( i = 0; i < vps_max_layers_minus1   &&   vps_num_dpb_params > 1; i++) { | |
|   if( !vps_independent_layer_flag[ i ] ) | |
|     layer_output_dpb_params_idx[ i ] | ue(v) |
|   if( LayerUsedAsRefLayerFlag[ i ]   && !same_dpb_size_output_or_nonoutput_flag ) | |
|     layer_nonoutput_dpb_params_idx[ i ] | ue(v) |
| } | |
| vps_general_hrd_params_present_flag | u(1) |
| if( vps_general_hrd_params_present_flag ) { | |
|   general_hrd_parameters( ) | |
|   if( vps_max_sublayers_minus1 > 0 ) | |
|     vps_sublayer_cpb_params_present_flag | u(1) |
|   if( TotalNumOlss > 1 ) | |
|     num_ols_hrd_params_minus1 | ue(v) |
|   for( i = 0; i  <=   num_ols_hrd_params_minus1; i++ ) { | |
|     if( vps_max_sublayers_minus1 > 0   && !vps_all_layers_same_num_sublayers_flag ) | |
|       hrd_max_tid[ i ] | u(3) |
|     firstSubLayer = vps_sublayer_cpb_params_present_flag ? 0 : hrd_max_tid[ i ] | |
|     ols_hrd_parameters( firstSubLayer, hrd_max_tid[ i ] ) | |
|   } | |
|   if( num_ols_hrd_params_minus1 > 0 ) | |
|     for( i = 1; i < TotalNumOlss; i++ ) | |
|       ols_hrd_idx[ i ] | ue(v) |
| } | |
| vps_extension_flag | u(1) |
| if( vps_extension_flag ) | |
|   while( more_rbsp_data( ) ) | |
|     vps_extension_data_flag | u(1) |
| rbsp_trailing_bits( ) | |
| } | |

A VPS RBSP shall be available to the decoding process prior to it being referenced, included in at least one AU with TemporalId equal to 0 or provided through external means. All VPS NAL units with a particular value of vps_video_parameter_set_id in a CVS shall have the same content.

vps_video_parameter_set_id provides an identifier for the VPS for reference by other syntax elements. The value of vps_video_parameter_set_id shall be greater than 0.

vps_max_layers_minus1 plus 1 specifies the maximum allowed number of layers in each CVS referring to the VPS.

vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.

vps_all_layers_same_num_sublayers_flag equal to 1 specifies that the number of temporal sublayers is the same for all the layers in each CVS referring to the VPS. vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.

vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1.

vps_layer_id[i] specifies the nuh_layer_id value of the i-th layer. For any two non-negative integer values of m and n, when m is less than n, the value of vps_layer_id[m] shall be less than vps_layer_id[n].

vps_independent_layer_flag[i] equal to 1 specifies that the layer with index i does not use inter-layer prediction. vps_independent_layer_flag[i] equal to 0 specifies that the layer with index i may use inter-layer prediction and the syntax elements vps_direct_ref_layer_flag[i][j] for j in the range of 0 to i−1, inclusive, are present in VPS. When not present, the value of vps_independent_layer_flag[i] is inferred to be equal to 1.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.

The variables NumDirectRefLayers[i], DirectRefLayerIdx [i][d], NumRefLayers[i], RefLayerIdx[i][r], and LayerUsedAsRefLayerFlag[j] are derived as follows:

```
for( i = 0; i  <=  vps_max_layers_minus1; i++ ) {
  for( j = 0;j  <=  vps_max_layers_minus1; j++ ) {
    dependencyFlag[ i ][ j ] = vps_direct_ref_layer_flag[ i ][ j ]
    for( k = 0; k < i; k++ )
      if( vps_direc_ref_layer_flag[ i ][ k ]  &&  dependencyFlag[ k ][ j
] )
        dependencyFlag[ i ][ j ] = 1
  }
  LayerUsedAsRefLayerFlag[ i ] = 0
}
```

-continued

```
for( i = 0; i  <=  vps_max_layers_minus1; i++ ) {
  for( j = 0, d = 0, r = 0;j  <=  vps_max_layers_minus1; j++ ) {
(37)
    if( direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The variable GeneralLayerIdx[i], specifying the layer index of the layer with nuh_layer_id equal to vps_layer_id[i], is derived as follows:

```
for( i = 0; i  <=  vps_max_layers_minus1; i++ )
    (38)
  GeneralLayerIdx[ vps_layer_id[ i ] ] = i
``` each_layer_is_an_ols_flag equal to 1 specifies that each OLS contains only one layer and each layer itself in a CVS referring to the VPS is an OLS with the single included layer being the only output layer. each_layer_is_an_ols_flag equal to 0 that an OLS may contain more than one layer. If vps_max_layers_minus1 is equal to 0, the value of each_layer_is_an_ols_flag is inferred to be equal to 1. Otherwise, when vps_all_independent_layers_flag is equal to 0, the value of each_layer_is_an_ols_flag is inferred to be equal to 0.

ols_mode_idc equal to 0 specifies that the total number of OLSs specified by the VPS is equal to vps_max_layers_minus1+1, the i-th OLS includes the layers with layer indices from 0 to i, inclusive, and for each OLS only the highest layer in the OLS is output.

ols_mode_idc equal to 1 specifies that the total number of OLSs specified by the VPS is equal to vps_max_layers_minus1+1, the i-th OLS includes the layers with layer indices from 0 to i, inclusive, and for each OLS all layers in the OLS are output.

ols_mode_idc equal to 2 specifies that the total number of OLSs specified by the VPS is explicitly signalled and for each OLS the output layers are explicitly signalled and other layers are the layers that are direct or indirect reference layers of the output layers of the OLS.

The value of ols_mode_idc shall be in the range of 0 to 2, inclusive. The value 3 of ols_mode_idc is reserved for future use by ITU-T ISO/IEC.

When vps_all_independent_layers_flag is equal to 1 and each_layer_is_an_ols_flag is equal to 0, the value of ols_mode_idc is inferred to be equal to 2.

num_output_layer_sets_minus1 plus 1 specifies the total number of OLSs specified by the VPS when ols_mode_idc is equal to 2.

The variable TotalNumOlss, specifying the total number of OLSs specified by the VPS, is derived as follows:

```
if( vps_max_layers_minus1  = =  0 )
    TotalNumOlss = 1
else if( each_layer_is_an_ols_flag  | |  ols mode idc  = =  0  | |  ols_mode_idc
 = =  1 )
    TotalNumOlss = vps_max_layers_minus1 + 1                           (39)
else if( ols_mode_idc  = =  2 )
    TotalNumOlss = num_output_layer_sets_minus1 + 1
``` ols_output_layer_flag[i][j] equal to 1 specifies that the layer with nuh_layer_id equal to vps_layer_id[j] is an output layer of the i-th OLS when ols_mode_idc is equal to 2. ols_output_layer_flag[i][j] equal to 0 specifies that the layer with nuh_layer_id equal to vps_layer_id[j] is not an output layer of the i-th OLS when ols_mode_idc is equal to 2.

The variable NumOutputLayersInOls[i], specifying the number of output layers in the i-th OLS, and the variable OutputLayerIdInOls[i][j], specifying the nuh_layer_id value of the j-th output layer in the i-th OLS, are derived as follows:

```
NumOutputLayersInOls[ 0 ] = 1
OutputLayerIdInOls[ 0 ][ 0 ] = vps_layer_id[ 0 ]
for( i = 1; i < TotalNumOlss; i++ ) {
    if( each_layer_is_an_ols_flag  | |  ols_mode_idc  = =  0 ) {
        NumOutputLayersInOls[ i ] = 1
        OutputLayerIdInOls[ i ][ 0 ] = vps_layer_id[ i ]
    } else_if( ols_mode idc  = =  1 ) {
        NumOutputLayersInOls[ i ] = i + 1
        for( j = 0; j < NumOutputLayersInOls[ i ]; j++ )
            OutputLayerIdInOls[ i ][ j ] = vps_layer_id[ j ]
    } else_if( ols_mode idc  = =  2 ) {
        for( j = 0; j  <=  vps_max_layers_minus1; j++ )
            layerIncludedInOlsFlag[ i ][ j ] = 0
        for( k = 0, j = 0; k  <=  vps_max_layers_minus1; k++ )      (40)
            if( ols_output_layer_flag[ i ][ k ] ) {
                layerIncludedInOlsFlag[ i ][ k ] = 1
                OutputLayerIdx[ i ][ j ] = k
                OutputLayerIdInOls[ i ][ j++ ] = vps_layer_id[ k ]
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ )
                layerIncludedInOlsFlag[ i ][ RefLayerIdx[ idx ][ k ] ] = 1
        }
    }
}
```

For each OLS, there shall be at least one layer that is an output layer. In other words, for any value of i in the range of 0 to TotalNumOlss−1, inclusive, the value of NumOutputLayersInOls[i] shall be greater than or equal to 1.

The variable NumLayersInOls[i], specifying the number of layers in the i-th OLS, and the variable LayerIdInOls[i][j], specifying the nuh_layer_id value of the j-th layer in the i-th OLS, are derived as follows:

```
NumLayersInOls[ 0 ] = 1
LayerIdInOls[ 0 ][ 0 ] = vps_layer_id[ 0 ]
for( i = 1; i < TotalNumOlss; i++ ) {
    if( each_layer_is_an_ols_flag ) {
        NumLayersInOls[ i ] = 1
        LayerIdInOls[ i ][ 0 ] = vps_layer_id[ i ]
        (41)
    } else if( ols_mode_idc  = =   0  | |  ols_mode_idc  = =  1 ) {
        NumLayersInOls[ i ] = i + 1
        for( j = 0; j < NumLayersInOls[ i ]; j++ )
            LayerIdInOls[ i ][ j ] = vps_layer_id[ j ]
```

```
    } else if( ols_mode_idc  = =  2 ) {
        for( k = 0, j = 0; k  <=  vps_max_layers_minus1; k++ )
            if( layerIncludedInOlsFlag[ i ][ k ] )
                LayerIdInOls[ i ][ j++ ] = vps_layer_id[ k ]
        NumLayersInOls[ i ] = j
    }
}
```

NOTE 1—The 0-th OLS contains only the lowest layer (i.e., the layer with nuh_layer_id equal to vps_layer_id [0]) and for the 0-th OLS the only included layer is output.

The variable OlsLayeIdx[i][j], specifying the OLS layer index of the layer with nuh_layer_id equal to LayerIdInOls [i][j], is derived as follows:

```
for( i = 0; i < TotalNumOlss; i++ )
    for j = 0;j < NumLayersInOls[ i ]; j++ )
        (42)
        OlsLayeIdx[ i ][ LayerIdInOls[ i ][ j ] ] = j
```

The lowest layer in each OLS shall be an independent layer. In other words, for each i in the range of 0 to TotalNumOlss−1, inclusive, the value of vps_independent_layer_flag[GeneralLayerIdx[LayerIdInOls[i][0]]] shall be equal to 1.

Each layer shall be included in at least one OLS specified by the VPS. In other words, for each layer with a particular value of nuh_layer_id nuhLayerId equal to one of vps_layer_id[k] for k in the range of 0 to vps_max_layers_minus1, inclusive, there shall be at least one pair of values of i and j, where i is in the range of 0 to TotalNumOlss−1, inclusive, and j is in the range of NumLayersInOls[i]−1, inclusive, such that the value of LayerIdInOls[i][j] is equal to nuhLayerId.

vps_num_ptls specifies the number of profile_tier_level( ) syntax structures in the VPS.

pt_present_flag[i] equal to 1 specifies that profile, tier, and general constraints information are present in the i-th profile_tier_level( ) syntax structure in the VPS. pt_present_flag[i] equal to 0 specifies that profile, tier, and general constraints information are not present in the i-th profile_tier_level( ) syntax structure in the VPS. The value of pt_present_flag[0] is inferred to be equal to 1. When pt_present_flag[i] is equal to 0, the profile, tier, and general constraints information for the i-th profile_tier_level( ) syntax structure in the VPS are inferred to be the same as that for the (i−1)-th profile_tier_level( ) syntax structure in the VPS.

ptl_max_temporal_id[i] specifies the TemporalId of the highest sublayer representation for which the level information is present in the i-th profile_tier_level( ) syntax structure in the VPS. The value of ptl_max_temporal_id[i] shall be in the range of 0 to vps_max_sublayers_minus1, inclusive. When vps_max_sublayers_minus1 is equal to 0, the value of ptl_max_temporal_id[i] is inferred to be equal to 0. When vps_max_sublayers_minus1 is greater than 0 and vps_ all_layers_same_num_sublayers_flag is equal to 1, the value of ptl_max_temporal_id[i] is inferred to be equal to vps_max_sublayers_minus1.

vps_ptl_byte_alignment_zero_bit shall be equal to 0.

ols_ptl_idx[i] specifies the index, to the list of profile_tier_level( ) syntax structures in the VPS, of the profile_tier_level( ) syntax structure that applies to the i-th OLS when NumLayersInOls[i] is greater than 1. When present, the value of ols_ptl_idx[i] shall be in the range of 0 to vps_num_ptls−1, inclusive.

When NumLayersInOls[i] is equal to 1, the profile_tier_level( ) syntax structure that applies to the i-th OLS is present in the SPS referred to by the layer in the i-th OLS.

vps_num_dpb_params specifies the number of dpb_parameters( ) syntax structures in the VPS. The value of vps_num_dpb_params shall be in the range of 0 to 16, inclusive. When not present, the value of vps_num_dpb_params is inferred to be equal to 0.

same_dpb_size_output_or_nonoutput_flag equal to 1 specifies that there is no layer_nonoutput_dpb_params_idx[i] syntax element present in the VPS. same_dpb_size_output_or_nonoutput_flag equal to 0 specifies that there may or may not be layer_nonoutput_dpb_params_idx[i] syntax elements present in the VPS.

vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax structures in the VPS. When not present, vps_sub_dpb_params_info_present_flag is inferred to be equal to 0.

dpb_size_only_flag[i] equal to 1 specifies that the max_num_reorder_pics[ ] and max_latency_increase_plus1[ ] syntax elements are not present in the i-th dpb_parameters( ) syntax structures the VPS. dpb_size_only_flag[i] equal to 0 specifies that the max_num_reorder_pics[ ] and max_latency_increase_plus1[ ] syntax elements may be present in the i-th dpb_parameters( ) syntax structures the VPS.

dpb_max_temporal_id[i] specifies the TemporalId of the highest sublayer representation for which the DPB parameters may be present in the i-th dpb_parameters( ) syntax structure in the VPS. The value of dpb_max_temporal_id[i] shall be in the range of 0 to vps_max_sublayers_minus1, inclusive. When vps_max_sublayers_minus1 is equal to 0, the value of dpb_max_temporal_id[i] is inferred to be equal to 0. When vps_max_sublayers_minus1 is greater than 0 and vps_all_layers_same_num_sublayers_flag is equal to 1, the value of dpb_max_temporal_id[i] is inferred to be equal to vps_max_sublayers_minus1.

layer_output_dpb_params_idx[i] specifies the index, to the list of dpb_parameters( ) syntax structures in the VPS, of the dpb_parameters( ) syntax structure that applies to the i-th layer when it is an output layer in an OLS. When present, the value of layer_output_dpb_params_idx[i] shall be in the range of 0 to vps_num_dpb_params−1, inclusive.

If vps_independent_layer_flag[i] is equal to 1, the dpb_parameters( ) syntax structure that applies to the i-th layer when it is an output layer is the dpb_parameters( ) syntax structure present in the SPS referred to by the layer.

Otherwise (vps_independent_layer_flag[i] is equal to 0), the following applies:
    When vps_num_dpb_params is equal to 1, the value of layer_output_dpb_params_idx[i] is inferred to be equal to 0.

It is a requirement of bitstream conformance that the value of layer_output_dpb_params_idx[i] shall be such that dpb_size_only_flag[layer_output_dpb_params_idx[i]] is equal to 0.

layer_nonoutput_dpb_params_idx[i] specifies the index, to the list of dpb_parameters( ) syntax structures in the VPS, of the dpb_parameters( ) syntax structure that applies to the i-th layer when it is a non-output layer in an OLS. When present, the value of layer_nonoutput_dpb_params_idx[i] shall be in the range of 0 to vps_num_dpb_params−1, inclusive.

If same_dpb_size_output_or_nonoutput_flag is equal to 1, the following applies:
    If vps_independent_layer_flag[i] is equal to 1, the dpb_parameters( ) syntax structure that applies to the i-th layer when it is a non-output layer is the dpb_parameters( ) syntax structure present in the SPS referred to by the layer.
    Otherwise (vps_independent_layer_flag[i] is equal to 0), the value of layer_nonoutput_dpb_params_idx[i] is inferred to be equal to layer_output_dpb_params_idx[i].

Otherwise (same_dpb_size_output_or_nonoutput_flag is equal to 0), when vps_num_dpb_params is equal to 1, the value of layer_output_dpb_params_idx[i] is inferred to be equal to 0.

vps_general_hrd_params_present_flag equal to 1 specifies that the syntax structure general_hrd_parameters( ) and other HRD parameters are present in the VPS RBSP syntax structure. vps_general_hrd_params_present_flag equal to 0 specifies that the syntax structure general_hrd_parameters( ) and other HRD parameters are not present in the VPS RBSP syntax structure.

vps_sublayer_cpb_params_present_flag equal to 1 specifies that the i-th ols_hrd_parameters( ) syntax structure in the VPS contains HRD parameters for the sublayer representations with TemporalId in the range of 0 to hrd_max_tid[i], inclusive.

vps_sublayer_cpb_params_present_flag equal to 0 specifies that the i-th ols_hrd_parameters( ) syntax structure in the VPS contains HRD parameters for the sublayer representation with TemporalId equal to hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to 0, the HRD parameters for the sublayer representations with TemporalId in the range of 0 to hrd_max_tid[i]−1, inclusive, are inferred to be the same as that for the sublayer representation with TemporalId equal to hrd_max_tid[i]. These include the HRD parameters starting from the fixed_pic_rate_general_flag[i] syntax element till the sublayer_hrd_parameters(i) syntax structure immediately under the condition "if(general_vcl_hrd_params_present_flag)" in the ols_hrd_parameters syntax structure.

num_ols_hrd_params_minus1 plus 1 specifies the number of ols_hrd_parameters( ) syntax structures present in the general_hrd_parameters( ) syntax structure. The value of num_ols_hrd_params_minus1 shall be in the range of 0 to 63, inclusive. When TotalNumOlss is equal to 1, the value of num_ols_hrd_params_minus1 is inferred to be equal to 0.

hrd_max_tid[i] specifies the TemporalId of the highest sublayer representation for which the HRD parameters are contained in the i-th ols_hrd_parameters( ) syntax structure. The value of hrd_max_tid[i] shall be in the range of 0 to vps_max_sublayers_minus1, inclusive. When vps_max_sublayers_minus1 is equal to 0, the value of hrd_max_tid[i] is inferred to be equal to 0. When vps_max_sublayers_minus1 is greater than 0 and vps_all_layers_same_num_sublayers_flag is equal to 1, the value of hrd_max_tid[i] is inferred to be equal to vps_max_sublayers_minus1.

ols_hrd_idx[i] specifies the index of the ols_hrd_parameters( ) syntax structure that applies to the i-th OLS. The value of ols_hrd_idx[[i] shall be in the range of 0 to num_ols_hrd_params_minus1, inclusive. When not present, the value of ols_hrd_idx[[i] is inferred to be equal to 0.

vps_extension_flag equal to 0 specifies that no vps_extension_data_flag syntax elements are present in the VPS RBSP syntax structure. vps_extension_flag equal to 1 specifies that there are vps_extension_data_flag syntax elements present in the VPS RBSP syntax structure. vps_extension_data_flag may have any value. Its presence and value do not affect decoder conformance to profiles specified in this version of this Specification. Decoders conforming to this version of this Specification shall ignore all vps_extension_data_flag syntax elements.

DPB Management and Reference Picture Marking

To manage those reference pictures in the decoding process, the decoded pictures are needed to keep in the decoding picture buffer (DPB), for reference usage for the follow picture decoding. To indicate those pictures, their picture order count (POC) information is need to signal in the slice header directly or in directly. Generally, there are two reference picture list, list0 and list1. And, the reference picture index also needed to be included to signal the picture in the list. For uni-prediction, reference pictures are fetched from one reference picture list, for bi-prediction, reference pictures are fetched from two reference picture lists.

All the reference pictures are stored in the DPB. All the pictures in the DPB are marked as "used for long-term reference", "used for short-term reference", or "unused for reference", and only one for the three status. Once a picture is marked as "unused for reference", it will not used for reference anymore. If it also not needed storing for output, then it can be removed from the DPB. The status of the reference pictures can be signaled in the slice header, or can be derived from the slice header information.

Anew reference picture management method was proposed, called RPL (reference picture list) method. RPL will proposed whole reference picture set or sets for current coding picture, the reference picture in the reference picture set is used for current picture or future (later, or following) picture decoding. So, RPL reflect the pictures info in the DPB, even a reference picture is not used for reference for current picture, if it will used for reference for a following picture, it is needed to store in the RPL.

After a picture is reconstructed, it will be stored in the DPB, and marked as "used for short-term reference" by default. The DPB management operation will start after parsing the RPL information in the slice header.

Reference Picture List Construction

The reference picture information can be signaled via the slice header. Also, there maybe some RPL candidates in the Sequence parameters set (SPS), in this case, the slice header maybe include a RPL index to get the needed RPL information, without signaling a whole RPL syntax structure. Or, a whole RPL syntax structure can be signaled in the slice header.

Introduction of RPL Method.

To save the cost bits of RPL signaling, there maybe some RPL candidates in the SPS. A picture can use a RPL index (ref_pic_list_idx[i]) to get its RPL information from the SPS. RPL candidates are signaled as following:

| | Descriptor |
|---|---|
| seq_parameter_set_rbsp( ) { | |
| ... | |
|   rpl1_same_as_rpl0_flag | u(1) |
|   for( i = 0; i < !rpl1_same_as_rpl0_flag ? 2: 1; i++ ) { | |
|     num_ref_pic_lists_in_sps[ i ] | ue(v) |
|     for( j = 0; j < num_ref_pic_lists_in_sps[ i ]; j++ ) | |
|       ref_pic_list_struct( i, j ) | |
|   } | |
| ... | |

The semantics as follow:

rpl1_same_as_rpl0_flag equal to 1 specifies that the syntax structures num_ref_pic_lists_in_sps[1] and ref_pic_list_struct(1, rplsIdx) are not present and the following applies:

The value of num_ref_pic_lists_in_sps[1] is inferred to be equal to the value of num_ref_pic_lists_in_sps[0].

The value of each of syntax elements in ref_pic_list_struct(1, rplsIdx) is inferred to be equal to the value of corresponding syntax element in ref_pic_list_struct(0, rplsIdx) for rplsIdx ranging from 0 to num_ref_pic_lists_in_sps[0]−1.

num_ref_pic_lists_in_sps[i] specifies the number of the ref_pic_list_struct(listIdx, rplsIdx) syntax structures with listIdx equal to i included in the SPS. The value of num_ref_pic_lists_in_sps[i] shall be in the range of 0 to 64, inclusive.

Beside get the RPL information based on the RPL index from SPS, the RPL information can be signaled in the slice header.

| | Descriptor |
|---|---|
| slice_header( ) { | |
| ... | |
|   if( ( nal_unit_type != IDR_W_RADL && nal_unit_type != IDR_N_LP ) \|\| | |
|     sps_idr_rpl_present_flag ) { | |
|     for( i = 0; i < 2; i++ ) { | |
|       if( num_ref_pic_lists_in_sps[ i ] > 0 && !pps_ref_pic_list_sps_idc[ i ] && ( i == 0 \|\| ( i == 1 && rpl1_idx_present_flag ) ) ) | |
|         ref_pic_list_sps_flag[ i ] | u(1) |
|       if( ref_pic_list_sps_flag[ i ] ) { | |
|         if( num_ref_pic_lists_in_sps[ i ] > 1 && ( i == 0 \|\| ( i == 1 && rpl1_idx_present_flag ) ) ) | |
|           ref_pic_list_idx[ i ] | u(v) |

| slice_header( ) { | Descriptor |
|---|---|
|     } else | |
|       ref_pic_list_struct( i, num_ref_pic_lists_in_sps[ i ] ) | |
|       for( j = 0; j <NumLtrpEntries[ i ][ RplsIdx[ i ] ]; j++ ) { | |
|         if( ltrp_in_slice_header_flag[ i ][ RplsIdx[ i ] ] ) | |
|           slice_poc_lsb_lt[ i ][ j ] | u(v) |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
| ... | | ref_pic_list_sps_flag[i] equal to 1 specifies that reference picture list i of the current slice is derived based on one of the ref_pic_list_struct(listIdx, rplsIdx) syntax structures with listIdx equal to i in the SPS. ref_pic_list_sps_flag[i] equal to 0 specifies that reference picture list i of the current slice is derived based on the ref_pic_list_struct(listIdx, rplsIdx) syntax structure with listIdx equal to i that is directly included in the slice headers of the current picture.

When ref_pic_list_sps_flag[i] is not present, the following applies:

If num_ref_pic_lists_in_sps[i] is equal to 0, the value of ref_pic_list_sps_flag[i] is inferred to be equal to 0.

Otherwise (num_ref_pic_lists_in_sps[i] is greater than 0), if rpl1_idx_present_flag is equal to 0, the value of ref_pic_list_sps_flag[1] is inferred to be equal to ref_pic_list_sps_flag[0].

Otherwise, the value of ref_pic_list_sps_flag[i] is inferred to be equal to pps_ref_pic_list_sps_idc[i]−1.

ref_pic_list_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of reference picture list i of the current picture. The syntax element ref_pic_list_idx[i] is represented by Ceil(Log2(num_ref_pic_lists_in_sps[i])) bits. When not present, the value of ref_pic_list_idx[i] is inferred to be equal to 0. The value of ref_pic_list_idx[i] shall be in the range of 0 to num_ref_pic_lists_in_sps[i]−1, inclusive. When ref_pic_list_sps_flag[i] is equal to 1 and num_ref_pic_lists_in_sps[i] is equal to 1, the value of ref_pic_list_idx[i] is inferred to be equal to 0. When ref_pic_list_sps_flag[i] is equal to 1 and rpl1_idx_present_flag is equal to 0, the value of ref_pic_list_idx[1] is inferred to be equal to ref_pic_list_idx[0].

slice_poc_lsb_lt[i][j] specifies the value of the picture order count modulo MaxPicOrderCntLsb of the j-th LTRP entry in the i-th reference picture list. The length of the slice_poc_lsb_lt[i][j] syntax element is log2_max_pic_order_cnt_lsb_minus4+4 bits.

The variable PocLsbLt[i][j] is derived as follows:

$$PocLsbLt[i][j] = ltrp\_in\_slice\_header\_flag[i][RplsIdx[i]]\,?\,slice\_poc\_lsb\_lt[i][j]:rpls\_poc\_lsb\_lt[listIdx][RplsIdx[i]][j] \quad (7\text{-}96)$$

delta_poc_msb_present_flag[i][j] equal to 1 specifies that delta_poc_msb_cycle_lt[i][j] is present. delta_poc_msb_present_flag[i][j] equal to 0 specifies that delta_poc_msb_cycle_lt[i][j] is not present.

Let prevTid0Pic be the previous picture in decoding order that has nuh_layer_id the same as the current picture, has TemporalId equal to 0, and is not a RASL or RADL picture.

Let setOfPrevPocVals be a set consisting of the following:

the PicOrderCntVal of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PocLsbLt[i][j], the value of delta_poc_msb_present_flag[i][j] shall be equal to 1.

delta_poc_msb_cycle_lt[i][j] specifies the value of the variable FullPocLt[i][j] as follows:

```
if( j  ==  0 )
    DeltaPocMsbCycleLt[ i ][ j ] = delta_poc_msb_cycle_lt[ i ][ j ]
else                                                                            (7-97)
    DeltaPocMsbCycleLt[ i ][ j ] = delta_poc_msb_cycle_lt[ i ][ j ] +
DeltaPocMsbCycleLt[ i ][ j − 1]
FullPocLt[ i ][ j ] = PicOrderCntVal − DeltaPocMsbCycleLt[ i ][ j ] *
MaxPicOrderCntLsb −
    ( PicOrderCntVal & ( MaxPicOrderCntLsb − 1 ) ) + PocLsbLt[ i ][ j ]
```

The variable RplsIdx[i] is derived as follows:

$$RplsIdx[i] = ref\_pic\_list\_sps\_flag[i]\,?\,ref\_pic\_list\_idx[i]:num\_ref\_pic\_lists\_in\_sps[i] \quad (7\text{-}95)$$

The value of delta_poc_msb_cycle_lt[i][j] shall be in the range of 0 to $2^{(32-log2\_max\_pic\_order\_cnt\_lsb\_minus4-4)}$, inclusive. When not present, the value of delta_poc_msb_cycle_lt[i][j] is inferred to be equal to 0.

The syntax structure of RPL as following:

```
ref_pic_list_struct( listIdx, rplsIdx ) {                                              Descriptor
    num_ref_entries[ listIdx ][ rplsIdx ]                                              ue(v)
    if( long_term_ref_pics_flag )
        ltrp_in_slice_header_flag[ listIdx ][ rplsIdx ]                                u(1)
    for( i = 0, j = 0; i < num_ref_entries[ listIdx ][ rplsIdx ]; i++) {
        if( inter_layer_ref_pics_present_flag )
            inter_layer_ref_pic_flag[ listIdx ][ rplsIdx ][ i ]                        u(1)
        if( !inter_layer_ref_pics_flag[ listIdx ][ rplsIdx ][ i ] ) {
            if( long_term_ref_pics_flag )
                st_ref_pic_flag[ listIdx ][ rplsIdx ][ i ]                             u(1)
            if( st_ref_pic_flag[ listIdx ][ rplsIdx ][ i ] ) {
                abs_delta_poc_st[ listIdx ][ rplsIdx ][ i ]                            ue(v)
                if( AbsDeltaPocSt[ listIdx ][ rplsIdx ][ i ] > 0 )
                    strp_entry_sign_flag[ listIdx ][ rplsIdx ][ i ]                    u(1)
            } else_if( !ltrp_in_slice_header_flag[ listIdx ][ rplsIdx ] )
                rpls_poc_lsb_lt[ listIdx ][ rplsIdx ][ j++ ]                           u(v)
        } else
            ilrp_idc[ listIdx ][ rplsIdx ][ i ]                                        ue(v)
    }
}
``` num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to sps_max_dec_pic_buffering_minus1+14, inclusive.

ltrp_in_slice_header_flag[listIdx][rplsIdx] equal to 0 specifies that the POC LSBs of the LTRP entries in the ref_pic_list_struct(listIdx, rplsIdx) syntax structure are present in the ref_pic_list_struct(listIdx, rplsIdx) syntax structure. ltrp_in_slice_header_flag[listIdx][rplsIdx] equal to 1 specifies that the POC LSBs of the LTRP entries in the ref_pic_list_struct(listIdx, rplsIdx) syntax structure are not present in the ref_pic_list_struct(listIdx, rplsIdx) syntax structure.

inter_layer_ref_pic_flag[listIdx][rplsIdx][i] equal to 1 specifies that the i-th entry in the ref_pic_list_struct(listIdx, rplsIdx) syntax structure is an ILRP entry. inter_layer_ref_pic_flag[listIdx][rplsIdx][i] equal to 0 specifies that the i-th entry in the ref_pic_list_struct(listIdx, rplsIdx) syntax structure is not an ILRP entry. When not present, the value of inter_layer_ref_pic_flag[listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag[listIdx][rplsIdx][i] is not present, the value of st_ref_pic_flag[listIdx][rplsIdx][i] is inferred to be equal to 1.

The variable NumLtrpEntries[listIdx][rplsIdx] is derived as follows:

```
for( i = 0, NumLtrpEntries[ listIdx ][ rplsIdx ] = 0; i <
num_ref_entries[ listIdx ][ rplsIdx ]; i++ )
    if(
!inter_layer_ref_pic_flag[ listIdx ][ rplsIdx ][ i ] && !st_ref_pic_flag[ listIdx ][ rplsIdx
][ i ] )    (7-120)
        NumLtrpEntries[ listIdx ][ rplsIdx ]++
``` abs_delta_poc_st[listIdx][rplsIdx][i] specifies the value of the variable AbsDeltaPocSt[listIdx][rplsIdx][i] as follows:

```
if( sps_weighted_pred_flag  ||  sps_weighted_bipred_flag )
    AbsDeltaPocSt[ listIdx ][ rplsIdx ][ i ] =
    abs_delta_poc_st[ listIdx ][ rplsIdx ][ i ]                                        (7-121)
else
    AbsDeltaPocSt[ listIdx ][ rplsIdx ][ i ] =  abs_delta_poc_st[ listIdx ][ rplsIdx ][ i ] + 1
```

The value of abs_delta_poc_st[listIdx][rplsIdx][i] shall be in the range of 0 to $2^{15}-1$, inclusive. strp_entry_sign_flag [listIdx rplsIdx][i] equal to 1 specifies that i-th entry in the syntax structure ref_pic_list_struct(listIdx, rplsIdx) has a value greater than or equal to 0. strp_entry_sign_flag[listIdx][rplsIdx][i] equal to 0 specifies that the i-th entry in the syntax structure_ref_pic_list_struct(listIdx, rplsIdx) has a value less than 0. When not present, the value of strp_entry_sign_flag[listIdx][rplsIdx][i] is inferred to be equal to 1.

The list DeltaPocValSt[listIdx][rplsIdx] is derived as follows:

```
for( i = 0; i < num_ref_entries[ listIdx ][ rplsIdx ]; i++ )
  if(
!inter_layer_ref_pic_flag[ listIdx ][ rplsIdx ][ i ] && st_ref_pic_flag[ listIdx ][ rplsIdx ]
[ i ] ) (7-122)
    DeltaPocValSt[ listIdx ][ rplsIdx ][ i ] = (
strp_entry_sign_flag[ listIdx ][ rplsIdx ][ i ] ) ?
      AbsDeltaPocSt[ listIdx ][ rplsIdx ][ i ] : 0 −
AbsDeltaPocSt[ listIdx ][ rplsIdx ][ i ]
``` rpls_poc_lsb_lt[listIdx][rplsIdx][i] specifies the value of the picture order count modulo MaxPicOrderCntLsb of the picture referred to by the i-th entry in the ref_pic_list_struct (listIdx, rplsIdx) syntax structure. The length of the rpls_poc_lsb_lt[listIdx][rplsIdx][i] syntax element is log2_max_pic_order_cnt_lsb_minus4+4 bits.

Some General Description of RPL Structure

For each list, there is a RPL structure. First, num_ref_entries[listIdx][rplsIdx] is signaled to indicate the number of reference pictures in the list. ltrp_in_slice_header_flag[listIdx][rplsIdx] is used indicated whether LSB (Least Significant Byte) information is signaled in the slice header. If current reference picture is not an inter-layer reference picture, then a st_ref_pic_flag[listIdx][rplsIdx][i] to indicate whether it is a long-term reference picture. If it is a short-term reference picture, then the POC information(abs_delta_poc_st and strp_entry_sign_flag) is signaled. if ltrp_in_slice_header_flag[listIdx][rplsIdx] is zero, then rpls_poc_lsb_lt[listIdx][rplsIdx][j++] is used to derived the LSB information of current reference picture. The MSB (Most Significant Bit) can be derived directly, or derived based on the information (delta_poc_msb_present_flag[i][j] and delta_poc_msb_cycle_lt[i][j]) in the slice header.

Decoding Process for Reference Picture Lists Construction

This process is invoked at the beginning of the decoding process for each slice of a non-IDR picture.

Reference pictures are addressed through reference indices. A reference index is an index into a reference picture list. When decoding an I slice, no reference picture list is used in decoding of the slice data. When decoding a P slice, only reference picture list 0 (i.e., RefPicList[0]), is used in decoding of the slice data. When decoding a B slice, both reference picture list 0 and reference picture list 1 (i.e., RefPicList[1]) are used in decoding of the slice data.

At the beginning of the decoding process for each slice of a non-IDR picture, the reference picture lists RefPicList[0] and RefPicList[1] are derived. The reference picture lists are used in marking of reference pictures as specified in clause 8.3.3 or in decoding of the slice data.

NOTE 1—For an I slice of a non-IDR picture that it is not the first slice of the picture, RefPicList[0] and RefPicList[1] may be derived for bitstream conformance checking purpose, but their derivation is not necessary for decoding of the current picture or pictures following the current picture in decoding order. For a P slice that it is not the first slice of a picture, RefPicList[1] may be derived for bitstream conformance checking purpose, but its derivation is not necessary for decoding of the current picture or pictures following the current picture in decoding order.

The reference picture lists RefPicList[0] and RefPicList[1], the reference picture scaling ratios RefPicScale[i][j][0] and RefPicScale[i][j][1], and the reference picture scaled flags RefPicIsScaled[0] and RefPicIsScaled[1] are constructed as follows:

```
for( i = 0; i < 2; i++ ) {
  for( j = 0, k = 0, pocBase = PicOrderCntVal; j < num_ref_entries[ i ][ RplsIdx[ i ] ];
j++ ) {
    if( !inter_layer_ref_pic_flag[ i ][ RplsIdx[ i ][ j ] ) {
      if( st_ref_pic_flag[ i ][ RplsIdx[ i ] ][ j ] ) {
        RefPicPocList[ i ][ j ] = pocBase − DeltaPocValSt[ i ][ RplsIdx[ i ] ][ j ]
        if( there is a reference picture picA in the DPB with the same nuh_layer_id as
the current picture
               and PicOrderCntVal equal to RefPicPocList[ i ][ j ] )
          RefPicList[ i ][ j ] = picA
        else
          RefPicList[ i ][ j ] = "no reference picture"              (200)
        pocBase = RefPicPocList[ i ][ j ]
      } else {
        if( !delta_poc_msb_cycle_lt[ i ][ k ] ) {
          if( there is a reference picA in the DPB with the same nuh_layer_id as the
current picture and
                  PicOrderCntVal & ( MaxPicOrderCntLsb − 1 ) equal to
PocLsbLt[ i ][ k ] )
            RefPicList[ i ][ j ] = picA
          else
            RefPicList[ i ][ j ] = "no reference picture"
          RefPicLtPocList[ i ][ j ] = PocLsbLt[ i ][ k ]
        } else {
          if( there is a reference picA in the DPB with the same nuh_layer_id as the
current picture and
                  PicOrderCntVal equal to              FullPocLt[ i ][ k ] )
            RefPicList[ i ][ j ] = picA
          else
            RefPicList[ i ][ j ] = "no reference picture"
          RefPicLtPocList[ i ][ j ] = FullPocLt[ i ][ k ]
        }
        k++
      }
    } else {
      layerIdx =
DirectRefLayerIdx[ GeneralLayerIdx[ nuh_layer_id ] ][ ilrp_idx[ i ][ RplsIdx ][ j ] ]
      refPicLayerId = vps_layer_id[ layerIdx ]
      if( there is a reference picture picA in the DPB with nuh_layer_id equal to
refPicLayerId and
              the same PicOrderCntVal as the current picture )
        RefPicList[ i ][ j ] = picA
      else
        RefPicList[ i ][ j ] = "no reference picture"
    }
    fRefWidth is set equal to PicOutputWidthL of the reference picture
RefPicList[ i ][ j ] in luma samples
    fRefHeight is set equal to PicOutputHeightL of the reference picture
RefPicList[ i ][ j ] in luma samples
    RefPicScale[ i ][ j ][ 0 ] =
( ( fRefWidth  <<  14 ) + ( PicOutputWidthL  >>  1 ) ) / PicOutputWidthL
    RefPicScale[ i ][ j ][ 1 ] =
( ( fRefHeight  <<  14 ) + ( PicOutputHeightL  >>  1 ) ) / PicOutputHeightL
    RefPicIsScaled[ i ][ j ] = ( RefPicScale[ i ][ j ][ 0 ]  !=  ( 1  <<  14 ) ) ||
               ( RefPicScale[ i ][ j ][ 1 ]  !=  ( 1  <<  14 ) )
  }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

NOTE 2—It is possible that a particular picture is referred to by both an entry in RefPicList[0] and an entry in RefPicList[1]. It is also possible that a particular picture is referred to by more than one entry in RefPicList[0] or by more than one entry in RefPicList[1].

NOTE 3—The active entries in RefPicList[0] and the active entries in RefPicList[1] collectively refer to all reference pictures that may be used for inter prediction of the current picture and one or more pictures that follow the current picture in decoding order. The inactive entries in RefPicList[0] and the inactive entries in RefPicList[1] collectively refer to all reference pictures that are not used for inter prediction of the current picture but may be used in inter prediction for one or more pictures that follow the current picture in decoding order.

NOTE 4—There may be one or more entries in RefPicList[0] or RefPicList[1] that are equal to "no reference picture" because the corresponding pictures are not present in the DPB. Each inactive entry in RefPicList[0] or RefPicList[0] that is equal to "no reference picture" should be ignored. An unintentional picture loss should be inferred for each active entry in RefPicList[0] or RefPicList[1] that is equal to "no reference picture".

It is a requirement of bitstream conformance that the following constraints apply:

For each i equal to 0 or 1, num_ref_entries[i][RplsIdx[i]] shall not be less than NumRefIdxActive[i].

The picture referred to by each active entry in RefPicList[0] or RefPicList[1] shall be present in the DPB and shall have TemporalId less than or equal to that of the current picture.

The picture referred to by each entry in RefPicList[0] or RefPicList[1] shall not be the current picture and shall have non_reference_picture_flag equal to 0.

An STRP entry in RefPicList[0] or RefPicList[1] of a slice of a picture and an LTRP entry in RefPicList[0] or RefPicList[1] of the same slice or a different slice of the same picture shall not refer to the same picture.

There shall be no LTRP entry in RefPicList[0] or RefPicList[1] for which the difference between the PicOrderCntVal of the current picture and the PicOrderCntVal of the picture referred to by the entry is greater than or equal to $2^{24}$.

Let setOfRefPics be the set of unique pictures referred to by all entries in RefPicList[0] that have the same nuh_layer_id as the current picture and all entries in RefPicList[1] that have the same nuh_layer_id as the current picture. The number of pictures in setOfRefPics shall be less than or equal to MaxDecPicBuffMinus1 and setOfRefPics shall be the same for all slices of a picture.

When the current picture is an STSA picture, there shall be no active entry in RefPicList[0] or RefPicList[1] that has TemporalId equal to that of the current picture.

When the current picture is a picture that follows, in decoding order, an STSA picture that has TemporalId equal to that of the current picture, there shall be no picture that has TemporalId equal to that of the current picture included as an active entry in RefPicList[0] or RefPicList[1] that precedes the STSA picture in decoding order.

When the current picture is a CRA picture, there shall be no picture referred to by an entry in RefPicList[0] or RefPicList[1] that precedes, in output order or decoding order, any preceding IRAP picture in decoding order (when present).

When the current picture is a trailing picture, there shall be no picture referred to by an active entry in RefPicList[0] or RefPicList[1] that was generated by the decoding process for generating unavailable reference pictures for the IRAP picture associated with the current picture.

When the current picture is a trailing picture that follows, in both decoding order and output order, one or more leading pictures associated with the same IRAP picture, if any, there shall be no picture referred to by an entry in RefPicList[0] or RefPicList[1] that was generated by the decoding process for generating unavailable reference pictures for the IRAP picture associated with the current picture.

When the current picture is a recovery point picture or a picture that follows the recovery point picture in output order, there shall be no entry in RefPicList[0] or RefPicList[1] that contains a picture that was generated by the decoding process for generating unavailable reference pictures for the GDR picture of the recovery point picture.

When the current picture is a trailing picture, there shall be no picture referred to by an active entry in RefPicList[0] or RefPicList[1] that precedes the associated IRAP picture in output order or decoding order.

When the current picture is a trailing picture that follows, in both decoding order and output order, one or more leading pictures associated with the same IRAP picture, if any, there shall be no picture referred to by an entry in RefPicList[0] or RefPicList[1] that precedes the associated IRAP picture in output order or decoding order.

When the current picture is a RADL picture, there shall be no active entry in RefPicList[0] or RefPicList[1] that is any of the following:
A RASL picture
A picture that was generated by the decoding process for generating unavailable reference pictures
A picture that precedes the associated IRAP picture in decoding order The picture referred to by each ILRP entry in RefPicList[0] or RefPicList[1] of a slice of the current picture shall be in the same AU as the current picture.

The picture referred to by each ILRP entry in RefPicList[0] or RefPicList[1] of a slice of the current picture shall be present in the DPB and shall have nuh_layer_id less than that of the current picture.

Each ILRP entry in RefPicList[0] or RefPicList[1] of a slice shall be an active entry.

After the RPLs are constructed, the marking process as following:

Decoding Process for Reference Picture Marking

This process is invoked once per picture, after decoding of a slice header and the decoding process for reference picture list construction for the slice as specified in clause 8.3.2, but prior to the decoding of the slice data. This process may result in one or more reference pictures in the DPB being marked as "unused for reference" or "used for long-term reference".

A decoded picture in the DPB can be marked as "unused for reference", "used for short-term reference" or "used for long-term reference", but only one among these three at any given moment during the operation of the decoding process. Assigning one of these markings to a picture implicitly removes another of these markings when applicable. When a picture is referred to as being marked as "used for reference", this collectively refers to the picture being marked as "used for short-term reference" or "used for long-term reference" (but not both). STRPs and ILRPs are identified by their nuh_layer_id and PicOrderCntVal values. LTRPs are identified by their nuh_layer_id values and the Log2(MaxLtPicOrderCntLsb) LSBs of their PicOrderCntVal values.

If the current picture is a CLVSS picture, all reference pictures currently in the DPB (if any) with the same nuh_layer_id as the current picture are marked as "unused for reference". Otherwise, the following applies:

For each LTRP entry in RefPicList[0] or RefPicList[1], when the referred picture is an STRP with the same nuh_layer_id as the current picture, the picture is marked as "used for long-term reference".

Each reference picture with the same nuh_layer_id as the current picture in the DPB that is not referred to by any entry in RefPicList[0] or RefPicList[1] is marked as "unused for reference".

For each ILRP entry in RefPicList[0] or RefPicList[1], the referred picture is marked as "used for long-term reference"

It is allowed to have unsynchronized IRAP pictures across layers. To support this design, mixed IRAP and non-IRAP pictures within an AU, with the following POC design.

For independent layers, use POC MSB cycle signalling. In the SPS, there is a flag to control whether picture header has ph_poc_msb_cycle_present_flag, and a length in the SPS. When ph_poc_msb_cycle_present_flag is equal to 1, the POC MSB cycle, u(v) coded, is signalled in the picture header. When POC MSB cycle is present, the POC MSB of the picture is set to poc_msb_cycle*MaxPicOrderCntLsb For dependent layers, if there is a picture picA in the same AU in a reference layer of the current layer, the POC is derived as equal to the POC of piA and POC LSB values are required to be cross-layer aligned. Otherwise, the current POC derivation process applies.

| seq_parameter_set_rbsp( ) { | Descriptor |
|---|---|
| ... | |
| sps_decoding_parameter_set_id | u(4) |
| sps_video_parameter_set_id | u(4) |
| ... | |
| chroma_format_idc | u(2) |
| if( chroma_format_idc == 3) | |
|   separate_colour_plane_flag | u(1) |
| ... | |
| bit_depth_minus8 | ue(v) |
| ... | |
| sps_poc_msb_flag | u(1) |
| if( sps_poc_msb_flag ) | |
|   poc_msb_len_minus1 | ue(v) |
| ... | | bit_depth_minus8 specifies the bit depth of the samples of the luma and chroma arrays, BitDepth, and the value of the luma and chroma quantization parameter range offset, QpBdOffset, as follows:

$$BitDepth=8+bit\_depth\_minus8 \quad (45)$$

$$QpBdOffset=6*bit\_depth\_minus8 \quad (46)$$

bit_depth_minus8 shall be in the range of 0 to 8, inclusive.
sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.
sps_video_parameter_set_id, when greater than 0, specifies the value of vps_video_parameter_set_id for the VPS referred to by the SPS.
When sps_video_parameter_set id is equal to 0, the following applies:
  The SPS does not refer to a VPS.
  No VPS is referred to when decoding each CLVS referring to the SPS.
  The value of vps_max_layers_minus1 is inferred to be equal to 0.
  The CVS shall contain only one layer (i.e., all VCL NAL unit in the CVS shall have the same value of nuh_layer_id).
  The value of GeneralLayerIdx[nuh_layer_id] is inferred to be equal to 0.

The value of vps_independent_layer_flag[GeneralLayerIdx[nuh_layer_id]] is inferred to be equal to 1.
When vps_independent_layer_flag[GeneralLayerIdx[nuh_layer_id]] is equal to 1, the SPS referred to by a CLVS with a particular nuh_layer_id value nuhLayerId shall have nuh_layer_id equal to nuhLayerId.
chroma_format_idc specifies the chroma sampling relative to the luma sampling as specified in clause 6.2.
separate_colour_plane_flag equal to 1 specifies that the three colour components of the 4:4:4 chroma format are coded separately. separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

NOTE 1—There is no dependency in decoding processes between the colour planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_idc.
  Otherwise (separate_colour_plane_flag is equal to 1), ChromaArrayType is set equal to 0.
The meaning of chroma_format_idc and separate_colour_plane_flag is used to indicate the chroma format:

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 | sps_poc_msb_flag equal to 1 specifies that the ph_poc_msb_cycle_present_flag syntax element is present in PHs referring to the SPS. sps_poc_msb_flag equal to 0 specifies that the ph_poc_msb_cycle_present_flag syntax element is not present in PHs referring to the SPS.

poc_msb_len_minus1 plus 1 specifies the length, in bits, of the poc_msb_val syntax elements, when present in the PHs referring to the SPS. The value of poc_msb_len_minus1 shall be in the range of 0 to 32−log2_max_pic_order_cnt_lsb_minus4−5, inclusive.

```
Picture_header_rbsp( ) {
...
  ph_pic_parameter_set_id
  if( sps_poc_msb_flag ) {
    ph_poc_msb_present_flag
    if( ph_poc_msb_present_flag )
      poc_msb_val
  }
....
``` ph_poc_msb_present_flag equal to 1 specifies that the syntax element poc_msb_val is present in the PH. ph_poc_msb_present_flag equal to 0 specifies that the syntax element poc_msb_val is not present in the PH. When vps_independent_layer_flag[GeneralLayerIdx[nuh_layer_id]] is equal to 0 and there is a picture in the current AU in a reference layer of the current layer, the value of ph_poc_msb_present_flag shall be equal to 0.

poc_msb_val specifies the POC MSB value of the current picture. The length of the syntax element poc_msb_val is poc_msb_len_minus1+1 bits.

Below is the POC (picture order count) derivation of current picture

Decoding Process for Picture Order Count

Output of this process is PicOrderCntVal, the picture order count of the current picture.

Each coded picture is associated with a picture order count variable, denoted as PicOrderCntVal.

If vps_independent_layer_flag[GeneralLayerIdx[nuh_layer_id]] is equal to 0 and there is a picture picA in the current AU in a reference layer of the current layer, PicOrderCntVal is derived to be equal to the PicOrderCntVal of picA, and the value of slice_pic_order_cnt_lsb shall be the same in all VCL NAL units of the current AU. Otherwise, PicOrderCntVal of the current picture is derived as specified below.

When ph_poc_msb_present_flag is equal to 0 and the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows:

If ph_poc_msb_present_flag is equal to 1, PicOrderCntMsb is set equal to poc_msb_val*MaxPicOrderCntLsb.

Otherwise (ph_poc_msb_present_flag is equal to 0), if the current picture is a CLVSS picture, PicOrderCntMsb is set equal to 0.

Otherwise, PicOrderCntMsb is derived as follows:

if((slice_pic_order_cnt_lsb<prevPicOrderCntLsb)&&
  ((prevPicOrderCntLsb−slice_pic_order_
  cnt_lsb)>=(MaxPicOrderCntLsb/2)))

PicOrderCntMsb=prevPicOrderCntMsb+MaxPicOrderCntLsb else
  if((slice_pic_order_cnt_lsb>prevPicOrderCntLsb)
  &&((slice_pic_order_cnt_lsb−prevPicOrderCntLsb)>(MaxPicOrderCntLsb/2)))

PicOrderCntMsb=prevPicOrderCntMsb−MaxPicOrderCntLsb else

PicOrderCntMsb=prevPicOrderCntMsb     (196)

PicOrderCntVal is derived as follows:

PicOrderCntVal=PicOrderCntMsb+slice_pic_order_cnt_lsb     (197)

NOTE 1—All CLVSS pictures for which poc_msb_val is not present will have PicOrderCntVal equal to slice_pic_order_cnt_lsb since for those pictures PicOrderCntMsb is set equal to 0.

The value of PicOrderCntVal shall be in the range of $-2^{31}$ to $2^{31}-1$, inclusive.

In one CVS, the PicOrderCntVal values for any two coded pictures with the same value of nuh_layer_id shall not be the same.

All pictures in any particular AU shall have the same value of PicOrderCntVal.

The function PicOrderCnt(picX) is specified as follows:

PicOrderCnt(picX)=PicOrderCntVal of the picture
  picX     (198)

The function DiffPicOrderCnt(picA, picB) is specified as follows:

DiffPicOrderCnt(picA,picB)=PicOrderCnt(picA)−
  PicOrderCnt(picB)     (199)

The bitstream shall not contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

Constraint of sps_poc_msb_flag

The flag sps_poc_msb_flag is used to control whether the flag ph_poc_msb_cycle_present_flag will be presented in the picture header. While, mix IRAP and non-IRAP pictures within an AU only need to enable in multi-layer scenario. So, it is no need to present the ph_poc_msb_cycle_present_flag in single layer coding scenario. So, the value of sps_poc_msb_flag can be constraint to be 0 in single layer coding scenario.

1.2 constraint of chroma_format_idc, separate_colour_plane_flag, bit_depth_minus8, Current motion compensation process can be used in inter-layer prediction, but it can not be used when different layer has different format (like, chroma_format_idc, separate_colour_plane_flag, bit_depth_minus8), It is proposed to constraint the value of sps_poc_msb_flag shall be equal to 0 in the multiple layer coding scenario.

It is proposed to constraint the inter-layer prediction only can be used when current picture in current layer and the reference picture in reference layer have same format.

The flag sps_poc_msb_flag is used to control whether the flag ph_poc_msb_cycle_present_flag will be presented in the picture header. While, mix IRAP and non-IRAP pictures within an AU only need to enable in multi-layer scenario. So, it is no need to present the ph_poc_msb_cycle_present_flag in single layer coding scenario. So, the value of sps_poc_msb_flag can be constraint to be 0 in single layer coding scenario The First Embodiment [Constraint of sps_poc_msb_flag]

The sematic of sps_poc_msb_flag can be modified like below:

sps_poc_msb_flag equal to 1 specifies that the ph_poc_msb_cycle_present_flag syntax element is present in PHs referring to the SPS. sps_poc_msb_flag equal to 0 specifies that the ph_poc_msb_cycle_present_flag syntax element is not present in PHs referring to the SPS. When vps_max_layers_minus1 is equal to 0, the value of sps_poc_msb_flag shall be equal to 0.

The Second Embodiment [Constraint of Format]

Below constraint should be added in the specification:
vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.
The variables NumDirectRefLayers[i], DirectRefLayerIdx [i][d], NumRefLayers[i], RefLayerIdx[i][r], and LayerUsedAsRefLayerFlag[j] are derived as follows:

```
for( i = 0; i  <=  vps_max_layers_minus1; i++ ) {
  for( j = 0; j  <=  vps_max_layers_minus1; j++ ) {
    dependencyFlag[ i ][ j ] = vps_direct_ref_layer_flag[ i ][ j ]
    for( k = 0; k < i; k++ )
      if( vps_direct_ref_layer_flag[ i ][ k ]  &&   dependencyFlag[ k ][ j ] )
        dependencyFlag[ i ][ j ] = 1
  }
  LayerUsedAsRefLayerFlag[ i ] = 0
}
for( i = 0; i  <=  vps_max_layers_minus1; i++ ) {
  for( j = 0, d = 0, r = 0; j  <=  vps_max_layers_minus1; j++ ) {    (37)
    if( direct_ref_layer_flag[ i ][ j ] ) {
      DirectRefLayerIdx[ i ][ d++ ] = j
      LayerUsedAsRefLayerFlag[ j ] = 1
    }
    if( dependencyFlag[ i ][ j ] )
      RefLayerIdx[ i ][ r++ ] = j
  }
  NumDirectRefLayers[ i ] = d
  NumRefLayers[ i ] = r
}
```

The variable GeneralLayerIdx[i], specifying the layer index of the layer with nuh_layer_id equal to vps_layer_id [i], is derived as follows:

for($i=0;i<=$vps_max_layers_minus1$;i$++)

GeneralLayerIdx[vps_layer_id[$i$]]=$i$  (38)

Constraint Option A:
If current layer is a dependent layer, the video in current layer shall have same chroma_format_idc with the video in the reference layer.
Also, we can say that the interlayer prediction only can be used when the video in current layer shall have same chroma_format_idc with the video in reference layer
Constraint Option B:
If current layer is a dependent layer, the video in current layer shall have same separate_colour_plane_flag with the video in the reference layer.
Also, we can say that the interlayer prediction only can be used when the video in current layer shall have same separate_colour_plane_flag with the video in reference layer
Constraint Option C:
If current layer is a dependent layer, the video in current layer shall have same bit_depth_minus8 with the video in the reference layer.
Also, we can say that the interlayer prediction only can be used when the video in current layer shall have same bit_depth_minus8 with the video in reference layer Option A, B, C can be Combined:
Like Option A+B:
If current layer is a dependent layer, the video in current layer shall have same chroma_format_idc, separate_colour_plane_flag with the video in the reference layer.
Also, we can say that the interlayer prediction only can be used when the video in current layer shall have same chroma_format_idc, separate_colour_plane_flag with the video in reference layer
Like Option A+B+C
If current layer is a dependent layer, the video in current layer shall have same chroma_format_idc, separate_colour_plane_flag, bit_depth_minus8 with the video in the reference layer.
Also, we can say that the interlayer prediction only can be used when the video in current layer shall have same chroma_format_idc, separate_colour_plane_flag, bit_depth_minus8 with the video in reference layer The Third Embodiment o [Constraint of Format]

The constraints also can be added in other methods:
8 Decoding Process
8.1 General Decoding Process
8.1.1 General
Input to this process is a bitstream BitstreamToDecode. Output of this process is a list of decoded pictures.
The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification.
For each IRAP AU in the bitstream, the following applies:
If the AU is the first AU in the bitstream in decoding order, each picture is an IDR picture, or each picture is the first picture of the layer that follows an EOS NAL unit in decoding order, the variable NoIncorrectPicOutputFlag is set equal to 1.

Otherwise, if some external means not specified in this Specification is available to set the variable HandleCraAsCvsStartFlag to a value for the AU, HandleCraAsCvsStartFlag is set equal to the value provided by the external means and NoIncorrectPicOutputFlag is set equal to HandleCraAsCvsStartFlag.

Otherwise, HandleCraAsCvsStartFlag and NoIncorrectPicOutputFlag are both set equal to 0.

For each GDR AU in the bitstream, the following applies:

If the AU is the first AU in the bitstream in decoding order or each picture is the first picture of the layer that follows an EOS NAL unit in decoding order, the variable NoIncorrectPicOutputFlag is set equal to 1.

Otherwise, if some external means not specified in this Specification is available to set the variable HandleGdrAsCvsStartFlag to a value for the AU, HandleGdrAsCvsStartFlag is set equal to the value provided by the external means and NoIncorrectPicOutputFlag is set equal to HandleGdrAsCvsStartFlag.

Otherwise, HandleGdrAsCvsStartFlag and NoIncorrectPicOutputFlag are both set equal to 0.

NOTE—The above operations, for both IRAP pictures and GDR pictures, are needed for identification of the CVSs in the bitstream.

The variables TargetOlsIdx, which identifies the OLS index of the target OLS to be decoded, and the variable Htid, which identifies the highest temporal sublayer to be decoded, are set by some external means not specified in this Specification. The bitstream BitstreamToDecode does not contain any other layers than those included in the target OLS and does not include any NAL unit with TemporalId greater than Htid.

Clause 8.1.2 is repeatedly invoked for each coded picture in BitstreamToDecode in decoding order.

Option A:
When BitstreamToDecode contains more than one layers, following property of each layer should be the same:
—chroma_format_idc
separate_colour_plane_flag Option B
When BitstreamToDecode contains more than one layers, following property of each layer should be the same:
bit_depth_minus8

Option C=Option A+Option B
When BitstreamToDecode contains more than one layers, following property of each layer should be the same:
—chroma_format_idc
separate_colour_plane_flag
bit_depth_minus8

(1) constraint the value of sps_poc_msb_flag shall be equal to 0, when in single layer coding scenario to clean up the design of POC derivation.

(2) constraint the format of current layer and reference layer of inter-layer prediction, to make the design simple.

FIG. 7 is a schematic flowchart showing a method for decoding a coded video bitstream according to an embodiment of the present application, the method may be executed by an apparatus for decoding a coded video bitstream, as illustrated in FIG. 7, the method for decoding a coded video bitstream may include the following operations 701 to 703.

S701, obtaining a reference layer syntax element by parsing the coded video bitstream, where the value of the reference layer syntax element specifying whether a layer with index k is a direct reference layer for a layer with index i, where both i and k are integers and are larger than or equal to 0.

In an embodiment, a layer is a picture sequence, and the pictures in the picture sequence share a same layer identifier or a layer index.

In an embodiment, the apparatus for decoding a coded video bitstream (e.g. the decoder shown in FIG. 3) is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, the reference layer syntax element, chroma format related syntax element, bit depth related syntax element, and/or other syntax elements. Entropy decoding unit 304 may be configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used. In an embodiment, the reference layer syntax element is a video parameter set (VPS) level syntax element, where the VPS is applied to the layer with index j and the layer with index i.

In an embodiment, the reference layer syntax element may be the syntax element vps_direct_ref_layer_flag[i][j] in the VPS table cited above.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.

The variables NumDirectRefLayers[i], DirectRefLayerIdx[i][d], NumRefLayers[i], RefLayerIdx[i][r], and LayerUsedAsRefLayerFlag[j] are derived as follows:

```
for( i = 0; i  <=  vps_max_layers_minus1; i++ ) {
    for( j = 0; j  <=  vps_max_layers_minus1; j++ ) {
        dependencyFlag[ i ][ j ] = vps_direct_ref_layer_flag[ i ][ j ]
        for( k = 0; k < i; k++ )
```

```
        if( vps_direct_ref_layer_flag[ i ][ k ]  &&  dependencyFlag[ k ][ j ] )
            dependencyFlag[ i ][ j ] = 1
    }
    LayerUsedAsRefLayerFlag[ i ] = 0
}
for( i = 0; i  <=  vps_max_layers_minus1; i++ ) {
    for( j = 0, d = 0, r = 0; j  <=  vps_max_layers_minus1; j++ ) {         (37)
        if( vps_direct_ref_layer_flag[ i ][ j ] ) {
            DirectRefLayerIdx[ i ][ d++ ] = j
            LayerUsedAsRefLayerFlag[ j ] = 1
        }
        if( dependencyFlag[ i ][ j ] )
            RefLayerIdx[ i ][ r++ ] = j
    }
    NumDirectRefLayers[ i ] = d
    NumRefLayers[ i ] = r
}
```

In an embodiment, vps_direct_ref_layer_flag [i][j] equal to 1 specifies that the layer with index j is a direct reference layer for the layer with index i.

S702, determining whether the layer with index j is a reference layer for the layer with index i based on the value of the reference layer syntax element, where the layer with index j is a reference layer for the layer with index k, where j is an integer and is larger than or equal to 0.

In an embodiment, in case that the value of the reference layer syntax element specifies the layer with index k is a direct reference layer for the layer with index i, the layer with index j is a reference layer for the layer with index i.

In an embodiment, regarding the reference layer, there are two kinds of scenes: one is a layer with index A is a direct reference layer for a layer with index B; another is a layer with index A is an indirect reference layer for a layer with index B when a layer with index C is a reference layer for the layer with index B, the layer with index A is a reference layer for the layer with index C, and the layer with index A is not a direct reference layer for a layer with index B. The reference layer includes a direct reference layer or an indirect reference layer. And a layer with index A is a direct reference layer for a layer with index B means that the layer with index A includes at least one reference picture of a picture in the layer with index B. In operation S702, the layer with index j is a reference layer for the layer with index k, if the value of the reference layer syntax element specifies that layer with index k is a direct reference layer for a layer with index i, the layer with index j is a reference layer for the layer with index i.

S703, in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i.

In an embodiment, in case that the layer with index j is a reference layer for the layer with index i, a picture of the layer with index i can be predicted based on the layer with index j, and the value of a chroma format related syntax element applied to the layer with index i is the same as the value of a chroma format related syntax element applied to the layer with index j.

In an embodiment, the apparatus for decoding a coded video bitstream (e.g. the decoder 30 shown in FIG. 3) is configured to use inter prediction for a picture of the layer with index i based on the layer with index j, produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

In an embodiment, inter-layer prediction refers to use inter prediction for a picture of the layer with index i based on a reference picture from the layer with index j.

In an embodiment, the chroma format related syntax element is a sequence parameter set (SPS) level syntax element, where the SPS is applied to the layer with index j or the layer with index i. In an embodiment, SPS is applied to a picture sequence, while a layer is a picture sequence, the SPS is applied to the layer with index j or the layer with index i. In an embodiment, the chroma format related syntax element may be the syntax element chroma_format_idc in the SPS table cited above.

chroma_format_idc specifies the chroma sampling relative to the luma sampling as specified in clause 6.2.

The meaning of chroma_format_idc and separate_colour_plane_flag is used to indicate the chroma format:

| chroma_format_idc | separate_colour_plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Table SubWidthC and SubHeightC Values Derived from chroma_format_idc

According to the embodiment of the present application, a reference layer syntax element is obtained by parsing the coded video bitstream, where the value of the reference layer syntax element specifying whether a layer with index k is a direct reference layer for a layer with index i, where both i and k are integers and are larger than or equal to 0; determining whether the layer with index j is a reference layer for the layer with index i based on the value of the reference layer syntax element, where the layer with index j is a reference layer for the layer with index k, where j is an integer and is larger than or equal to 0; and in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i, the constraint of the format of current layer and reference layer for inter-layer prediction is achieved, thereby making the design simple.

FIG. 8 is a schematic flowchart showing a method for decoding a coded video bitstream according to an embodiment of the present application, the method may be executed by an apparatus for decoding a coded video bitstream, as illustrated in FIG. 8, the method for decoding a coded video bitstream may include the following operations 801 to 803.

S801, obtaining a reference layer syntax element by parsing the coded video bitstream, where the value of the reference layer syntax element specifying whether a layer with index j is a direct reference layer for a layer with index i, where both i and j are integers and are larger than or equal to 0.

S802, in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i.

It should be noted that if the value of the reference layer syntax element specifies that the layer with index j is not a direct reference layer for the layer with index i, the layer with index j may be a reference layer, i.e., the layer with index j may be an indirect reference layer for the layer with index j may also be a reference layer.

According to the embodiment of the present application, a reference layer syntax element is obtained by parsing the coded video bitstream, where the value of the reference layer syntax element specifying whether a layer with index j is a direct reference layer for a layer with index i, where both i and j are integers and are larger than or equal to 0; and in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i, the constraint of the format of current layer and reference layer for inter-layer prediction is achieved, thereby making the design simple.

Based on the embodiments shown in FIGS. 7 and 8, the method for decoding a coded video bitstream further includes:

obtaining the chroma format related syntax element applied to the layer with index i and the chroma format related syntax element applied to the layer with index j by parsing the coded video bitstream; and where the condition further includes the value of the chroma format related syntax element applied to the layer with index i is the same as the value of the chroma format related syntax element applied to the layer with index j.

In an embodiment, a picture of the layer with index i is only can be predicted based on the layer with index j when the layer with index j is a reference layer for the layer with index i and the value of the chroma format related syntax element applied to the layer with index i is the same as the value of the chroma format related syntax element applied to the layer with index j.

Figure 9:
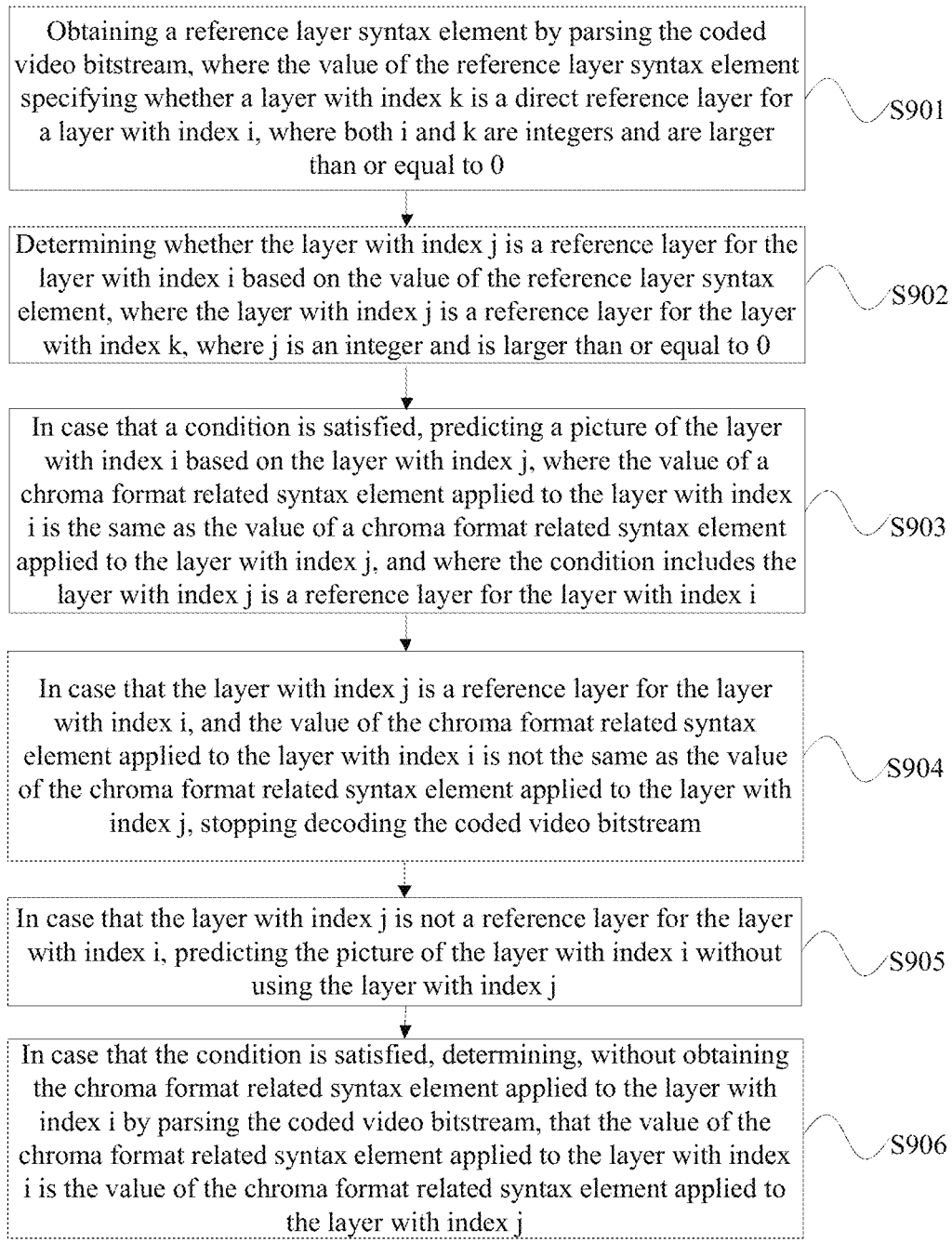
FIG. 9 is a schematic flowchart showing a method for decoding a coded video bitstream according to an embodiment.

FIG. 9 is a schematic flowchart showing a method for decoding a coded video bitstream according to an embodiment of the present application, the method may be executed by an apparatus for decoding a coded video bitstream, as illustrated in FIG. 9, based on the method shown in FIG. 7, the method for decoding a coded video bitstream may include the following operations 901 to 906.

S901, obtaining a reference layer syntax element by parsing the coded video bitstream, where the value of the reference layer syntax element specifying whether a layer with index k is a direct reference layer for a layer with index i, where both i and k are integers and are larger than or equal to 0.

S902, determining whether the layer with index j is a reference layer for the layer with index i based on the value of the reference layer syntax element, where the layer with index j is a reference layer for the layer with index k, where j is an integer and is larger than or equal to 0.

S903, in case that a condition is satisfied, predicting a picture of the layer with index i based on the layer with index j, where the value of a chroma format related syntax element applied to the layer with index i is the same as the value of a chroma format related syntax element applied to the layer with index j, and where the condition includes the layer with index j is a reference layer for the layer with index i.

S904, in case that the layer with index j is a reference layer for the layer with index i, and the value of the chroma format related syntax element applied to the layer with index i is not the same as the value of the chroma format related syntax element applied to the layer with index j, stopping decoding the coded video bitstream.

S905, in case that the layer with index j is not a reference layer for the layer with index i, predicting the picture of the layer with index i without using the layer with index j.

In an embodiment, it is determined that the layer with index j is not a reference layer for the layer with index i when the layer with index j is not a direct reference layer for the layer with index i and a layer with index k cannot be found by traversing all the layers, the layer with index k is a direct reference layer for the layer with index i and the layer with index j is a reference layer for the layer with index k.

In an embodiment, in case that the layer with index j is not a direct reference layer for the layer with index i, determining whether the layer with index j is an indirect reference layer for the layer with index i; in case that the layer with index j is an indirect reference layer for the layer with index i, predicting the picture of the layer with index i using the layer with index j; in case that the layer with index j is not an indirect reference layer for the layer with index i, predicting the picture of the layer with index i without using the layer with index j.

It is determined that the layer with index j is an indirect layer for the layer with index i when the layer with index k is a direct reference layer for the layer with index i and a layer with index j that is a reference layer for the layer with index k by traversing all the layers.

S906, in case that the condition is satisfied, determining, without obtaining the chroma format related syntax element applied to the layer with index i by parsing the coded video bitstream, that the value of the chroma format related syntax element applied to the layer with index i is the value of the chroma format related syntax element applied to the layer with index j.

In an embodiment, it is determined that the value of the chroma format related syntax element applied to the layer with index i is the value of the chroma format related syntax element applied to the layer with index j when the layer with index j is a reference layer for the layer with index i without obtaining the chroma format related syntax element applied to the layer with index i by parsing the coded video bitstream.

According to the embodiment of the present application, in case that the layer with index j is a reference layer for the layer with index i, and the value of the chroma format related syntax element applied to the layer with index i is not the same as the value of the chroma format related syntax element applied to the layer with index j, stopping decoding the coded video bitstream; in case that the layer with index j is not a reference layer for the layer with index i, predicting the picture of the layer with index i without using the layer with index j; and in case that the condition is satisfied, determining, without obtaining the chroma format related syntax element applied to the layer with index i by parsing the coded video bitstream, that the value of the chroma format related syntax element applied to the layer with index i is the value of the chroma format related syntax element applied to the layer with index j, the constraint of the format of current layer and reference layer for inter-layer prediction is achieved, thereby making the design simple.

Figure 10:
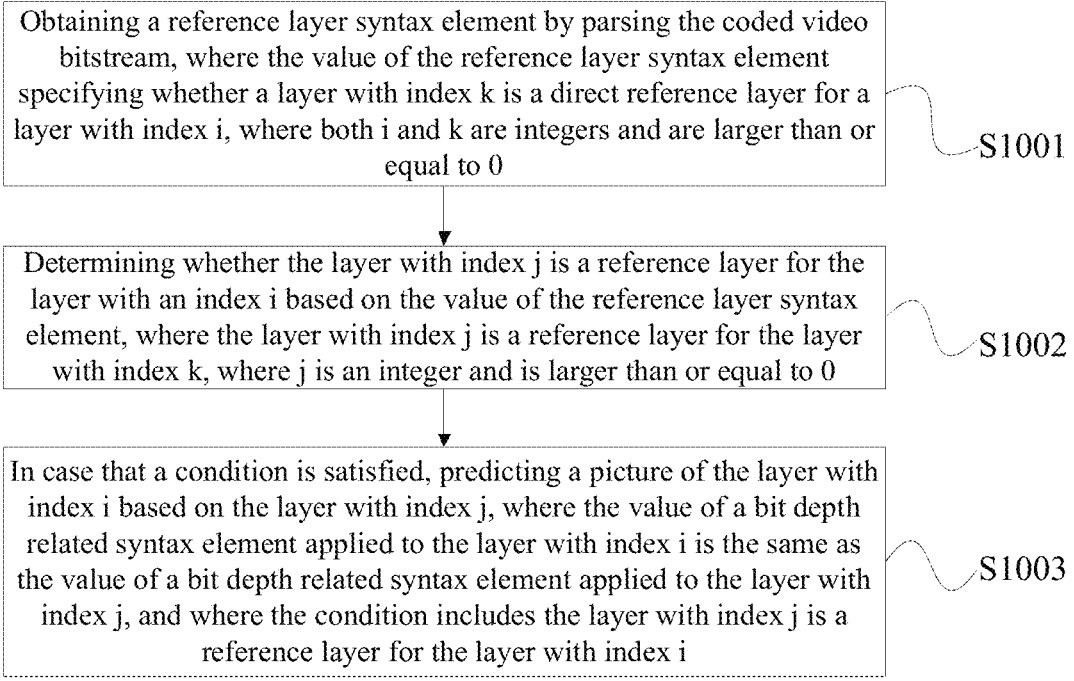
FIG. 10 is a schematic flowchart showing a method for decoding a coded video bitstream according to an embodiment.

FIG. 10 is a schematic flowchart showing a method for decoding a coded video bitstream according to an embodiment of the present application, the method may be executed by an apparatus for decoding a coded video bitstream, as illustrated in FIG. 10, the method for decoding a coded video bitstream may include the following operations 1001 to 1003.

S1001, obtaining a reference layer syntax element by parsing the coded video bitstream, where the value of the reference layer syntax element specifying whether a layer with index k is a direct reference layer for a layer with index i, where both i and k are integers and are larger than or equal to 0.

In an embodiment, the reference layer syntax element is a video parameter set (VPS) level syntax element, where the VPS is applied to the layer with index j and the layer with index i.

S1002, determining whether the layer with index j is a reference layer for the layer with an index i based on the value of the reference layer syntax element, where the layer with index j is a reference layer for the layer with index k, where j is an integer and is larger than or equal to 0.

In an embodiment, in case that the value of the reference layer syntax element specifies the layer with index k is a direct reference layer for the layer with index i, the layer with index j is a reference layer for the layer with index i.

S1003, in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the layer with index j is a reference layer for the layer with index i.

In an embodiment, the bit depth related syntax element specifies a bit depth of luma and chroma samples of a picture in a layer to which the bit depth related syntax element is applied.

In an embodiment, where the bit depth related syntax element is a sequence parameter set (SPS) level syntax element, where the SPS is applied to the layer with index j or the layer with index i.

In an embodiment, the bit depth related syntax element may be the syntax element bit_depth_minus8 in the SPS table cited above.

bit_depth_minus8 specifies the bit depth of the samples of the luma and chroma arrays, BitDepth, and the value of the luma and chroma quantization parameter range offset, QpBdOffset, as follows:

$$BitDepth=8+bit\_depth\_minus8 \quad (45)$$

$$QpBdOffset=6*bit\_depth\_minus8 \quad (46)$$

bit_depth_minus8 shall be in the range of 0 to 8, inclusive.

The principle of this embodiment is similar as the embodiment shown in FIG. 7, which will not be described herein for brevity.

According to the embodiment of the present application, a reference layer syntax element is obtained by parsing the coded video bitstream, where the value of the reference layer syntax element specifying whether a layer with index k is a direct reference layer for a layer with index i, where both i and k are integers and are larger than or equal to 0; determining whether the layer with index j is a reference layer for the layer with index i based on the value of the reference layer syntax element, where the layer with index j is a reference layer for the layer with index k, where j is an integer and is larger than or equal to 0; and in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the layer with index j is a reference layer for the layer with index i, the constraint of the format of current layer and reference layer for inter-layer prediction is achieved, thereby making the design simple.

Figure 11:
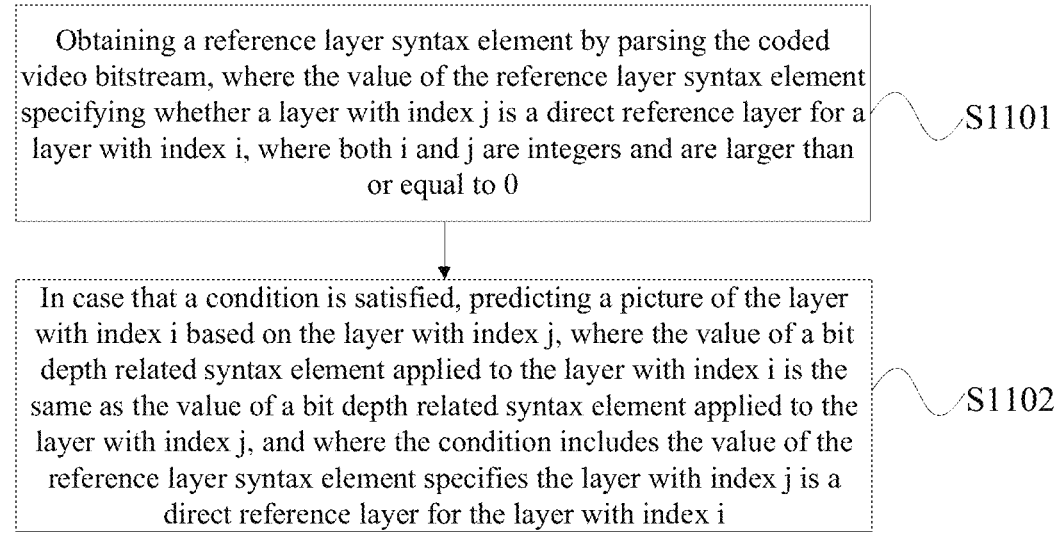
FIG. 11 is a schematic flowchart showing a method for decoding a coded video bitstream according to an embodiment.

FIG. 11 is a schematic flowchart showing a method for decoding a coded video bitstream according to an embodiment of the present application, the method may be executed by an apparatus for decoding a coded video bitstream, as illustrated in FIG. 11, the method for decoding a coded video bitstream may include the following operations 1101 to 1102.

S1101, obtaining a reference layer syntax element by parsing the coded video bitstream, where the value of the reference layer syntax element specifying whether a layer with index j is a direct reference layer for a layer with index i, where both i and j are integers and are larger than or equal to 0.

S1102, in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the value of the reference layer syntax element specifies the layer with index j is a direct reference layer for the layer with index i.

The principle of this embodiment is similar as the embodiment shown in FIG. 8, which will not be described herein for brevity.

According to the embodiment of the present application, a reference layer syntax element is obtained by parsing the coded video bitstream, where the value of the reference layer syntax element specifying whether a layer with index j is a direct reference layer for a layer with index i, where both i and j are integers and are larger than or equal to 0; and in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the value of the reference layer syntax element specifies the layer with index j is a direct reference layer for the layer with index i, the constraint of the format of current layer and reference layer for inter-layer prediction is achieved, thereby making the design simple.

Based on the embodiments shown in FIGS. 10 and 11, the method for decoding a coded video bitstream further includes:

obtaining the bit depth related syntax element applied to the layer with index i and the bit depth related syntax element applied to the layer with index j by parsing the coded video bitstream; and where the condition further includes the value of the bit depth related syntax element applied to the layer with index i is the same as the value of the bit depth related syntax element applied to the layer with index j.

Figure 12:
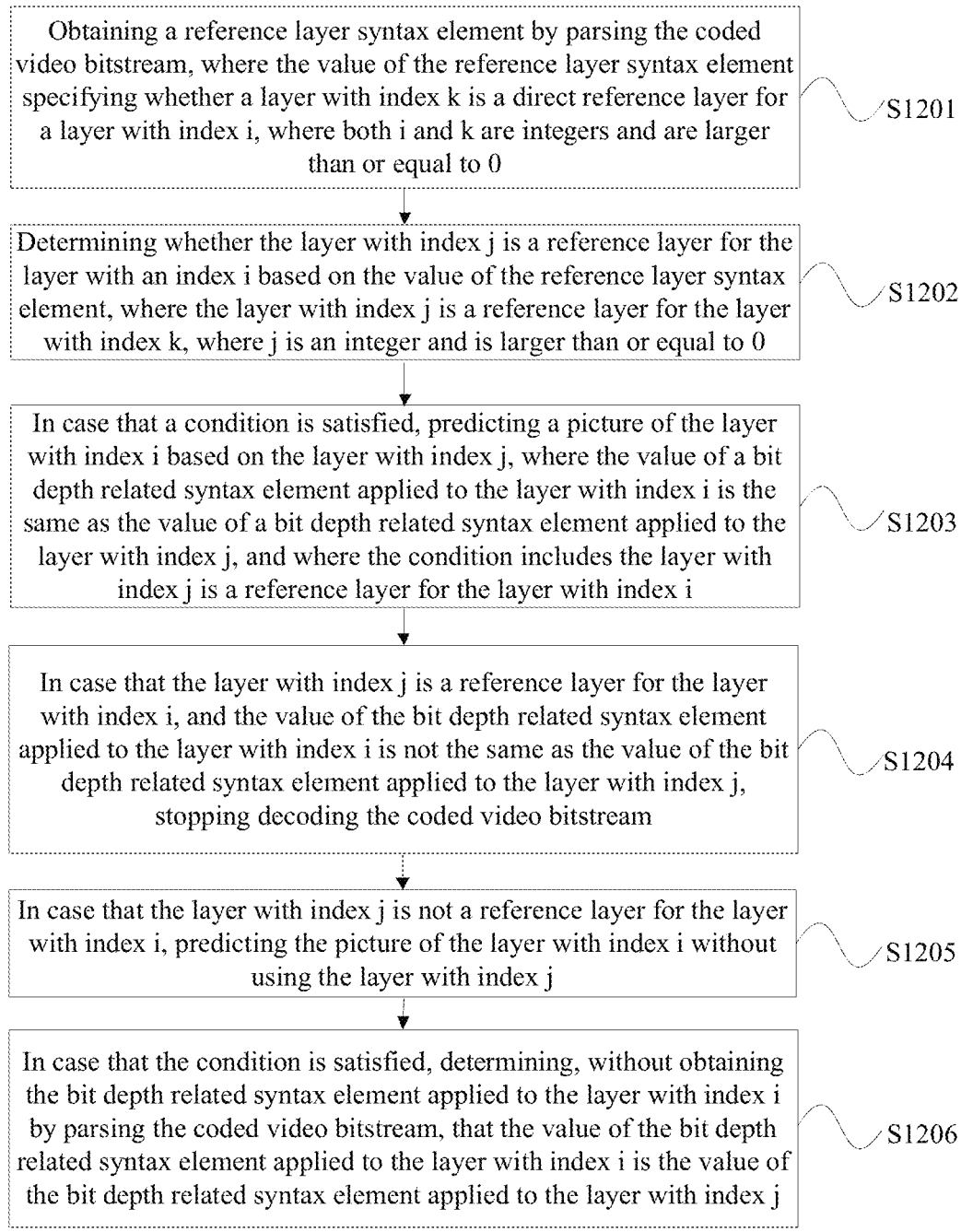
FIG. 12 is a schematic flowchart showing a method for decoding a coded video bitstream according to an embodiment.

FIG. 12 is a schematic flowchart showing a method for decoding a coded video bitstream according to an embodiment of the present application, the method may be executed by an apparatus for decoding a coded video bitstream, as illustrated in FIG. 12, based on the method shown in FIG. 10, the method for decoding a coded video bitstream may include the following operations 1201 to 1206.

S1201, obtaining a reference layer syntax element by parsing the coded video bitstream, where the value of the reference layer syntax element specifying whether a layer with index k is a direct reference layer for a layer with index i, where both i and k are integers and are larger than or equal to 0.

S1202, determining whether the layer with index j is a reference layer for the layer with an index i based on the value of the reference layer syntax element, where the layer with index j is a reference layer for the layer with index k, where j is an integer and is larger than or equal to 0.

S1203, in case that a condition is satisfied, predicting a picture of the layer with index i based on the layer with index j, where the value of a bit depth related syntax element applied to the layer with index i is the same as the value of a bit depth related syntax element applied to the layer with index j, and where the condition includes the layer with index j is a reference layer for the layer with index i.

S1204, in case that the layer with index j is a reference layer for the layer with index i, and the value of the bit depth related syntax element applied to the layer with index i is not the same as the value of the bit depth related syntax element applied to the layer with index j, stopping decoding the coded video bitstream.

S1205, in case that the layer with index j is not a reference layer for the layer with index i, predicting the picture of the layer with index i without using the layer with index j.

S1206, in case that the condition is satisfied, determining, without obtaining the bit depth related syntax element applied to the layer with index i by parsing the coded video bitstream, that the value of the bit depth related syntax element applied to the layer with index i is the value of the bit depth related syntax element applied to the layer with index j.

The principle of this embodiment is similar as the embodiment shown in FIG. 9, which will not be described herein for brevity.

According to the embodiment of the present application, in case that the layer with index j is a reference layer for the layer with index i, and the value of the bit depth related syntax element applied to the layer with index i is not the same as the value of the bit depth related syntax element applied to the layer with index j, stopping decoding the coded video bitstream; in case that the layer with index j is not a reference layer for the layer with index i, predicting the picture of the layer with index i without using the layer with index j; and in case that the condition is satisfied, determining, without obtaining the bit depth related syntax element applied to the layer with index i by parsing the coded video bitstream, that the value of the bit depth related syntax element applied to the layer with index i is the value of the bit depth related syntax element applied to the layer with index j, the constraint of the format of current layer and reference layer for inter-layer prediction is achieved, thereby making the design simple.

Figure 13:
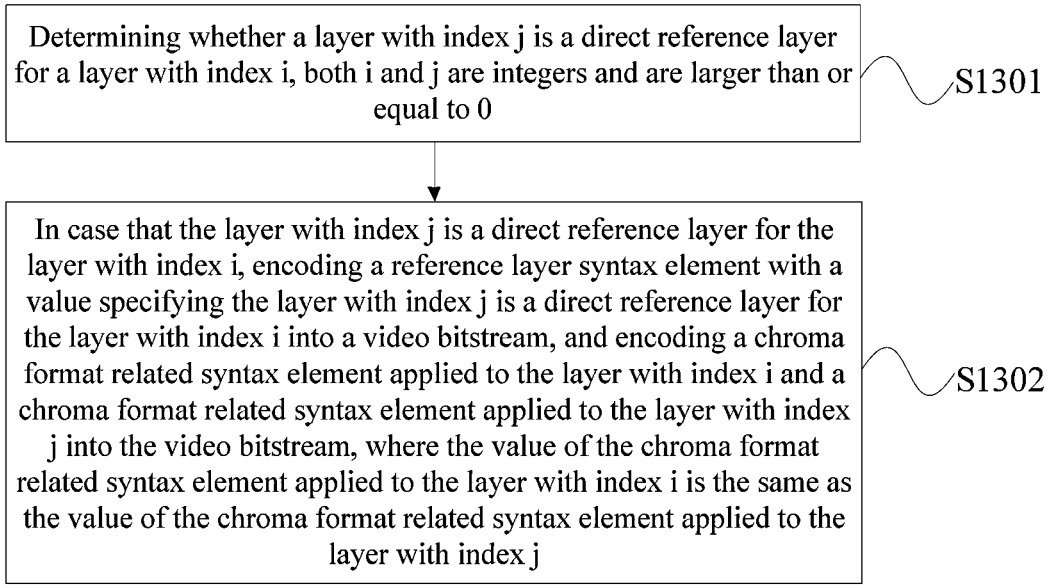
FIG. 13 is a schematic flowchart showing a method for encoding a video according to an embodiment.

FIG. 13 is a schematic flowchart showing a method for encoding a video according to an embodiment of the present application, the method may be executed by an apparatus for encoding a video, as illustrated in FIG. 13, the method for encoding a video may include the following operations 1301 to 1302.

S1301, determining whether a layer with index j is a direct reference layer for a layer with index i, both i and j are integers and are larger than or equal to 0.

The apparatus for encoding a video (e.g. the encoder 20 shown in FIG. 2) may, e.g., be configured to determining whether a layer with index j is a direct reference layer for a layer with index i, and to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit S1302, in case that the layer with index j is a direct reference layer for the layer with index i, encoding a reference layer syntax element with a value specifying the layer with index j is a direct reference layer for the layer with index i into a video bitstream, and encoding a chroma format related syntax element applied to the layer with index i and a chroma format related syntax element applied to the layer with index j into the video bitstream, where the value of the chroma format related syntax element applied to the layer with index i is the same as the value of the chroma format related syntax element applied to the layer with index j.

In an embodiment, the reference layer syntax element may be the syntax element vps_direct_ref_layer_flag[i][j] in the VPS table cited above.

vps_direct_ref_layer_flag[i][j] equal to 0 specifies that the layer with index j is not a direct reference layer for the layer with index i. vps_direct_ref_layer_flag [i][j] equal to 1 specifies that the layer with index j is a direct reference layer for the layer with index i. When vps_direct_ref_layer_flag [i][j] is not present for i and j in the range of 0 to vps_max_layers_minus1, inclusive, it is inferred to be equal to 0. When vps_independent_layer_flag[i] is equal to 0, there shall be at least one value of j in the range of 0 to i−1, inclusive, such that the value of vps_direct_ref_layer_flag[i][j] is equal to 1.

The variables NumDirectRefLayers[i], DirectRefLayerIdx [i][d], NumRefLayers[i], RefLayerIdx[i][r], and LayerUsedAsRefLayerFlag[j] are derived as follows:

```
for( i = 0; i  <=  vps_max_layers_minus1; i++ ) {
   for( j = 0; j  <=  vps_max_layers_minus1; j++ ) {
      dependencyFlag[ i ][ j ] = vps_direct_ref_layer_flag[ i ][ j ]
      for( k = 0; k < i; k++ )
         if( vps_direct_ref_layer_flag[ i ][ k ]   &&   dependencyFlag[ k ][ j ] )
            dependencyFlag[ i ][ j ] = 1
   }
   LayerUsedAsRefLayerFlag[ i ] = 0
}
for( i = 0; i  <=  vps_max_layers_minus1; i++ ) {
   for( j = 0, d = 0, r = 0; j  <=  vps_max_layers_minus1; j++ ) {          (37)
      if( vps_direct_ref_layer_flag[ i ][ j ] ) {
         DirectRefLayerIdx[ i ][ d++ ] = j
         LayerUsedAsRefLayerFlag[ j ] = 1
      }
      if( dependencyFlag[ i ][ j ] )
         RefLayerIdx[ i ][ r++ ] = j
   }
   NumDirectRefLayers[ i ] = d
   NumRefLayers[ i ] = r
}
``` technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, an apparatus for decoding a encoded bitstream (e.g., the video decoder 30 shown in FIG. 3) may receive and use the parameters for decoding. The encoded bitstream 21 may be transmitted to video decoder 30, or stored in a memory for later transmission or retrieval by video decoder 30.

In an embodiment, the chroma format related syntax element may be the syntax element chroma_format_idc in the SPS table cited above.

chroma_format_idc specifies the chroma sampling relative to the luma sampling as specified in clause 6.2.

The meaning of chroma_format_idc and separate_colour_plane_flag is used to indicate the chroma format:

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Table SubWidthC and SubHeightC Values Derived from chroma_format_idc

In an embodiment, the apparatus for encoding a video (e.g. the encoder 20 in FIG. 2) is configured to encode a reference layer syntax element with a value specifying the layer with index j is a direct reference layer for the layer with index i into a video bitstream; to encode a chroma format related syntax element applied to the layer with index i and a chroma format related syntax element applied to the layer with index j into the video bitstream; and to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or According to the embodiment of the present application, whether a layer with index j is a direct reference layer for a layer with index i is determined, both i and j are integers and are larger than or equal to 0; in case that the layer with index j is a direct reference layer for the layer with index i, encoding a reference layer syntax element with a value specifying the layer with index j is a direct reference layer for the layer with index i into a video bitstream, and encoding a chroma format related syntax element applied to the layer with index i and a chroma format related syntax element applied to the layer with index j into the video bitstream, where the value of the chroma format related syntax element applied to the layer with index i is the same as the value of the chroma format related syntax element applied to the layer with index j, the constraint of the format of current layer and reference layer for inter-layer prediction is achieved, thereby making the design simple.

Figure 14:
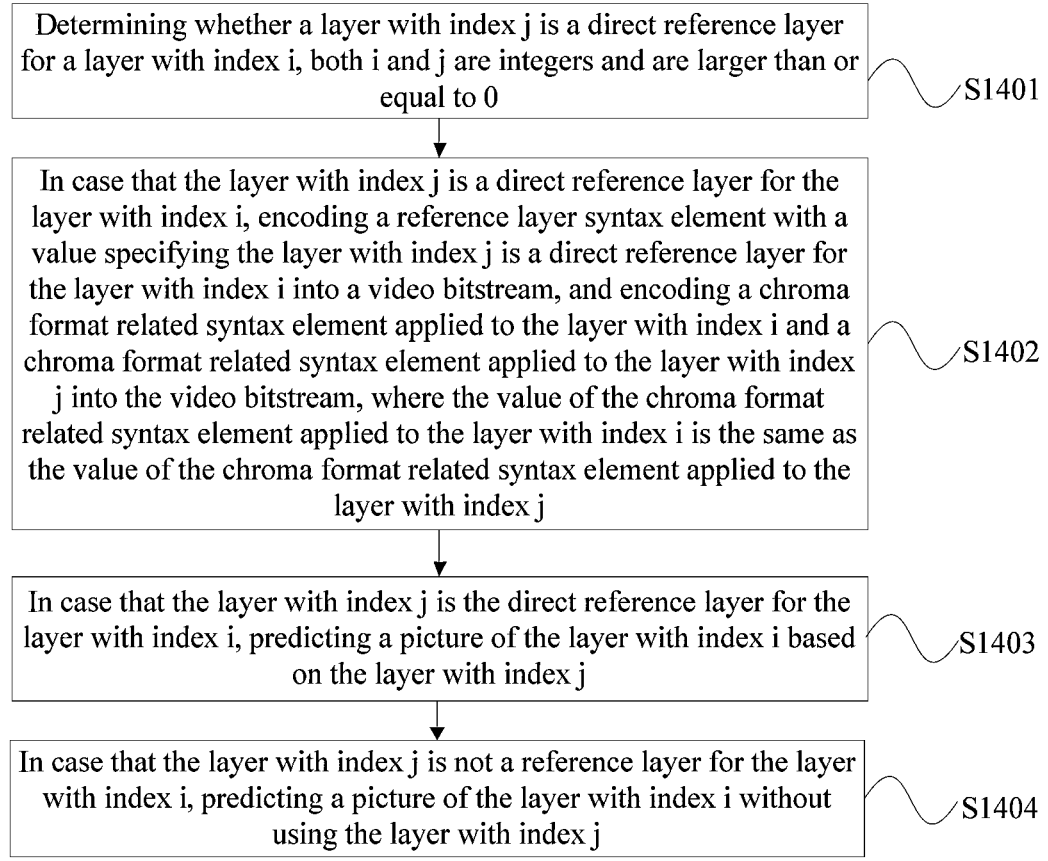
FIG. 14 is a schematic flowchart showing a method for encoding a video according to an embodiment.

FIG. 14 is a schematic flowchart showing a method for encoding a video according to an embodiment of the present application, the method may be executed by an apparatus for encoding a video, as illustrated in FIG. 14, based on the method shown in FIG. 13, the method for encoding a video may include the following operations 1401 to 1404.

S1401, determining whether a layer with index j is a direct reference layer for a layer with index i, both i and j are integers and are larger than or equal to 0.

S1402, in case that the layer with index j is a direct reference layer for the layer with index i, encoding a reference layer syntax element with a value specifying the layer with index j is a direct reference layer for the layer with index i into a video bitstream, and encoding a chroma format related syntax element applied to the layer with index i and a chroma format related syntax element applied to the layer with index j into the video bitstream, where the value of the chroma format related syntax element applied to the layer with index i is the same as the value of the chroma format related syntax element applied to the layer with index j.

S1403, in case that the layer with index j is the direct reference layer for the layer with index i, predicting a picture of the layer with index i based on the layer with index j.

The set of (or possible) inter-prediction modes depends on the available reference pictures (i.e. previous at least partially decoded pictures, e.g. stored in DBP) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

S1404, in case that the layer with index j is not a reference layer for the layer with index i, predicting a picture of the layer with index i without using the layer with index j.

In an embodiment, in case that the layer with index j is not a direct reference layer for the layer with index i, determining whether the layer with index j is an indirect reference layer for the layer with index i; in case that the layer with index j is an indirect reference layer for the layer with index i, predicting the picture of the layer with index i using the layer with index j; in case that the layer with index j is not an indirect reference layer for the layer with index i, predicting the picture of the layer with index i without using the layer with index j.

According to the embodiment of the present application, whether a layer with index j is a direct reference layer for a layer with index i is determined, both i and j are integers and are larger than or equal to 0; in case that the layer with index j is a direct reference layer for the layer with index i, encoding a reference layer syntax element with a value specifying the layer with index j is a direct reference layer for the layer with index i into a video bitstream, encoding a chroma format related syntax element applied to the layer with index i and a chroma format related syntax element applied to the layer with index j into the video bitstream, where the value of the chroma format related syntax element applied to the layer with index i is the same as the value of the chroma format related syntax element applied to the layer with index j; and in case that the layer with index j is the direct reference layer for the layer with index i, predicting a picture of the layer with index i based on the layer with index j, the constraint of the format of current layer and reference layer for inter-layer prediction is achieved, thereby making the design simple.

Figure 15:
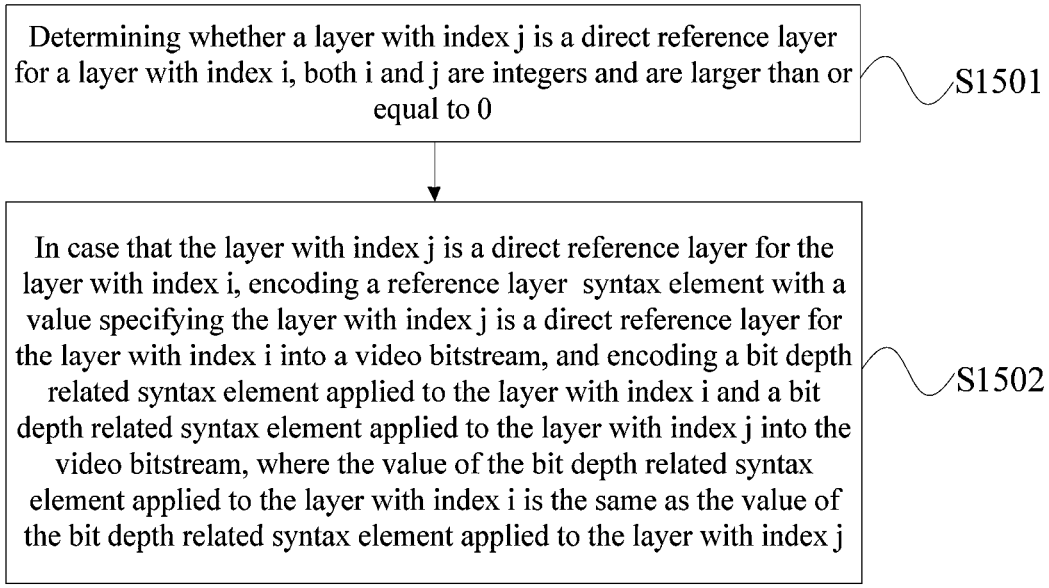
FIG. 15 is a schematic flowchart showing a method for encoding a video according to an embodiment.

FIG. 15 is a schematic flowchart showing a method for encoding a video according to an embodiment of the present application, the method may be executed by an apparatus for encoding a video, as illustrated in FIG. 15, the method for encoding a video may include the following operations 1501 to 1502.

S1501, determining whether a layer with index j is a direct reference layer for a layer with index i, both i and j are integers and are larger than or equal to 0.

S1502, in case that the layer with index j is a direct reference layer for the layer with index i, encoding a reference layer syntax element with a value specifying the layer with index j is a direct reference layer for the layer with index i into a video bitstream, and encoding a bit depth related syntax element applied to the layer with index i and a bit depth related syntax element applied to the layer with index j into the video bitstream, where the value of the bit depth related syntax element applied to the layer with index i is the same as the value of the bit depth related syntax element applied to the layer with index j.

In an embodiment, where the bit depth related syntax element specifies a bit depth of luma and chroma samples of a picture in a layer to which the bit depth related syntax element is applied.

In an embodiment, the bit depth related syntax element may be the syntax element bit_depth_minus8 in the SPS table cited above.

bit_depth_minus8 specifies the bit depth of the samples of the luma and chroma arrays, BitDepth, and the value of the luma and chroma quantization parameter range offset, QpBdOffset, as follows:

$$BitDepth=8+bit\_depth\_minus8 \quad (45)$$

$$QpBdOffset=6*bit\_depth\_minus8 \quad (46)$$

bit_depth_minus8 shall be in the range of 0 to 8, inclusive.

The principle of this embodiment is similar as the embodiment shown in FIG. 13, which will not be described herein for brevity.

According to the embodiment of the present application, In an embodiment, the bit depth related syntax element may be the syntax element bit_depth_minus8 in the SPS table cited above.

bit_depth_minus8 specifies the bit depth of the samples of the luma and chroma arrays, BitDepth, and the value of the luma and chroma quantization parameter range offset, QpBdOffset, as follows:

$$BitDepth=8+bit\_depth\_minus8 \quad (45)$$

$$QpBdOffset=6*bit\_depth\_minus8 \quad (46)$$

bit_depth_minus8 shall be in the range of 0 to 8, inclusive.

The principle of this embodiment is similar as the embodiment shown in FIG. 7, which will not be described herein for brevity.

According to the embodiment of the present application, whether a layer with index j is a direct reference layer for a layer with index i is determined, both i and j are integers and are larger than or equal to 0; in case that the layer with index j is a direct reference layer for the layer with index i, encoding a reference layer syntax element with a value specifying the layer with index j is a direct reference layer for the layer with index i into a video bitstream, an encoding a bit depth related syntax element applied to the layer with index i and a bit depth related syntax element applied to the layer with index j into the video bitstream, where the value of the bit depth related syntax element applied to the layer with index i is the same as the value of the bit depth related syntax element applied to the layer with index j, the constraint of the format of current layer and reference layer for inter-layer prediction is achieved, thereby making the design simple, the constraint of the format of current layer and reference layer for inter-layer prediction is achieved, thereby making the design simple.

Figure 16:
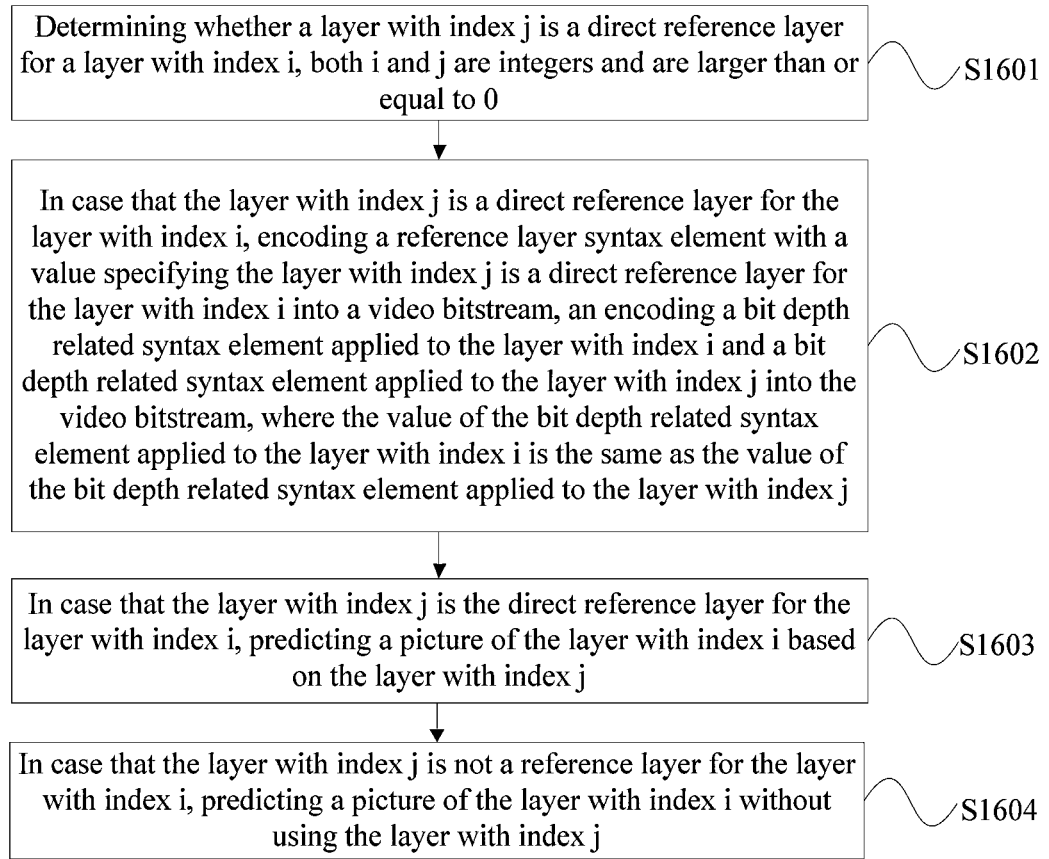
FIG. 16 is a schematic flowchart showing a method for encoding a video according to an embodiment.

FIG. 16 is a schematic flowchart showing a method for encoding a video according to an embodiment of the present application, the method may be executed by an apparatus for encoding a video, as illustrated in FIG. 16, based on the method shown in FIG. 15, the method for encoding a video may include the following operations 1601 to 1604.

S1601, determining whether a layer with index j is a direct reference layer for a layer with index i, both i and j are integers and are larger than or equal to 0.

S1602, in case that the layer with index j is a direct reference layer for the layer with index i, encoding a reference layer syntax element with a value specifying the layer with index j is a direct reference layer for the layer with index i into a video bitstream, an encoding a bit depth related syntax element applied to the layer with index i and a bit depth related syntax element applied to the layer with index j into the video bitstream, where the value of the bit depth related syntax element applied to the layer with index i is the same as the value of the bit depth related syntax element applied to the layer with index j.

S1603, in case that the layer with index j is the direct reference layer for the layer with index i, predicting a picture of the layer with index i based on the layer with index j.

S1604, in case that the layer with index j is not a reference layer for the layer with index i, predicting a picture of the layer with index i without using the layer with index j.

According to the embodiment of the present application, whether a layer with index j is a direct reference layer for a layer with index i is determined, both i and j are integers and are larger than or equal to 0; in case that the layer with index j is a direct reference layer for the layer with index i, encoding a reference layer syntax element with a value specifying the layer with index j is a direct reference layer for the layer with index i into a video bitstream, encoding a bit depth related syntax element applied to the layer with index i and a bit depth related syntax element applied to the layer with index j into the video bitstream, where the value of the bit depth related syntax element applied to the layer with index i is the same as the value of the bit depth related syntax element applied to the layer with index j; and in case that the layer with index j is the direct reference layer for the layer with index i, predicting a picture of the layer with index i based on the layer with index j, the constraint of the format of current layer and reference layer for inter-layer prediction is achieved, thereby making the design simple.

Figure 17:
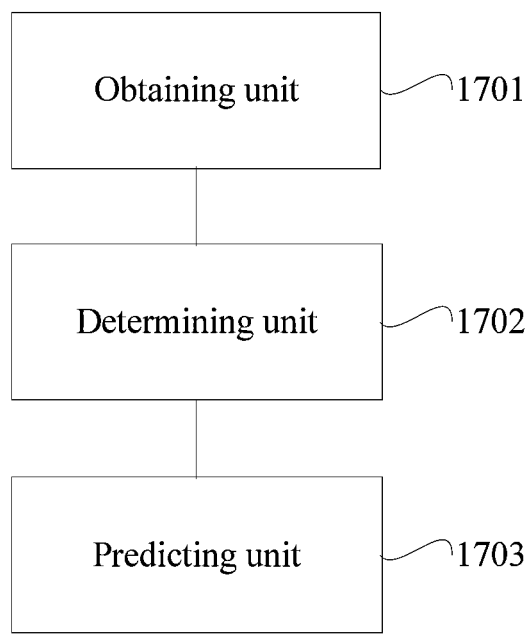
FIG. 17 is a structural diagram showing an apparatus for decoding a coded video bitstream according to an embodiment.

FIG. 17 is a structural diagram showing an apparatus for decoding a coded video bitstream according to an embodiment of the present application, as illustrated in FIG. 17, the apparatus for decoding a coded video bitstream may include an obtaining unit 1701, a determining unit 1702 and a predicting unit 1703.

The obtaining unit 1701 is configured to obtain a reference layer syntax element by parsing the coded video bitstream, where the value of the reference layer syntax element specifying whether a layer with index k is a direct reference layer for a layer with index i, where both i and k are integers and are larger than or equal to 0;

The determining unit 1702 is configured to determine whether the layer with index j is a reference layer for the layer with index i based on the value of the reference layer syntax element, where the layer with index j is a reference layer for the layer with index k, where j is an integer and is larger than or equal to 0; and The predicting unit 1703 is configured to predict a picture of the layer with index i based on the layer with index j in case that a condition is satisfied, where the value of a chroma format related syntax element applied to the layer with index i is the same as the value of a chroma format related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

In an embodiment, the reference layer syntax element is a video parameter set (VPS) level syntax element, where the VPS is applied to the layer with index j and the layer with index i.

In an embodiment, where the chroma format related syntax element is a sequence parameter set (SPS) level syntax element, where the SPS is applied to the layer with index j or the layer with index i.

The obtaining unit 1701 may be or included in the entropy decoding unit 304 of the decoder 30 in FIG. 3, the determining unit 1702 may be or included in the mode application unit 360 of the decoder 30 in FIG. 3, and the predicting unit 1703 may be or included in the inter prediction unit 344 of the decoder 30 in FIG. 3.

It should be noted that the obtaining unit 1701, the determining unit 1702 and the predicting unit 1703 may be software module or hardware circuitry.

The apparatus for decoding a coded video bitstream in this embodiment may be configured to execute the method in FIG. 7, and the apparatus for decoding a coded video bitstream related in the method shown in FIG. 7 may also be structured in the same way as the apparatus for decoding a coded video bitstream shown in FIG. 17, which will not be described herein again for brevity.

Figure 18:
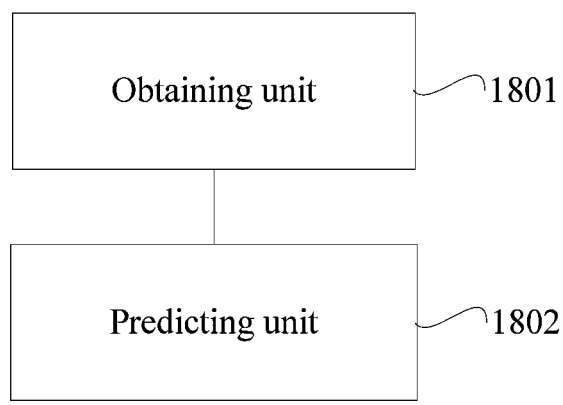
FIG. 18 is a structural diagram showing an apparatus for decoding a coded video bitstream according to an embodiment.

FIG. 18 is a structural diagram showing an apparatus for decoding a coded video bitstream according to an embodiment of the present application, as illustrated in FIG. 18, the apparatus for decoding a coded video bitstream may include an obtaining unit 1801 and a predicting unit 1802.

The obtaining unit 1801 is configured to obtain a reference layer syntax element by parsing the coded video bitstream, where the value of the reference layer syntax element specifying whether a layer with index j is a direct reference layer for a layer with index i, where both i and j are integers and are larger than or equal to 0.

The predicting unit 1802 is configured to predict a picture of the layer with index i based on the layer with index j in case that a condition is satisfied, where the value of a chroma format related syntax element applied to the layer with index i is the same as the value of a chroma format related syntax element applied to the layer with index j, and where the condition includes the value of the reference layer syntax element specifies the layer with index j is a direct reference layer for the layer with index i.

The obtaining unit 1801 may be or included in the entropy decoding unit 304 of the decoder 30 in FIG. 3, and the predicting unit 1802 may be or included in the inter prediction unit 344 of the decoder 30 in FIG. 3.

It should be noted that the obtaining unit 1801 and the predicting unit 1802 may be software module or hardware circuitry.

The apparatus for decoding a coded video bitstream in this embodiment may be configured to execute the method in FIG. 8, and the apparatus for decoding a coded video bitstream related in the method shown in FIG. 8 may also be structured in the same way as the apparatus for decoding a coded video bitstream shown in FIG. 18, which will not be described herein again for brevity.

Based on the embodiments shown in FIGS. 17 and 18, the obtaining unit 1701 or the obtaining unit 1801 is further configured to obtain the chroma format related syntax element applied to the layer with index i and the chroma format related syntax element applied to the layer with index j by parsing the coded video bitstream; and where the condition further includes the value of the chroma format related syntax element applied to the layer with index i is the same as the value of the chroma format related syntax element applied to the layer with index j.

Figure 19:
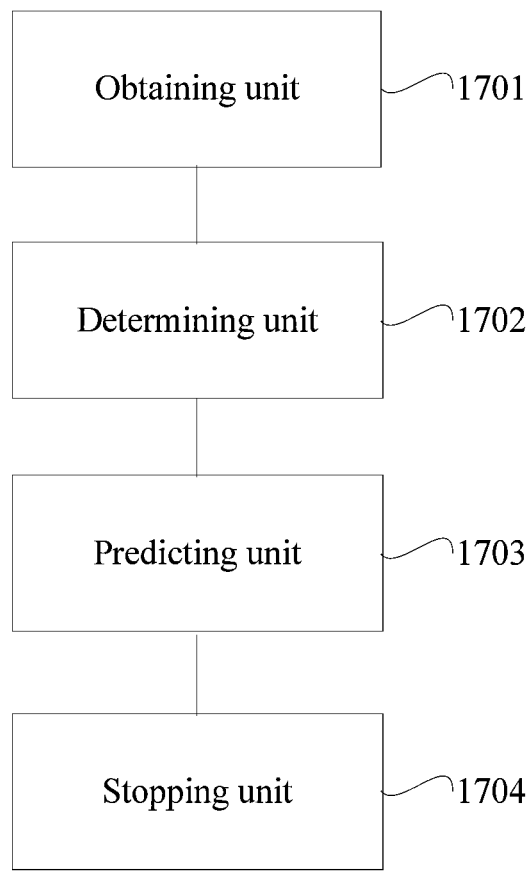
FIG. 19 is a structural diagram showing an apparatus for decoding a coded video bitstream according to an embodiment.

FIG. 19 is a structural diagram showing an apparatus for decoding a coded video bitstream according to an embodiment of the present application, as illustrated in FIG. 19, based on the apparatus shown in FIG. 17, the apparatus for decoding a coded video bitstream may include the obtaining unit 1701, the determining unit 1702, the predicting unit 1703 and a stopping unit 1704.

The stopping unit 1704 is configured to stop decoding the coded video bitstream in case that the layer with index j is a reference layer for the layer with index i, and the value of the chroma format related syntax element applied to the layer with index i is not the same as the value of the chroma format related syntax element applied to the layer with index j.

The predicting unit 1703 is further configured to predict the picture of the layer with index i without using the layer with index j in case that the layer with index j is not a reference layer for the layer with index i.

The determining unit 1702 is further configured to determine, without obtaining the chroma format related syntax element applied to the layer with index i by parsing the coded video bitstream, that the value of the chroma format related syntax element applied to the layer with index i is the value of the chroma format related syntax element applied to the layer with index j in case that the condition is satisfied.

The stopping unit 1704 in this embodiment may also be or included in the entropy decoding unit 304 of the decoder 30 in FIG. 3.

It should be noted that the obtaining unit 1701, the determining unit 1702, the predicting unit 1703 and the stopping unit 1704 may be software module or hardware circuitry.

The apparatus for decoding a coded video bitstream in this embodiment may be configured to execute the method in FIG. 9, and the apparatus for decoding a coded video bitstream related in the method shown in FIG. 9 may also be structured in the same way as the apparatus for decoding a coded video bitstream shown in FIG. 19, which will not be described herein again for brevity.

Figure 20:
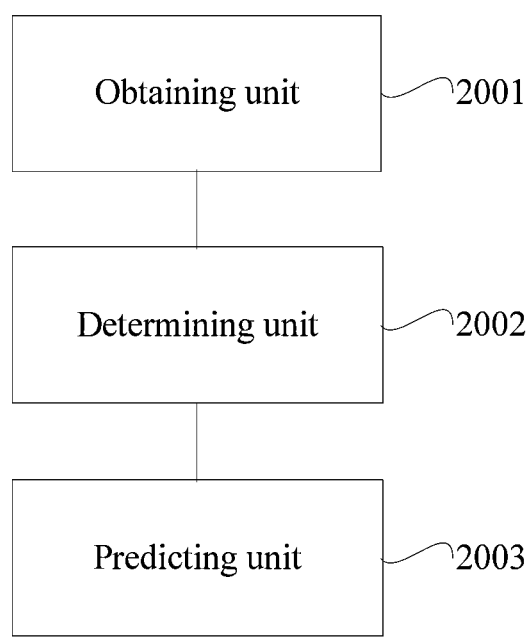
FIG. 20 is a structural diagram showing an apparatus for decoding a coded video bitstream according to an embodiment.

FIG. 20 is a structural diagram showing an apparatus for decoding a coded video bitstream according to an embodiment of the present application, as illustrated in FIG. 20, the apparatus for decoding a coded video bitstream may include an obtaining unit 2001, a determining unit 2002 and a predicting unit 2003.

The obtaining unit 2001 is configured to obtain a reference layer syntax element by parsing the coded video bitstream, where the value of the reference layer syntax element specifying whether a layer with index k is a direct reference layer for a layer with index i, where both i and k are integers and are larger than or equal to 0.

The determining unit 2002 is configured to determine whether the layer with index j is a reference layer for the layer with an index i based on the value of the reference layer syntax element, where the layer with index j is a reference layer for the layer with index k, where j is an integer and is larger than or equal to 0.

The predicting unit 2003 configured to predict a picture of the layer with index i based on the layer with index j in case that a condition is satisfied, where the value of a bit depth related syntax element applied to the layer with index i is the same as the value of a bit depth related syntax element applied to the layer with index j, and where the condition includes the layer with index j is a reference layer for the layer with index i.

In an embodiment, in case that the value of the reference layer syntax element specifies the layer with index k is a direct reference layer for the layer with index i, the layer with index j is a reference layer for the layer with index i.

In an embodiment, the bit depth related syntax element specifies a bit depth of luma and chroma samples of a picture in a layer to which the bit depth related syntax element is applied.

In an embodiment, the reference layer syntax element is a video parameter set (VPS) level syntax element, where the VPS is applied to the layer with index j and the layer with index i.

In an embodiment, the bit depth related syntax element is a sequence parameter set (SPS) level syntax element, where the SPS is applied to the layer with index j or the layer with index i.

The obtaining unit 2001 may be or included in the entropy decoding unit 304 of the decoder 30 in FIG. 3, the determining unit 2002 may be or included in the mode application unit 360 of the decoder 30 in FIG. 3, and the predicting unit 2003 may be or included in the inter prediction unit 344 of the decoder 30 in FIG. 3.

It should be noted that the obtaining unit 2001, the determining unit 2002 and the predicting unit 2003 may be software module or hardware circuitry.

The apparatus for decoding a coded video bitstream in this embodiment may be configured to execute the method in FIG. 10, and the apparatus for decoding a coded video bitstream related in the method shown in FIG. 10 may also be structured in the same way as the apparatus for decoding a coded video bitstream shown in FIG. 20, which will not be described herein again for brevity.

Figure 21:
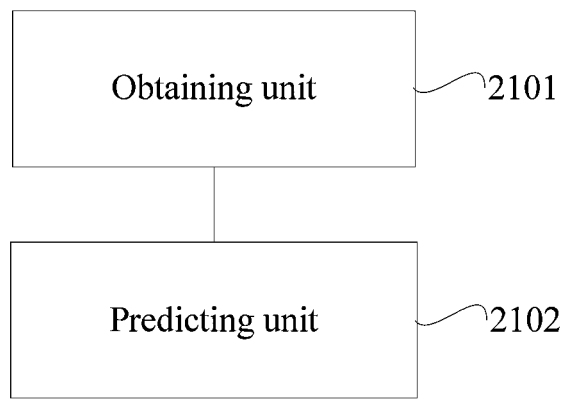
FIG. 21 is a structural diagram showing an apparatus for decoding a coded video bitstream according to an embodiment.

FIG. 21 is a structural diagram showing an apparatus for decoding a coded video bitstream according to an embodiment of the present application, as illustrated in FIG. 21, the apparatus for decoding a coded video bitstream may include an obtaining unit 2101 and a predicting unit 2102.

The obtaining unit 2101 is configured to obtain a reference layer syntax element by parsing the coded video bitstream, where the value of the reference layer syntax element specifying whether a layer with index j is a direct reference layer for a layer with index i, where both i and j are integers and are larger than or equal to 0.

The predicting unit 2102 is configured to predict a picture of the layer with index i based on the layer with index j in case that a condition is satisfied, where the value of a bit depth related syntax element applied to the layer with index i is the same as the value of a bit depth related syntax element applied to the layer with index j, and where the condition includes the value of the reference layer syntax element specifies the layer with index j is a direct reference layer for the layer with index i.

The obtaining unit 2101 may be or included in the entropy decoding unit 304 of the decoder 30 in FIG. 3, and the predicting unit 2102 may be or included in the inter prediction unit 344 of the decoder 30 in FIG. 3.

It should be noted that the obtaining unit 2101 and the predicting unit 2102 may be software module or hardware circuitry.

The apparatus for decoding a coded video bitstream in this embodiment may be configured to execute the method in FIG. 11, and the apparatus for decoding a coded video bitstream related in the method shown in FIG. 11 may also be structured in the same way as the apparatus for decoding a coded video bitstream shown in FIG. 21, which will not be described herein again for brevity.

Based on the embodiments shown in FIGS. 20 and 21, the obtaining unit 2001 or the obtaining unit 2101 is further configured to obtain the bit depth related syntax element applied to the layer with index i and the bit depth related syntax element applied to the layer with index j by parsing the coded video bitstream; and where the condition further includes the value of the bit depth related syntax element applied to the layer with index i is the same as the value of the bit depth related syntax element applied to the layer with index j.

Figure 22:
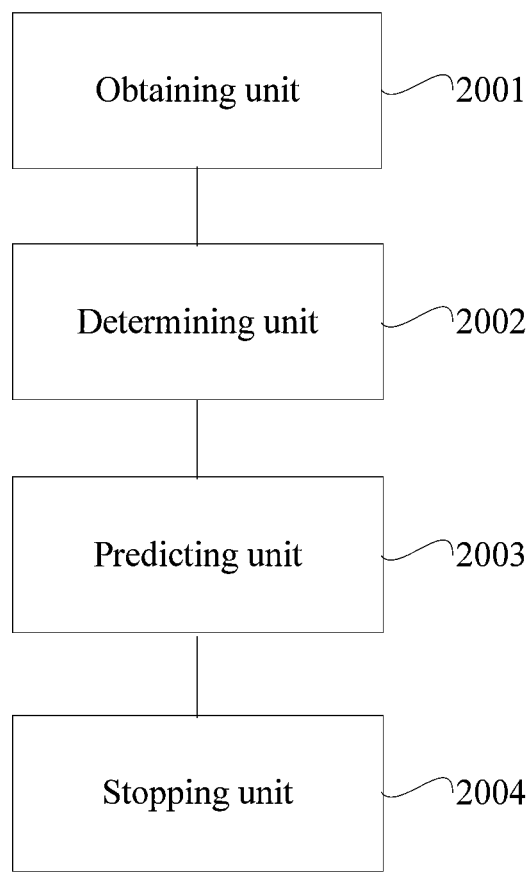
FIG. 22 is a structural diagram showing an apparatus for decoding a coded video bitstream according to an embodiment.

FIG. 22 is a structural diagram showing an apparatus for decoding a coded video bitstream according to an embodiment of the present application, as illustrated in FIG. 22, based on the apparatus shown in FIG. 20, the apparatus for decoding a coded video bitstream may include the obtaining unit 2001, the determining unit 2002, the predicting unit 2003 and a stopping unit 2004.

The stopping unit 2004 is configured to stop decoding the coded video bitstream in case that the layer with index j is a reference layer for the layer with index i, and the value of the bit depth related syntax element applied to the layer with index i is not the same as the value of the bit depth related syntax element applied to the layer with index j.

The predicting unit 2003 is further configured to predict the picture of the layer with index i without using the layer with index j in case that the layer with index j is not a reference layer for the layer with index i.

The determining unit 2002 is further configured to determine, without obtaining the bit depth related syntax element applied to the layer with index i by parsing the coded video bitstream, that the value of the bit depth related syntax element applied to the layer with index i is the value of the bit depth related syntax element applied to the layer with index j.

The stopping unit 2004 in this embodiment may also be or included in the entropy decoding unit 304 of the decoder 30 in FIG. 3.

It should be noted that the obtaining unit 2001, the determining unit 2002, the predicting unit 2003 and the stopping unit 2004 may be software module or hardware circuitry.

The apparatus for decoding a coded video bitstream in this embodiment may be configured to execute the method in FIG. 12, and the apparatus for decoding a coded video bitstream related in the method shown in FIG. 12 may also be structured in the same way as the apparatus for decoding a coded video bitstream shown in FIG. 22, which will not be described herein again for brevity.

It should be noted that the apparatus for executing the method in FIG. 7-12 or the apparatus for decoding a coded video bitstream in FIG. 17-22 may be or included in the destination device 14 in FIG. 1A, the video decoder 30 in FIG. 1B, the decoder 30 in FIG. 3, the video coding device 400 in FIG. 4 or the apparatus 500 in FIG. 5.

Figure 23:
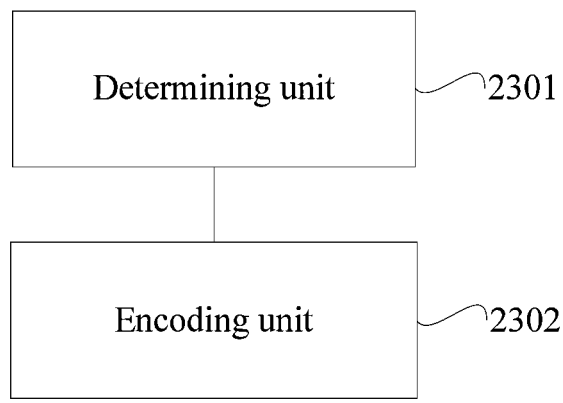
FIG. 23 is a structural diagram showing an apparatus for encoding a video according to an embodiment.

FIG. 23 is a structural diagram showing an apparatus for encoding a video according to an embodiment of the present application, as illustrated in FIG. 23, the apparatus for encoding a video may include a determining unit 2301 and an encoding unit 2302.

The determining unit 2301 is configured to determine whether a layer with index j is a direct reference layer for a layer with index i, both i and j are integers and are larger than or equal to 0.

The encoding unit 2302 is configured to encode a reference layer syntax element with a value specifying the layer with index j is a direct reference layer for the layer with index i into a video bitstream, and encode a chroma format related syntax element applied to the layer with index i and a chroma format related syntax element applied to the layer with index j into the video bitstream in case that the layer with index j is a direct reference layer for the layer with index i, where the value of the chroma format related syntax element applied to the layer with index i is the same as the value of the chroma format related syntax element applied to the layer with index j.

The determining unit 2301 may be or included in the mode selection unit 260 of the decoder 20 in FIG. 2, and the encoding unit 2302 may be or included in the entropy encoding unit 270 of the encoder 20 in FIG. 2.

It should be noted that the determining unit 2301 and the encoding unit 2302 may be software module or hardware circuitry.

The apparatus for encoding a video in this embodiment may be configured to execute the method in FIG. 13, and the apparatus for encoding a video related in the method shown in FIG. 13 may also be structured in the same way as the apparatus for encoding a video shown in FIG. 23, which will not be described herein again for brevity.

Figure 24:
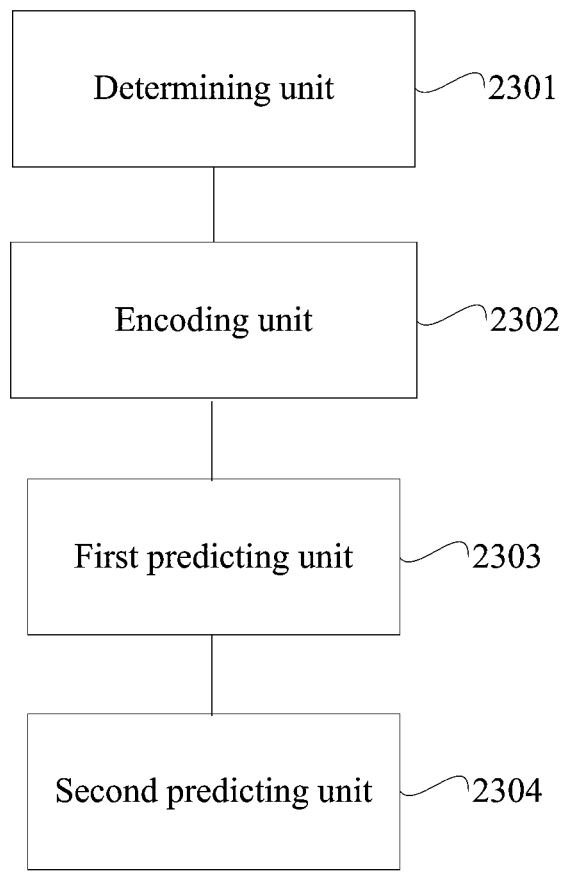
FIG. 24 is a structural diagram showing an apparatus for encoding a video according to an embodiment.

FIG. 24 is a structural diagram showing an apparatus for encoding a video according to an embodiment of the present application, as illustrated in FIG. 24, based on the apparatus shown in FIG. 23, the apparatus for encoding a video may further include a first predicting unit 2303 and a second predicting unit 2304.

The first predicting unit 2303 is configured to predict a picture of the layer with index i based on the layer with index j in case that the layer with index j is the direct reference layer for the layer with index i.

The second predicting unit 2304 is configured to predict a picture of the layer with index i without using the layer with index j in case that the layer with index j is not a reference layer for the layer with index i.

The first predicting unit 2303 and the second predicting unit 2304 may be or included in the inter-prediction unit 244 of the decoder 20 in FIG. 2.

It should be noted that the determining unit 2301, the encoding unit 2302, the first predicting unit 2303 and the second predicting unit 2304 may be software module or hardware circuitry.

The apparatus for encoding a video in this embodiment may be configured to execute the method in FIG. 14, and the apparatus for encoding a video related in the method shown in FIG. 14 may also be structured in the same way as the apparatus for encoding a video shown in FIG. 24, which will not be described herein again for brevity.

Figure 25:
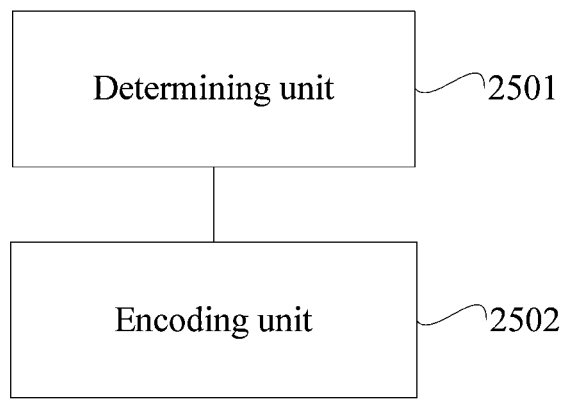
FIG. 25 is a structural diagram showing an apparatus for encoding a video according to an embodiment.

FIG. 25 is a structural diagram showing an apparatus for encoding a video according to an embodiment of the present application, as illustrated in FIG. 25, the apparatus for encoding a video may include a determining unit 2501 and an encoding unit 2502.

The determining unit 2501 is configured to determine whether a layer with index j is a direct reference layer for a layer with index i, both i and j are integers and are larger than or equal to 0.

The encoding unit 2502 is configured to encode a reference layer syntax element with a value specifying the layer with index j is a direct reference layer for the layer with index i into a video bitstream, and encode a bit depth related syntax element applied to the layer with index i and a bit depth related syntax element applied to the layer with index j into the video bitstream in case that the layer with index j is a direct reference layer for the layer with index i, where the value of the bit depth related syntax element applied to the layer with index i is the same as the value of the bit depth related syntax element applied to the layer with index j.

In an embodiment, the bit depth related syntax element specifies a bit depth of luma and chroma samples of a picture in a layer to which the bit depth related syntax element is applied.

The determining unit 2501 may be or included in the mode selection unit 260 of the decoder 20 in FIG. 2, and the encoding unit 2502 may be or included in the entropy encoding unit 270 of the encoder 20 in FIG. 2.

It should be noted that the determining unit 2501 and the encoding unit 2502 may be software module or hardware circuitry.

The apparatus for encoding a video in this embodiment may be configured to execute the method in FIG. 15, and the apparatus for encoding a video related in the method shown in FIG. 15 may also be structured in the same way as the apparatus for encoding a video shown in FIG. 25, which will not be described herein again for brevity.

Figure 26:
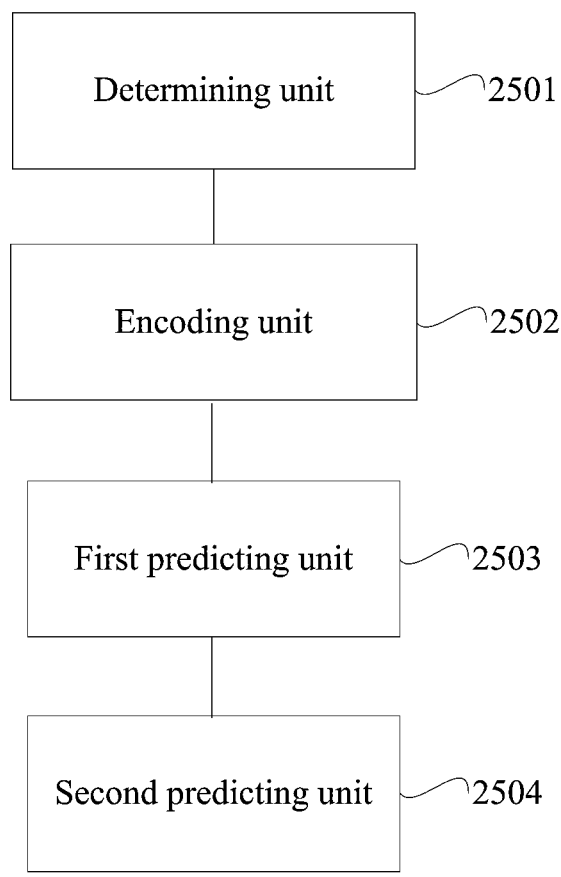
FIG. 26 is a structural diagram showing an apparatus for encoding a video according to an embodiment.

FIG. 26 is a structural diagram showing an apparatus for encoding a video according to an embodiment of the present application, as illustrated in FIG. 26, based on the apparatus shown in FIG. 25, the apparatus for encoding a video may further include a first predicting unit 2503 and a second predicting unit 2504.

The first predicting unit 2503 is configured to predict a picture of the layer with index i based on the layer with index j in case that the layer with index j is the direct reference layer for the layer with index i.

The second predicting unit 2504 is configured to predict a picture of the layer with index i without using the layer with index j in case that the layer with index j is not a reference layer for the layer with index i.

The first predicting unit 2503 and the second predicting unit 2504 may be or included in the inter-prediction unit 244 of the decoder 20 in FIG. 2.

It should be noted that the determining unit 2501, the encoding unit 2502, the first predicting unit 2503 and the second predicting unit 2504 may be software module or hardware circuitry.

The apparatus for encoding a video in this embodiment may be configured to execute the method in FIG. 16, and the apparatus for encoding a video related in the method shown in FIG. 16 may also be structured in the same way as the apparatus for encoding a video shown in FIG. 26, which will not be described herein again for brevity.

It should be noted that the apparatus for executing the method in FIG. 13-16 or the apparatus for encoding a video in FIG. 23-26 may be or included in the source device 12 in FIG. 1A, the video encoder 20 in FIG. 1B, the encoder 20 in FIG. 2, the video coding device 400 in FIG. 4 or the apparatus 500 in FIG. 5.

The present application further provides an encoder including processing circuitry for carrying out the method according to any one of the embodiments of the present application shown in FIGS. 13-16.

It should be noted that the encoder in this embodiment may be or included in the source device 12 in FIG. 1A, the video encoder 20 in FIG. 1B, the encoder 20 in FIG. 2, the video coding device 400 in FIG. 4 or the apparatus 500 in FIG. 5.

The present application further provides a decoder including processing circuitry for carrying out the method according to any one of the embodiments of the present application shown in FIGS. 7-12.

It should be noted that the decoder in this embodiment may be or included in the destination device 14 in FIG. 1A, the video decoder 30 in FIG. 1B, the decoder 30 in FIG. 3, the video coding device 400 in FIG. 4 or the apparatus 500 in FIG. 5.

The present application further provides a computer program product including program code for performing the method according to any one of the embodiments of the present application shown in FIGS. 7-16 when executed on a computer or a processor.

The present application further provides a decoder, the decoder includes one or more processors; and a non-transitory computer-readable storage medium coupled to the one or more processors and storing programming for execution by the processors, where the programming, when executed by the processors, configures the decoder to carry out the method according to any one of the embodiments of the present application shown in FIGS. 7-12.

It should be noted that the decoder in this embodiment may be or included in the destination device 14 in FIG. 1A, the video decoder 30 in FIG. 1B, the decoder 30 in FIG. 3, the video coding device 400 in FIG. 4 or the apparatus 500 in FIG. 5.

The present application further provides an encoder, the encode includes one or more processors; and a non-transitory computer-readable storage medium coupled to the processors and storing programming for execution by the processors, where the programming, when executed by the processors, configures the encoder to carry out the method according to any one of the embodiments of the present application shown in FIGS. 13-16.

It should be noted that the encoder in this embodiment may be or included in the source device 12 in FIG. 1A, the video encoder 20 in FIG. 1B, the encoder 20 in FIG. 2, the video coding device 400 in FIG. 4 or the apparatus 500 in FIG. 5.

The present application further provides a non-transitory computer-readable medium carrying a program code which, when executed by a computer device, causes the computer device to perform the method of any one of the embodiments of the present application shown in FIGS. 7-16.

The present application further provides a non-transitory storage medium which includes an encoded bitstream decoded by an image decoding device, the bitstream includes encoded data of at least one layer, where the bitstream further includes a chroma format related syntax element of a layer with index i and a chroma format related syntax element of a layer with index j, where the value of the chroma format related syntax element of the layer with index i is the same as the value of the chroma format related syntax element of the layer with index j when the layer with index j is a reference layer for the layer with index i, both i and j are integers and are larger than or equal to 0.

The present application further provides a non-transitory storage medium which includes an encoded bitstream decoded by an image decoding device, the bitstream includes encoded data of at least one layer, where the bitstream further includes a bit depth related syntax element of a layer with index i and a bit depth related syntax element of a layer with index j, where the value of the bit depth related syntax element of the layer with index i is the same as the value of the bit depth related syntax element of the layer with index j when the layer with index j is a reference layer for the layer with index i, both i and j are integers and are larger than or equal to 0.

In an embodiment, the bit depth related syntax element specifies a bit depth of luma and chroma samples of a picture in a layer to which the bit depth related syntax element is applied.

In an embodiment, the bitstream further includes a reference layer syntax element, where the layer with index j is a reference layer for the layer with index i includes: the value of the reference layer syntax element specifying the layer with index j is a direct reference layer for the layer with index i.

Following is an explanation of the applications of the encoding method as well as the decoding method as shown in the above-mentioned embodiments, and a system using them.

Figure 27:
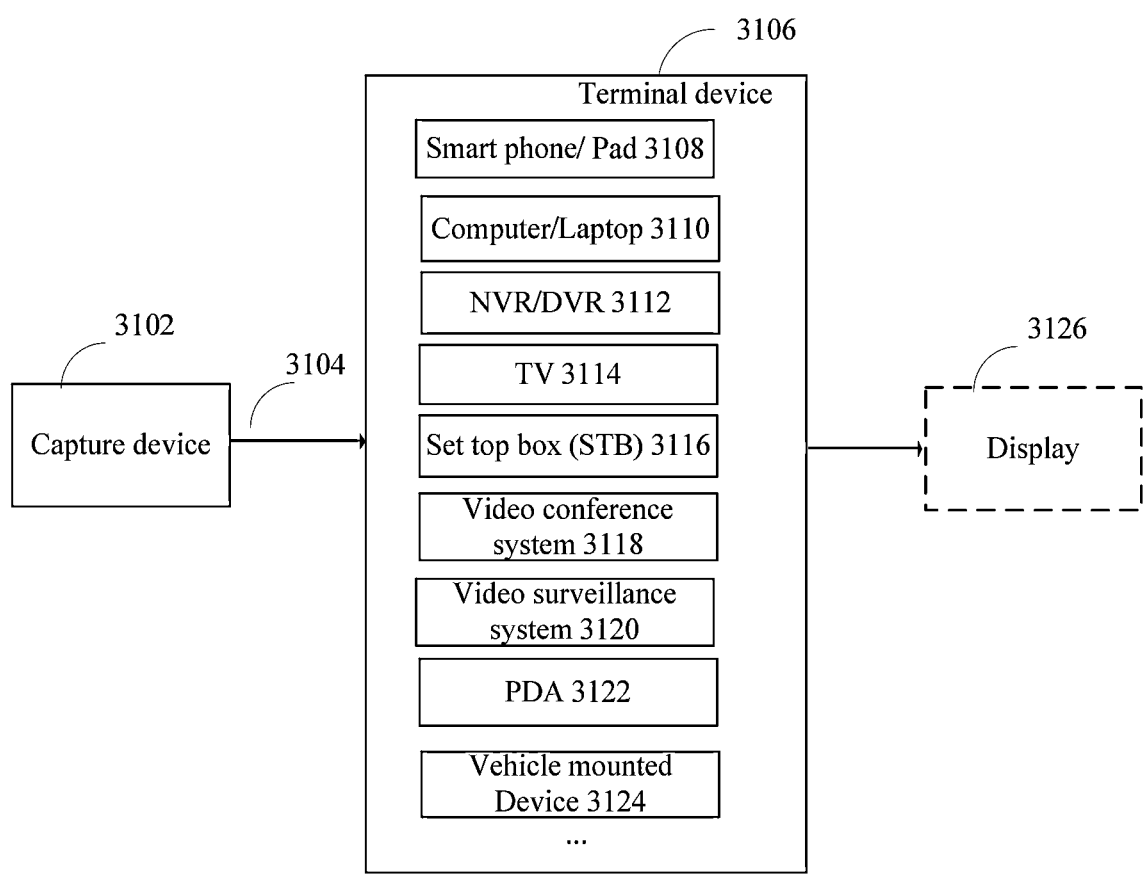
FIG. 27 is a block diagram showing an example structure of a content supply system 3100 which realizes a content delivery service.

FIG. 27 is a block diagram showing a content supply system 3100 for realizing content distribution service. This content supply system 3100 includes capture device 3102, terminal device 3106, and includes display 3126 (which may be optional in some embodiments). The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 28:
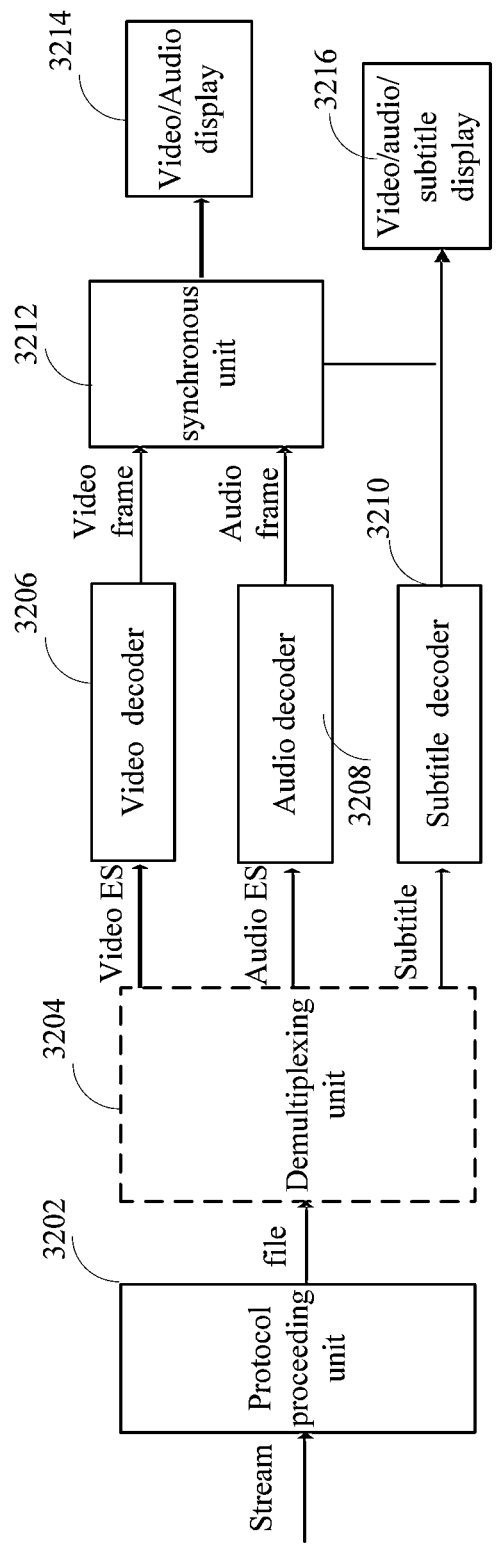
FIG. 28 is a block diagram showing a structure of an example of a terminal device.

FIG. 28 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and subtitle (which may be optional in some embodiments) are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 28) before feeding it to the synchronous unit 3212. Similarly, the audio frame may store in a buffer (not shown in FIG. 28) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

It should be noted that both the content supply system 3100 and the terminal device 3106 are configured to execute the method in FIGS. 7-16 cited above.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.
x % y Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Relational Operators

The following relational operators are defined as follows:
> Greater than
>= Greater than or equal to
< Less than
<= Less than or equal to
== Equal to
!= Not equal to
When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of −π÷2 to π÷2, inclusive, in units of radians
Atan(x) the trigonometric inverse tangent function, operating on an argument x, with an output value in the range of −π÷2 to π÷2, inclusive, in units of radians $$A\tan2(y, x) = \begin{cases} A\tan\left(\frac{y}{x}\right); & x > 0 \\ A\tan\left(\frac{y}{x}\right) + \pi; & x < 0 \ \&\&\ y >= 0 \\ A\tan\left(\frac{y}{x}\right) - \pi; & x < 0 \ \&\&\ y < 0 \\ +\frac{\pi}{2}; & x == 0 \ \&\&\ y >= 0 \\ -\frac{\pi}{2}; & \text{otherwise} \end{cases}$$

Ceil(x) the smallest integer greater than or equal to x.
Clip1$_Y$(x)=Clip3(0, (1<<BitDepth$_Y$)−1, x)
Clip1$_C$(x)=Clip3(0, (1<<BitDepth$_C$)−1, x)

$$Clip3(x, y, z) = \begin{cases} x; & z < x \\ y; & z > y \\ z; & \text{otherwise} \end{cases}$$

Cos(x) the trigonometric cosine function operating on an argument x in units of radians.
Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).
Log2(x) the base-2 logarithm of x.
Log10(x) the base-10 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Round(x)=Sign(x)*Floor(Abs(x)+0.5)

$$Sign(x) = \begin{cases} 1; & x > 0 \\ 0; & x == 0 \\ -1; & x < 0 \end{cases}$$

Sin(x) the trigonometric sine function operating on an argument x in units of radians
Sqrt(x)=$\sqrt{x}$
Swap(x, y)=(y, x)
Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

Table: Operation Precedence from Highest (at Top of Table) to Lowest (at Bottom of Table)

| operations (with operands x, y, and z) |
| --- |
| "x++", "x− −" |
| "!x", "−x" (as a unary prefix operator) $x^y$ |
| "x∗y", "x/y", "x÷y", "$\frac{x}{y}$", "x % y" |
| "x +y", "x / y" (as a two-argument operator)," |
| "$\sum_{i=x}^{y} f(i)$" |
| "x << y", "x >> y" |
| "x < y", "x <= y", "x > y", "x >= y" |
| "x == y", "x != y" |
| "x & y" |
| "x \| y" |
| "x && y" |
| "x \|\| y" |
| "x ? y : z" |
| "x..y" |
| "x = y", "x += y", "x −= y" |

Text Description of Logical Operations

In the text, a statement of logical operations as would be described mathematically in the following form:

if( condition 0 )
  statement 0
else if( condition 1 )
  statement 1
...
else /* informative remark on remaining condition */
  statement n may be described in the following manner:

... as follows / ... the following applies:
— If condition 0, statement 0
— Otherwise, if condition 1, statement 1
— ...
— Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a  &&  condition 0b )
statement 0
   else if( condition 1a  ||  condition 1b )
      statement 1
   ...
   else
      statement n
``` may be described in the following manner:
... as follows / ... the following applies:
— If all of the following conditions are true, statement 0:
— condition 0a
— condition 0b
— Otherwise, if one or more of the following conditions are true, statement 1:
— condition 1a
— condition 1b
— ...
— Otherwise, statement n In the text, a statement of logical operations as would be described mathematically in the following form:

```
if( condition 0)
   statement 0
if( condition 1)
   statement 1
``` may be described in the following manner:
When condition 0, statement 0
When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The invention claimed is:

1. A method for decoding a coded video bitstream, comprising:
   obtaining a reference layer syntax element by parsing the coded video bitstream, wherein a value of the reference layer syntax element specifying whether a layer with index k is a direct reference layer for a layer with index i, wherein i and k are integers larger than or equal to 0;
   determining whether a layer with index j is a reference layer for the layer with index i based on the value of the reference layer syntax element, wherein the layer with index j is determined to be a reference layer for the layer with index i if the layer with index i is a reference layer for the layer with index k and the value of the reference layer syntax element specifies that the layer with index k is a direct reference layer for the layer with index i, wherein j is an integer larger than or equal to 0; and
   when the layer with index j is the reference layer for the layer with index i, predicting a picture of the layer with index i based on the layer with index j, wherein a value of a chroma format related syntax element applied to the layer with index i is the same as a value of a chroma format related syntax element applied to the layer with index j.

2. The method of claim 1, further comprising:
   when the layer with index j is the reference layer for the layer with index i, and the value of the chroma format related syntax element applied to the layer with index i is not the same as the value of the chroma format related syntax element applied to the layer with index j, stopping decoding the coded video bitstream.

3. The method of claim 1, further comprising:
   when the layer with index j is not the reference layer for the layer with index i, predicting the picture of the layer with index i without using the layer with index j.

4. A method for decoding a coded video bitstream, comprising:
   obtaining a reference layer syntax element by parsing the coded video bitstream, wherein a value of the reference layer syntax element specifying whether a layer with index j is a direct reference layer for a layer with index i, wherein i and j are integers larger than or equal to 0; and
   when a condition is satisfied, predicting a picture of the layer with index i based on the layer with index j, wherein the layer with index j is a direct reference layer for the layer with index i, wherein a value of a chroma format related syntax element applied to the layer with index i is the same as a value of a chroma format related syntax element applied to the layer with index j, and wherein the condition comprises the value of the reference layer syntax element specifies the layer with index j is a direct reference layer for the layer with index i.

5. The method of claim 4, wherein the reference layer syntax element is a video parameter set (VPS) level syntax element that is applied to the layer with index j and the layer with index i.

6. The method of claim 4, wherein the chroma format related syntax element is a sequence parameter set (SPS) level syntax element that is applied to the layer with index j or the layer with index i.

7. The method of claim 4, further comprising:
   obtaining the chroma format related syntax element applied to the layer with index i and the chroma format related syntax element applied to the layer with index j by parsing the coded video bitstream; and wherein the condition further comprises the value of the chroma format related syntax element applied to the layer with index i is the same as the value of the chroma format related syntax element applied to the layer with index j.

8. The method of claim 4, further comprising:
   when the condition is satisfied, determining, without obtaining the chroma format related syntax element applied to the layer with index i by parsing the coded video bitstream, that the value of the chroma format related syntax element applied to the layer with index i is the value of the chroma format related syntax element applied to the layer with index j.

9. A method for encoding a video, comprising:
   determining whether a layer with index j is a direct reference layer for a layer with index i, wherein i and j are integers larger than or equal to 0;
   when the layer with index j is the direct reference layer for the layer with index i, encoding a reference layer syntax element with a value specifying the layer with index j is a direct reference layer for the layer with index i into a video bitstream, and encoding a chroma format related syntax element applied to the layer with index i and a chroma format related syntax element applied to the layer with index j into the video bitstream, wherein the value of the chroma format related syntax element applied to the layer with index i is the same as the value of the chroma format related syntax element applied to the layer with index j; and
   when the layer with index i is the direct reference layer for the layer with index i, predicting a picture of the layer with index i based on the layer with index j.

10. The method of claim 9, further comprising:
    when the layer with index j is not a reference layer for the layer with index i, predicting a picture of the layer with index i without using the layer with index j.

11. A decoder, comprising:
    one or more processors; and
    a non-transitory computer-readable storage medium coupled to the one or more processors and storing programming instructions, which when executed by the one or more processors, cause the decoder to perform the method according to claim 2.

12. An encoder, comprising:
    one or more processors; and
    a non-transitory computer-readable storage medium coupled to the processors and storing programming instructions, which when executed by the one or more processors, cause the encoder to perform the method according to claim 9.

* * * * *